US007215397B2

(12) United States Patent
Inoue et al.

(10) Patent No.: US 7,215,397 B2
(45) Date of Patent: May 8, 2007

(54) LIQUID CRYSTAL DISPLAY DEVICE COMPRISING A TN ALIGNMENT REGION CONTINUOUSLY CONNECTABLE WITH A BEND ALIGNMENT REGION, EACH REGION HAVING A DIFFERENT PRETILT DIRECTION AND THE METHOD OF FABRICATING THE SAME

(75) Inventors: Iichiro Inoue, Tenri (JP); Tatsuo Uchida, 1-11, Takasago 2-chome, Miyagino-ku, Sendai-shi, Miyagi 983-0014 (JP)

(73) Assignees: Sharp Kabushiki Kaisha, Osaka (JP); Tatsuo Uchida, Miyagi (JP)

( * ) Notice: Subject to any disclaimer, the term of this patent is extended or adjusted under 35 U.S.C. 154(b) by 0 days.

(21) Appl. No.: 10/493,519

(22) PCT Filed: Oct. 4, 2002

(86) PCT No.: PCT/JP02/10388

§ 371 (c)(1), (2), (4) Date: Apr. 23, 2004

(87) PCT Pub. No.: WO03/036378

PCT Pub. Date: May 1, 2003

(65) Prior Publication Data

US 2004/0246421 A1 Dec. 9, 2004

(30) Foreign Application Priority Data

Oct. 24, 2001 (JP) ............................ 2001-325924
Jul. 31, 2002 (JP) ............................ 2002-223539

(51) Int. Cl.
*G02F 1/1337* (2006.01)
*G02F 1/141* (2006.01)
*C09K 19/02* (2006.01)

(52) U.S. Cl. ...................... 349/129; 349/136; 349/179; 349/191; 349/34; 349/126

(58) Field of Classification Search ..................... None
See application file for complete search history.

(56) References Cited

U.S. PATENT DOCUMENTS 6,437,844 B1 * 8/2002 Hattori et al. .............. 349/129

(Continued)

FOREIGN PATENT DOCUMENTS

EP 1 124 153 A2 8/2001

(Continued)

*Primary Examiner*—Andrew Schechter
*Assistant Examiner*—W. Patty Chen
(74) *Attorney, Agent, or Firm*—Keating & Bennett, LLP

(57) ABSTRACT

The liquid crystal display device of the present invention includes a pair of substrates, a liquid crystal layer placed between the pair of substrates and an alignment film placed on the side of at least one of the pair of substrates facing the liquid crystal layer. The liquid crystal layer has a first region in which the pretilt direction of liquid crystal molecules of which the alignment is regulated with alignment regulating force of a surface of the alignment film is a first direction and a second region in which the pretilt direction is a second direction different from the first direction. Display is performed using bend alignment of the first region of the liquid crystal layer.

16 Claims, 29 Drawing Sheets

U.S. PATENT DOCUMENTS

| | | | | |
|---|---|---|---|---|
| 6,522,379 | B1 * | 2/2003 | Ishihara et al. | 349/139 |
| 6,714,276 | B2 * | 3/2004 | Towler et al. | 349/180 |
| 2002/0075435 | A1 * | 6/2002 | Lee et al. | 349/129 |

FOREIGN PATENT DOCUMENTS

| | | |
|---|---|---|
| JP | 09-096790 | 4/1997 |
| JP | 10-020284 | 1/1998 |

* cited by examiner

LIQUID CRYSTAL DISPLAY DEVICE COMPRISING A TN ALIGNMENT REGION CONTINUOUSLY CONNECTABLE WITH A BEND ALIGNMENT REGION, EACH REGION HAVING A DIFFERENT PRETILT DIRECTION AND THE METHOD OF FABRICATING THE SAME

BACKGROUND OF THE INVENTION

1. Field of the Invention

The present invention relates to a liquid crystal display device, and more particularly, to a liquid crystal display device suitably used for portable information equipment, notebook PCs, desktop monitors, television sets and the like, which require moving image display characteristics.

2. Description of the Related Art

Conventionally, liquid crystal display devices using a nematic liquid crystal material have been widely used as digit segment displays for watches, calculators and the like. In recent years, making full use of advantages of saving the space and consuming low power, liquid crystal display devices have come into wide use as displays for notebook PCs and desktop monitors. In particular, in the market of desktop monitors, it is no exaggeration to state that conventional CRT monitors have been increasingly replaced with LCD monitors. This trend has also spread to the market of TV monitors in which CRTs have long been a monopoly. Many manufacturers now actively make research and development with the aim of replacing CRT-TVs with LCD-TVs.

The hardest challenges to the spread of LCD-TVs are said to be the high-speed response characteristic capable of responding to moving images and the wide viewing angle characteristic independent of the angle at which an image is viewed. These are essential problems related to the electrooptic characteristics of liquid crystal materials, and various proposals have been made so far to tackle these challenges. As of today, however, no decisive solutions have yet been found. Under these circumstances, an optically compensated birefringence (OCB) mode has recently attracted attention as a mode capable of providing both the high-speed response characteristic and the wide viewing angle characteristic.

The OCB mode however has a very troublesome problem that initial transition from splay alignment to bend alignment is necessary before the device is driven. The splay-bend alignment transition has been analyzed in detail in the past, but the mechanism thereof has not yet been clarified.

The splay alignment and the bend (twist) alignment are topologically different in phase from each other. Therefore, change from splay alignment to bend alignment is possible only by shift of a disclination line separating these regions that are discontinuous from each other. In other words, a certain energy barrier exists to develop a bend-aligned region in a splay-aligned region. This energy barrier is considered comparatively low in places near spacers in the cell, flaws on alignment films probably produced during rubbing, places in which the alignment of liquid crystal molecules is disturbed for any reason, and the like. A bend-aligned region is said to develop and grow in the neighborhood of such a low energy-barrier place acting as a trigger (nucleus) when a voltage equal to or higher than a critical voltage (Vcr) at which the Gibbs free energy of the splay alignment is equal to that of the bend alignment is applied.

However, the transition to bend alignment (bend transition) brought by spacers, flaws, alignment disturbance and the like as described above largely depends on the probability, and therefore lacks in reliability and is poor in reproducibility. To ensure high-speed, reliable bend transition in all pixels of the entire panel, it is a requisite to form in advance at least one portion acting as the nucleus for the bend transition in each pixel.

For example, Japanese Laid-Open Patent Publication No. 11-7018 discloses a method in which high tilt-angle regions are partly provided in pixels to form regions bend-aligned in the initial stage or form regions that easily make the bend transition, and such regions are used as bend transition nuclei.

However, as discussed in the above publication No. 11-7018, to form high-tilt regions partly in pixels, it is necessary to form vertical alignment films partly after formation of horizontal alignment films, or perform phase separation using a special mixed alignment film material to form regions high in tilt angle and regions low in tilt angle. This considerably limits the kind of usable alignment film material. Also, if the method limits the usable liquid crystal material and alignment film material for formation of bend transition nuclei, it is not recommendable to adopt such a method from the standpoint of the fabrication process.

Japanese Laid-Open Patent Publication No. 9-96790, for example, discloses a method in which π-twist alignment is given as the initial alignment state by using a chiral agent-added liquid crystal material. In this technique, the π-twist alignment as the initial alignment continuously changes to pseudo-bend alignment only with application of a voltage, and thus the problem relating to the splay-bend transition can be avoided. The π-twist alignment may be virtually considered as uniaxial bend alignment as long as the voltage is high in the range of the drive voltage for a liquid crystal display device. The effect of flow effectively works in the relaxation time from a high voltage to a low voltage, as in pure bend alignment, and thus, the high-speed response characteristic of several msecs that is as fast as that obtained in the OCB mode can be obtained.

However, in the method described above, a large amount of a chiral agent must be added to attain the π-twist alignment as the initial alignment. It is necessary to add a chiral agent so that the ratio d/p is about 0.50 considering margins where d is the thickness of the liquid crystal cell and p is the natural chiral pitch of a chiral agent-added liquid crystal material. The addition of this amount of a chiral agent significantly degrades low-voltage optical characteristics, in particular, the transmittance characteristic at an azimuth angle of 45° under crossed-Nicols. This naturally degrades not only the optical characteristics of the liquid crystal panel observed from the front, but also the optical characteristics observed in slant directions, that is, the viewing angle characteristic.

SUMMARY OF THE INVENTION

To solve the problems described above, the object of the present invention is providing a liquid crystal display device that can be fabricated easily and can attain splay-bend transition of the liquid crystal layer reliably at high speed, and a method for fabricating such a liquid crystal display device.

A liquid crystal display device according to the present invention includes a pair of substrates, a liquid crystal layer placed between the pair of substrates and an alignment film placed on the side of at least one of the pair of substrates facing the liquid crystal layer, wherein the liquid crystal layer has a first region in which the pretilt direction of liquid crystal molecules of which the alignment is regulated with alignment regulating force of a surface of the alignment film is a first direction and a second region in which the pretilt direction is a second direction different from the first direction, and display is performed using bend alignment of the first region of the liquid crystal layer. In such a liquid crystal display device, the second region of the liquid crystal layer acts as the nucleus for splay-bend transition of the first region when a voltage equal to or higher than a splay-bend critical voltage (Vcr) is applied across the liquid crystal layer, and this enables high-speed, reliable bend transition in the first region.

Typically, the first region of the liquid crystal layer exhibits splay alignment during non-voltage application and bend alignment during voltage application.

It is preferable that the second region of the liquid crystal layer exhibits twist alignment.

It is preferable that TN alignment continuously connectable with bend alignment during application of a voltage equal to or higher than Vcr is trapped in the entire second region of the liquid crystal layer. With the trapping of TN alignment continuously connectable with bend alignment during application of a voltage equal to or higher than Vcr in the entire second region of the liquid crystal layer, the entire second region of the liquid crystal layer acts as the transition nucleus for splay-bend transition. This enables higher-speed, more reliable bend transition in the first region of the liquid crystal layer.

It is preferable that the liquid crystal display device has a plurality of pixels, and the liquid crystal layer in each of the plurality of pixels has the first region and the second region. With the liquid crystal layer having the first and second regions for each of the plurality of pixels, the bend transition is more ensured in the first region of each pixel.

Preferably, an angle $\psi$ formed between the first direction and the second direction satisfies $30° \leqq \psi \leqq 150°$. By this setting, the second region can act as a very effective splay-bend transition nucleus.

Preferably, an angle $\psi$ formed between the first direction and the second direction satisfies $70° \leqq \psi \leqq 110°$. By this setting, $\pi$ (180°) twist alignment developing when a high voltage, applied before actual driving to completely bend-align the first region, is shut off can be reliably trapped in the entire second region. This enables higher-speed, more reliable bend transition.

Considering easiness of formation of an alignment film for controlling the alignment of the liquid crystal layer, it is preferable that the second region is in the shape of a stripe extending in parallel with the second direction.

Preferably, the liquid crystal layer contains a chiral agent. With the chiral agent, the splay-bend alignment transition can be attained in the first region of the liquid crystal layer at higher speed.

Furthermore, when the liquid crystal layer contains a chiral agent, it is preferable that the amount of the chiral agent is controlled so that $0<d/p<0.50$ is satisfied where d is the thickness of the liquid crystal layer and p is the natural chiral pitch of the liquid crystal layer. By this setting, the bend alignment transition occurring when a voltage equal to or higher than the splay-bend critical voltage (Vcr) is applied can be attained more reliably at higher speed. In addition, the transmittance can be suppressed from decreasing when the liquid crystal device provides white display in actual driving.

In particular, when $0<d/p \leqq 0.15$ is satisfied, it is possible to provide a high-quality liquid crystal display device in which decrease in transmittance is hardly observed and no degradation in optical characteristics is observed, compared with a liquid crystal display device having no chiral agent added.

It is preferable that the liquid crystal layer contains a predetermined chiral agent selected so that the second region of the liquid crystal layer exhibits twist alignment free from splay distortion (i.e., uniform tilt state). With such a chiral agent, TN alignment continuously connectable with bend alignment during application of a voltage equal to or higher than Vcr can be trapped in the entire second region of the liquid crystal layer. Therefore, the entire second region of the liquid crystal layer acts as the transition nucleus for splay-bend transition of the first region of the liquid crystal layer. This enables higher-speed, more reliable bend transition in the first region of the liquid crystal layer.

A method for fabricating a liquid crystal display device according to the present invention includes the steps of:

providing a pair of substrates each having an electrode on its principal plane;

forming an alignment film on the electrode of at least one of the pair of substrates, the alignment film having a first alignment film region having alignment regulating force forcing the pretilt direction of liquid crystal molecules to be a first direction and a second alignment film region having alignment regulating force forcing the pretilt direction of liquid crystal molecules to be a second direction different from the first direction; and placing a liquid crystal layer between the pair of substrates, the liquid crystal layer having a first region in which the pretilt direction of liquid crystal molecules of which the alignment is regulated with the alignment regulating force of the alignment film is the first direction and a second region in which the pretilt direction of liquid crystal molecules of which the alignment is regulated with the alignment regulating force of the alignment film is the second direction, TN alignment continuously connectable with bend alignment being trapped in the entire second region. With this method, a more effective transition nucleus for splay-bend transition of the first region of the liquid crystal layer can be formed in the entire second region of the liquid crystal layer. Therefore, a liquid crystal display device permitting high-speed, reliable bend transition can be fabricated.

The step of placing a liquid crystal layer includes a step of providing a liquid crystal material containing a predetermined chiral agent, and the second region of the liquid crystal layer may exhibit twist alignment free from splay distortion during non-voltage application.

The step of placing a liquid crystal layer may include a step of performing alignment refresh treatment in which roughly the entire first region of the liquid crystal layer is bend-aligned, and then the bend alignment is changed to splay alignment via $\pi$-twist alignment.

The step of performing alignment refresh treatment is executed by applying a voltage twice or more as high as a splay-bend critical voltage across the liquid crystal layer for a predetermined time, for example.

It is preferable that an angle $\psi$ formed between the first direction and the second direction satisfies $70° \leqq \psi \leqq 110°$.

DETAILED DESCRIPTION OF PREFERRED EMBODIMENTS

Hereinafter, Embodiments 1 and 2 of the present invention will be described with reference to the relevant drawings.

Embodiment 1

Figure 2:
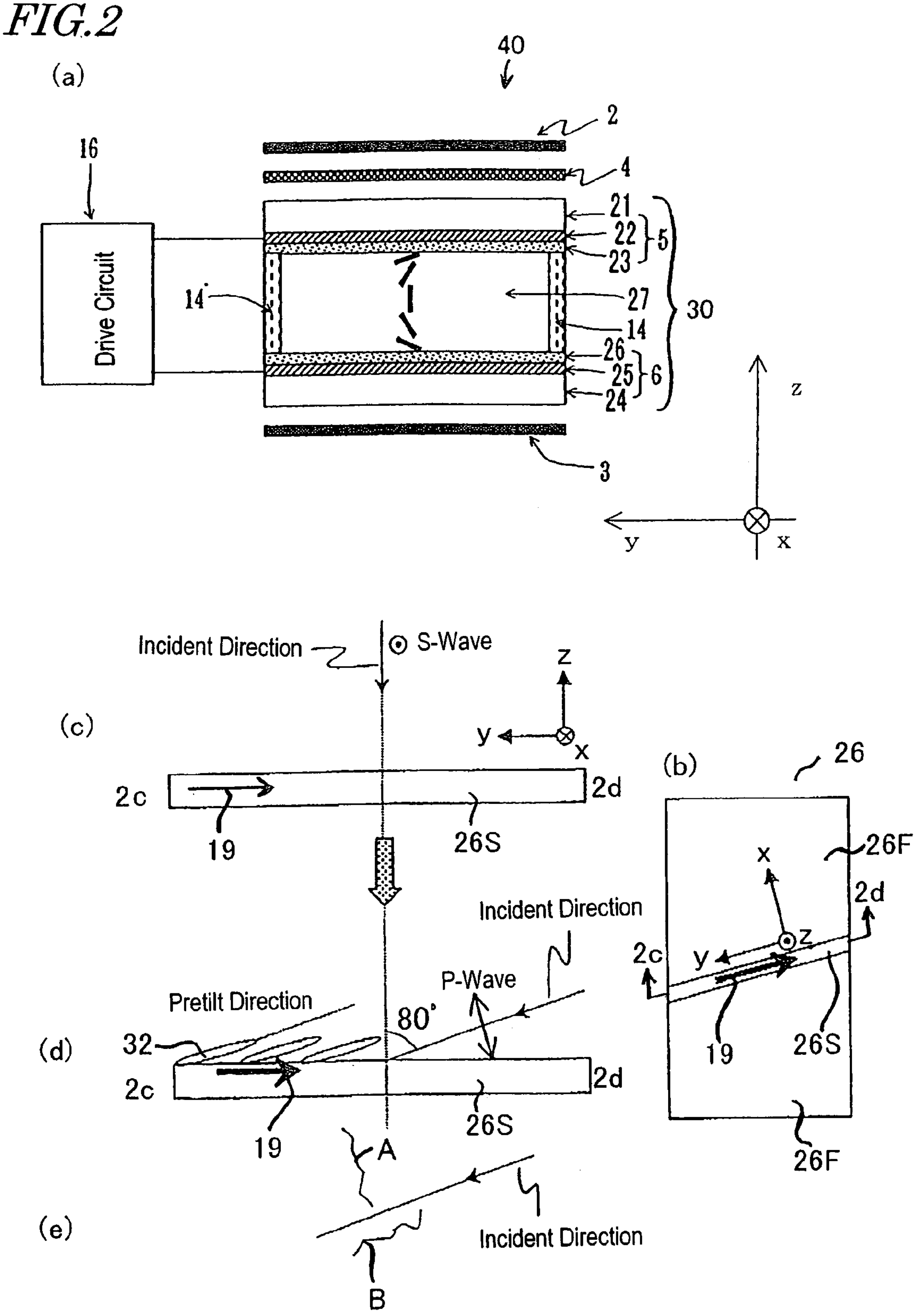
FIG. 2(*a*) is a cross-sectional view of a liquid crystal display device of an embodiment of the present invention, (*b*) is a plan view of an alignment film, (*c*) and (*d*) are cross-sectional views of the alignment film of (*b*), and (*e*) is a view diagrammatically showing the relationship between the light irradiation direction and polymer chains of the alignment film.

The liquid crystal display device of the present invention is an OCB mode liquid crystal display device that uses bend alignment of liquid crystal molecules for display and can preferably attain both the high-speed response characteristic and the wide viewing angle characteristic. As shown in FIG. 2(*a*), a liquid crystal display device 40 of an embodiment of the present invention includes a pair of polarizing plates (polarizers) 2 and 3, a liquid crystal element 30 interposed between the polarizing plates, an optical phase element 4 interposed between the polarizing plate 2 and the liquid crystal element 30, and a drive circuit 16 for driving the liquid crystal element 30. The liquid crystal element 30 includes a pair of electrode substrates 5 and 6 bonded together with seal resin 14 and a liquid crystal layer 27 formed in the space surrounded by the pair of electrode substrates 5 and 6 and the seal resin 14.

The electrode substrate 5 includes a substrate (transparent substrate) 21, a transparent electrode 22 formed on the surface of the substrate 21 facing the liquid crystal layer 27, and an alignment film 23 formed on the surface of the transparent electrode 22 facing the liquid crystal layer 27. Likewise, the electrode substrate 6 includes a substrate 24, a transparent electrode 25 formed on the surface of the substrate 24 facing the liquid crystal layer 27, and an alignment film 26 formed on the surface of the transparent electrode 25 facing the liquid crystal layer 27. The transparent electrodes 22 and 25 are connected to the drive circuit 16, so that a voltage corresponding to display data is applied across the liquid crystal layer 27 from the drive circuit 16 via the transparent electrodes 22 and 25. The substrates 21 and 24 are made of glass, for example, and the transparent electrodes 22 and 25 are made of ITO (indium tin oxide).

The liquid crystal element 30 shown in FIG. 2(*a*) corresponds to a region of one pixel. The transparent electrodes 22 and 25 are therefore shown as covering the entire surfaces of the substrates. Actually, however, the transparent electrodes 22 and 25 are respectively composed of a plurality of electrode strips each having a predetermined width, formed to cross (at right angles in this embodiment) each other as viewed in the direction normal to the substrate surface. Each of the crossings of the transparent electrodes 22 and 25 corresponds to a pixel working for display, and such pixels are arranged in a matrix over the entire liquid crystal display device.

Figure 1:
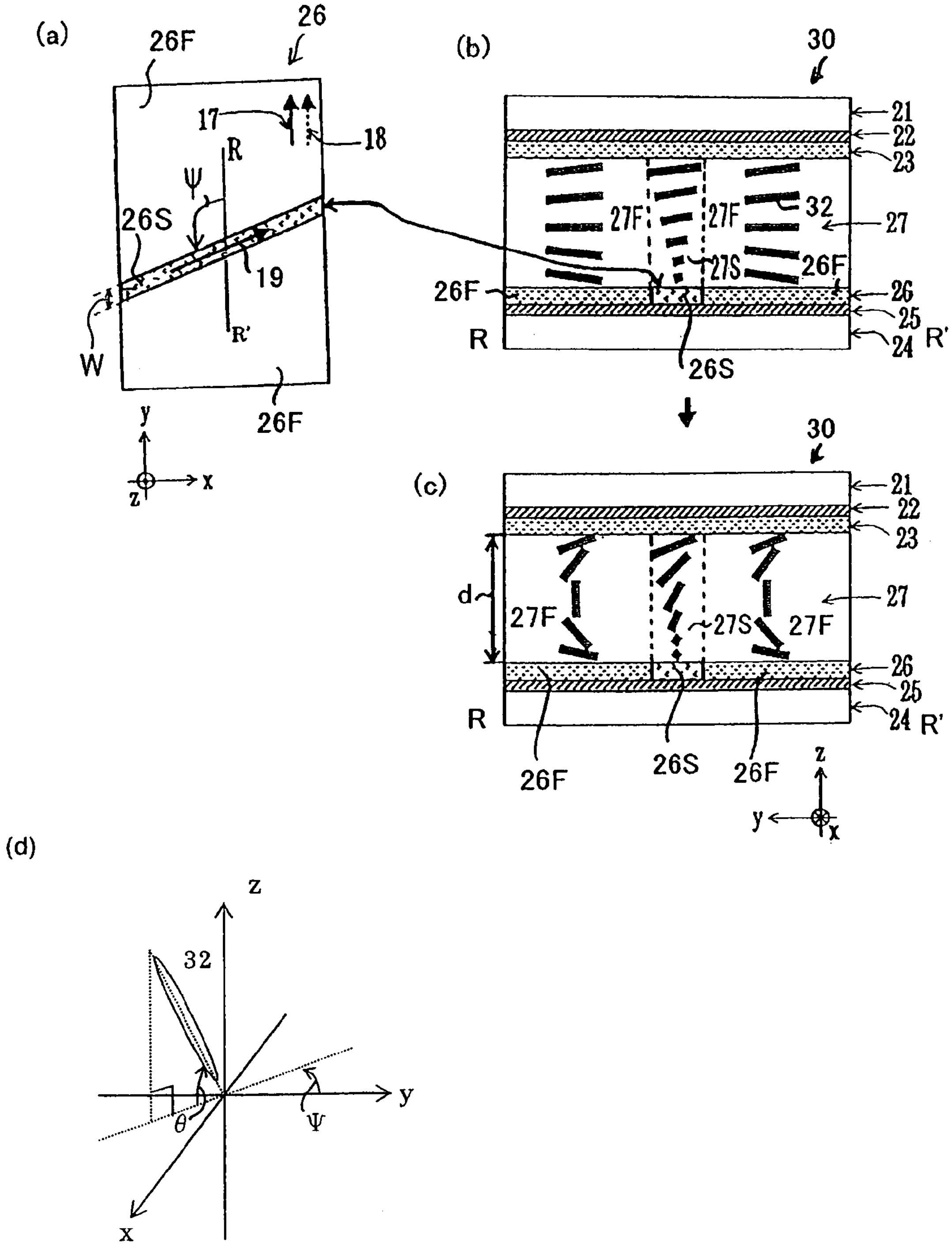
FIG. 1 diagrammatically shows a construction of a liquid crystal element in an embodiment of the present invention, where (a) is a plan view of an alignment film used in the liquid crystal element, (b) and (c) are cross-sectional views of the liquid crystal element observed during non-voltage application and during voltage application, respectively, and (d) is a view showing a pretilt direction and a pretilt angle.

Hereinafter, the liquid crystal element 30 of the liquid crystal display device 40 will be described with reference to FIG. 1. Note that hereinafter, description will be made for one pixel of the liquid crystal element 30 for simplification. FIG. 1 diagrammatically shows a construction of the liquid crystal element 30. FIG. 1(*a*) is a plan view of the alignment film 26 of the liquid crystal element, and FIGS. 1(*b*) and (*c*) are cross-sectional views of the liquid crystal element taken along line R—R' of FIG. 1(*a*), observed during non-voltage application in FIG. 1(*b*) and during voltage application in FIG. 1(*c*).

In the liquid crystal element 30 in this embodiment, the liquid crystal layer 27 interposed between the alignment films 23 and 26 has a first liquid crystal region 27F and a second liquid crystal region 27S. The first liquid crystal region 27F exhibits splay alignment as shown in FIG. 1(*b*) during non-voltage application and bend alignment as shown in FIG. 1(*c*) during application of a predetermined voltage. This bend alignment of the first liquid crystal region 27F is used for display of the liquid crystal display device 40. In the liquid crystal element 30, transition from splay alignment to bend alignment is made in the first liquid crystal region 27 to enable display. Therefore, the pretilt angle θ in the first liquid crystal region 27F must satisfy $0 \leqq \theta \leqq 45°$ during non-voltage application. The pretilt angle as used herein refers to the angle θ formed between the major axes of liquid crystal molecules 32 (liquid crystal molecules existing near the interface between an alignment film and the liquid crystal layer) of which the alignment is regulated with the alignment regulating force of the surface of the alignment film and the substrate surface, in an X-Y-Z coordinate system defined in the principal plane of the substrate as shown in FIG. 1(*d*). In the liquid crystal element 30 of this embodiment, the first liquid crystal region 27F must be splay-aligned, and for this, the pretilt angle θ must satisfy $0 \leqq \theta < 45°$. The reason is as follows. In general, when the pretilt angle θ of liquid crystal molecules is less than 45°, splay alignment is lower in Gibbs free energy and thus more stable than bend alignment. When the pretilt angle θ exceeds 45°, bend alignment is more stable.

The liquid crystal element 30 in this embodiment has a feature that the pretilt direction (first direction) of liquid crystal molecules in the first liquid crystal region 27F is different from the pretilt direction (second direction) of liquid crystal molecules in the second liquid crystal region 27S in the area near the alignment film 26. The pretilt direction as used herein refers to the azimuth direction (azimuth angle ψ) indicated by the major axes of the liquid crystal molecules 32 of which the alignment is regulated with the alignment regulating force of the surface of the alignment film, in the x-y-z coordinate system defined in the principal plane of the substrate as shown in FIG. 1(*d*). Note that since the pretilt direction of the liquid crystal molecules is defined by the alignment regulating force of the alignment film, the direction of the alignment regulating force of the alignment film itself is also sometimes expressed by the wording "pretilt direction".

The pretilt direction and the pretilt angle described above are defined by the alignment films 23 and 26 formed in contact with the liquid crystal layer 27. In this embodiment, the pretilt direction of the liquid crystal molecules 32 is defined by the rubbing of the alignment films 23 and 26.

Hereinafter, rubbing of the alignment films 23 and 26 will be described with reference to FIG. 1(*a*).

The surface of the alignment film 26 on the lower substrate 24 includes a first alignment film region 26F rubbed in a first direction (direction of arrow 17 in FIG. 1(*a*)) and a second alignment film region 26S rubbed in a second direction (direction of arrow 19) different from the first direction. The second direction is set at the angle ψ from the first direction as shown in FIG. 1(*a*) and, as will be described in Example 1 later, the angle ψ is preferably set to satisfy $30° \leqq \psi \leqq 150°$. The second alignment film region 26S is in the shape of a stripe extending in the direction of rubbing of the second alignment film region 26S (second direction 19).

Adoption of the stripe shape extending in the rubbing direction for the second alignment film region 26S provides effects of facilitating pattern formation of a mask used in formation of the second alignment film regions 26S on the alignment film and giving uniform rubbing of the second alignment film regions 26S. The shape of the second alignment film region 26S is not limited to this, but, as will be described later with reference to FIG. 7, various shapes can be adopted.

When one second alignment film region 26S is formed for one pixel, the second alignment film region 26S is preferably formed to cross the opposite major sides of the pixel and also be located roughly in the center of the pixel, so that two parts of the first alignment film region 26F separated by the second alignment film region 26S have roughly the same area. By forming in this way, the time required for the splay-bend transition in the liquid crystal layer can be made shorter.

Moreover, in consideration of effective formation of splay-bend transition nuclei and prevention of decrease in display area, the width w of the second alignment film region 26S in one pixel (for example, 80 μm×240 μm) is preferably in the range of 5 μm to 60 μm. The area of the second alignment film region 26S is preferably about 1/48 to 1/4 with respect to the area of one pixel as 1.

As described above, the first alignment film region 26F of the alignment film 26 on the lower substrate 24, which is in contact with the first liquid crystal region 27F, is rubbed in the first direction, to regulate the pretilt direction of liquid crystal molecules near the first alignment film region 26F to the first direction. Also, the second alignment film region 26S of the alignment film 26 on the lower substrate 24, which is in contact with the second liquid crystal region 27S, is rubbed in the second direction, to regulate the pretilt direction of liquid crystal molecules near the second alignment film region 26S to the second direction.

The alignment film 23 on the upper substrate 21 is roughly entirely rubbed in the first direction (direction of arrow 18), so that the pretilt direction of liquid crystal molecules near the alignment film 23 is regulated to the first direction. Since the rubbing direction of the alignment film 23 and the rubbing direction of the first alignment film region 26F of the alignment film 26 are in parallel with each other, the pretilt direction in the first liquid crystal region 27F is the first direction both in the portions near the alignment films 23 and 26, and thus the first liquid crystal region 27F exhibits splay alignment.

By rubbing the alignment films 23 and 26 as described above, the pretilt direction of liquid crystal molecules can be made discontinuous between the first liquid crystal region 27F and the second liquid crystal region 27S in the area of the liquid crystal layer 27 near the alignment film 26 on the substrate 24, and also the liquid crystal molecules in the first liquid crystal region 27F can be splay-aligned, during non-voltage application as shown in FIG. 1(*b*). When a voltage equal to or higher than a splay-bent critical voltage (Vcr) is applied across the liquid crystal layer 27 in the above alignment state, the second liquid crystal region 27S acts as the nucleus (bend transition nucleus) for allowing the liquid crystal molecules in the first liquid crystal region 27F to make transition from the splay alignment to bend alignment, enabling high-speed, reliable splay-bend transition in the first liquid crystal region 27F, as shown in FIG. 1(*c*).

Next, a formation method for the alignment films 23 and 26 will be described. First, a polyimide film, for example, is formed on the transparent electrode 22 on the upper substrate 21 and the transparent electrode 25 on the lower substrate 26, and roughly the entire surfaces of the resultant alignment films 23 and 26 are rubbed in the first direction (direction of arrows 17 and 18). Thereafter, as for the alignment film 26, the first alignment film region 26F is masked, and the exposed second alignment film region 26S is rubbed in the second direction (direction of arrow 19) that is at the angle ψ from the first direction. In this way, the first alignment film region 26F rubbed in the first direction and the second alignment film region 26S rubbed in the second direction at the angle ψ from the first direction are formed on the alignment film 26. In this way, the alignment films 23 and 26 are formed.

Alternatively, an optical alignment film may be used for the alignment films 23 and 26 in this embodiment. Hereinafter, as an example, a formation method for an optical alignment film will be described. A polyvinyl cinnamate (PVCi) film is formed on the transparent electrode 22 on the upper substrate 21 and the transparent electrode 25 on the lower substrate 24, and the entire surfaces of the resultant alignment films are rubbed in the first direction. As for the polyvinyl cinnamate (PVCi) film on the lower substrate 26, after the rubbing of the entire surface, only the second region 26S is irradiated with deep UV light (wavelength: 254 nm). The formation method for the second region 26S will be described with reference to FIG. 2(*b*), (*c*), (*d*) and (*e*). FIG. 2(*b*) is a plan view of the alignment film (PVCi film) 26, and FIGS. 2(*c*) and (*d*) are cross-sectional views of the PVCi film 26 taken along line 2*c*–2*d* of FIG. 2(*b*). FIG. 2(*e*) is a view diagrammatically showing the relationship between the light irradiation direction in FIG. 2(*d*) and polymer chains.

First, as shown in FIG. 2(*c*), the second region 26S in FIG. 2(*b*) is irradiated with S-wave deep UV polarized light in a light amount of 1 J/cm$^2$ from the front. By this irradiation with the S-wave deep UV polarized light, polymer chains extending in the direction of oscillation of the S-wave are cut off. Thereafter, as shown in FIG. 2(*d*), the second region 26S is irradiated with P-wave deep UV polarized light in a light amount of 1 J/cm$^2$ in an oblique direction (for example, at an incident angle of 80°). By this irradiation with the P-wave deep UV polarized light, polymer chains A (FIG. 2(*e*)) extending in the direction of oscillation of the P-wave deep UV polarized light are cut off, while polymer chains B (FIG. 2(*e*)) extending vertical to the direction of oscillation of the P-wave are left uncut. As a result, the pretilt direction of the liquid crystal molecules 32 is determined as the direction in which the polymer chains B extend.

As described above, by appropriately adjusting the direction of the incident polarized light and the like, the pretilt direction of the second region of the alignment film 26 is controlled, and in this way, the alignment films 23 and 26 are formed.

The liquid crystal layer 27 of the liquid crystal element 30 in this embodiment was observed with a polarizing microscope to check the alignment state of the liquid crystal layer 27. The observation was made by arranging the rubbing direction to agree with the direction of the polarizer under crossed-Nicols. As a result, the first liquid crystal region 27F appeared black in the extinction position. From this, it was confirmed that in the first liquid crystal region 27F, the direction of liquid crystal molecules agreed with the direction of the polarizer and the liquid crystal molecules were in splay alignment.

On the contrary, in the second liquid crystal region 27S, it was observed that no extinction position existed and the incident polarized light was rotated. From this, it was confirmed that in the second liquid crystal region 27S, liquid crystal molecules were twisted.

In this embodiment, the first liquid crystal region 27F exhibited splay alignment and the second liquid crystal region 27S exhibited twist alignment. The alignment states of the liquid crystal element in the present invention are not limited to these. As long as the pretilt direction of the first liquid crystal region is different from that of the second liquid crystal region in the area near the surface of at least one alignment film, the second liquid crystal region 27S can act as the bend transition nucleus, and thus, substantially the same effect can be obtained.

In this embodiment, the second alignment film region 26S as a region discontinuous in pretilt direction was provided inside each pixel for the alignment film 26 on the lower substrate 24. The position of the second alignment film region 26S is not limited to this. For example, the second alignment film region may be provided for the alignment film 23 on the upper substrate 21, or may be provided for both the alignment film 23 on the upper substrate 21 and the alignment film 26 on the lower substrate 24. Otherwise, the second alignment film region may be provided outside each pixel.

In this embodiment, the alignment films 23 and 26 are respectively formed on the upper and lower substrates 21 and 24. Substantially the same effect as that obtained according to the present invention can also be obtained by providing an alignment film on at least one of the substrates, and thus the other alignment film may be omitted as appropriate.

A chiral agent may be added to the liquid crystal layer 27 of the liquid crystal element in this embodiment, to enable the second liquid crystal region 27S of the liquid crystal layer 27 to act as the bend transition nucleus more effectively. In particular, as will be described later in detail in Example 2, by determining the added amount of a chiral agent so that the ratio d/p of the thickness d of the liquid crystal layer to the natural chiral pitch p of the chiral agent-added liquid crystal layer satisfies $0<d/p<0.50$, it is possible to make the second liquid crystal region 27S of the liquid crystal layer 27 act as a highly effective bend transition nucleus, and also suppress decrease in transmittance when the liquid crystal display device provides white display in actual driving.

The added amount of the chiral agent is more preferably set to satisfy $0<d/p\leqq 0.15$. By this setting, decrease in transmittance can be almost suppressed, compared with a liquid crystal sample containing no chiral agent, when the liquid crystal display device provides white display in actual driving.

Hereinafter, Examples 1 and 2 of the present invention will be described.

EXAMPLE 1

Liquid crystal display devices of Example 1 have substantially the same structure as the liquid crystal display device 40 of the embodiment described above with reference to FIGS. 1 and 2(*a*) and are prepared in substantially the same manner as that in the embodiment. In Example 1, the rubbing direction of the second alignment region 26S (region discontinuous in rubbing direction) of the alignment film 26 on the lower substrate 24 was changed variously to prepare a plurality of liquid crystal display devices.

Specifically, five liquid crystal display devices (samples #11 to #15) shown in Table 1 below were prepared by varying the angle ψ formed between the first rubbing direction (direction of arrows 17 and 18 in FIG. 1(*a*)) and the second rubbing direction (direction of arrow 19) of the alignment film 26 in the range of 30° to 150° inclusive. The second alignment film region 26S is in the shape of a stripe extending in the rubbing direction of the second alignment film region 26S as shown in FIG. 1(*a*). The rubbing direction (direction of arrow 17) of the first alignment film region 26F of the alignment film 26 on the lower substrate 24 and the rubbing direction (direction of arrow 18) of the alignment film 23 on the upper substrate 21 are in parallel with each other.

For comparison, three liquid crystal display devices (samples #201 to #203) of which the angle ψ described above falls outside the range $30°\leqq\psi\leqq 150°$ and a liquid crystal display device (sample #204) that has not such a region as the second alignment film region 26S were also prepared as in the preparation of the samples of Example 1. Note that in sample #201, the rubbing direction (direction of arrow 17) of the first alignment film region 26F and the rubbing direction (direction of arrow 18) of the alignment film 23 on the upper substrate 21 are opposite to each other.

TABLE 1

| Sample | #11 | #12 | #13 | #14 | #15 | #201 | #202 | #203 | #204 |
|---|---|---|---|---|---|---|---|---|---|
| ψ (°) | 30 | 60 | 90 | 120 | 150 | 0 | 15 | 165 | No region |

A voltage of square wave of 6 V and 1 kHz was applied for samples #11 to #15 and comparative samples #201 to #204, and the observation results during the voltage application are shown in Table 2. The observation results of the liquid crystal layers of sample #14 of this example and sample #204 of the comparative example during the voltage application are diagrammatically shown in FIGS. 3 and 4, respectively.

TABLE 2

| Sample | Observation results of bend transition |
|---|---|
| #11 | Bend transition nuclei develop from part of the second liquid crystal region, and a bend-aligned region expands. |
| #12 | Bend transition nuclei develop from roughly the entire second liquid crystal region, and a bend-aligned region expands. |
| #13 | Bend transition nuclei develop from roughly the entire second liquid crystal region, and a bend-aligned region expands. |
| #14 | Bend transition nuclei develop from roughly the entire second liquid crystal region, and a bend-aligned region expands. |
| #15 | Bend transition nuclei develop from part of the second liquid crystal region, and a bend-aligned region expands. |
| #201 | No change with no development of bend transition nuclei. |
| #202 | Although bend transition nuclei develop from a very limited part of the second liquid crystal region, there is no expansion of a bend-aligned region. |
| #203 | Although bend transition nuclei develop from a very limited part of the second liquid crystal region, there is no expansion of a bend-aligned region. |
| #204 | No change with no development of bend transition nuclei. |

Figure 3:
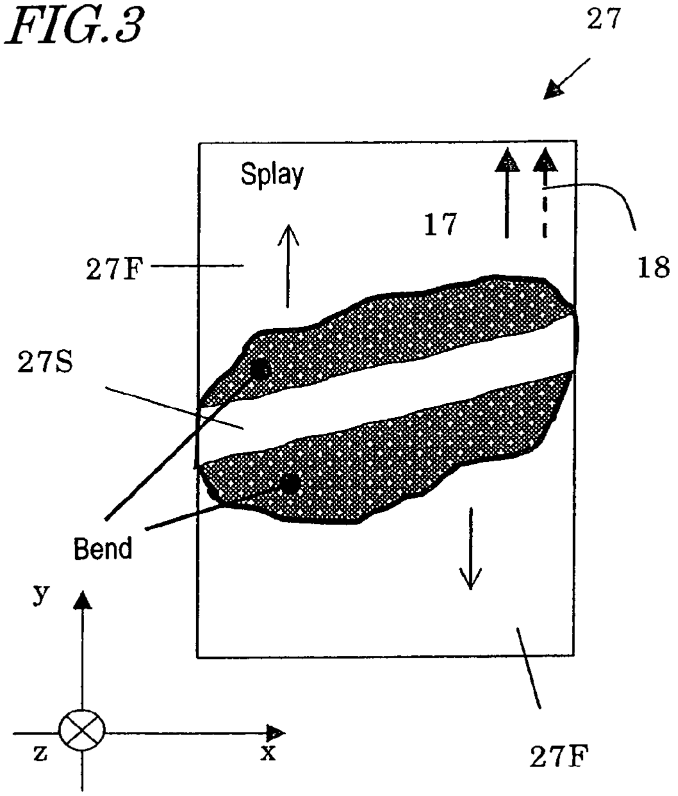
FIG. 3 is a view diagrammatically showing the observation results of a liquid crystal layer of a liquid crystal element in Example 1 viewed in the direction normal to the substrate.

From Table 2 and FIG. 3, it is found that for samples #11 to #15 of this example, the second liquid crystal region acts as the nucleus for effectively triggering the first liquid crystal region to make splay-bend transition with application of a voltage of about 6 V, and further the bend-aligned region that has developed in the first liquid crystal region expands. In particular, in samples #12 to #14, nuclei for the bend alignment develop from roughly the entire second liquid crystal region as shown in FIG. 3, indicating that the second liquid crystal region acts more effectively compared with that in samples #11 and #15.

Figure 4:
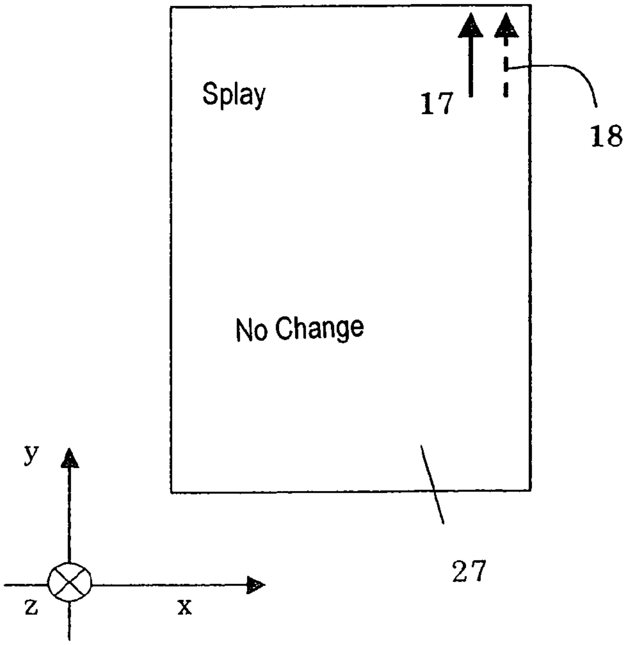
FIG. 4 is a view diagrammatically showing the observation results of a liquid crystal layer of a liquid crystal element in a comparative example viewed in the direction normal to the substrate.

On the contrary, as shown in Table 2 and FIG. 4, for comparative samples #201 and #204, no bend transition nuclei develop at all. For comparative samples #202 and #203, although bend transition nuclei develop from a very limited part of the second liquid crystal region, there is no expansion of a bend-aligned region. Accordingly, in any of comparative samples #201 to #204, the second liquid crystal region is not considered acting as the bend transition nucleus.

Figure 5:
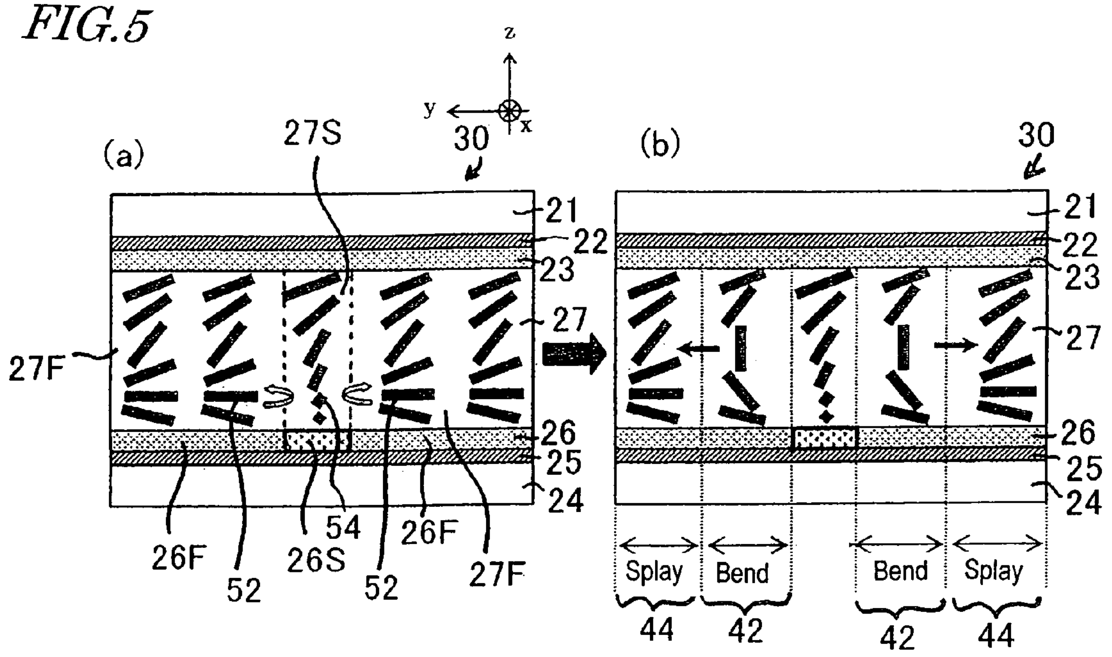
FIGS. 5(*a*) and (*b*) are cross-sectional views of a liquid crystal element in Example 1 for demonstrating the mechanism of bend transition in the liquid crystal element.
Figure 6:
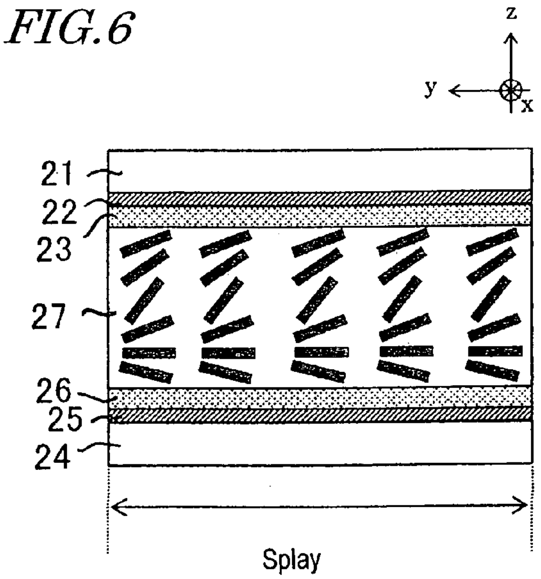
FIG. 6 is a cross-sectional view of a liquid crystal element in the comparative example.

FIG. 5 diagrammatically shows the mechanism of the action of the second liquid crystal region as the bend transition nucleus, in which (a) shows the state during non-voltage application and (b) shows the state during voltage application. As shown in FIG. 5(*a*), during non-voltage application, liquid crystal molecules of the second liquid crystal region 27S are aligned in the rubbing direction (second direction) of the second alignment film region 26S in the portion near the alignment film 26. The second direction is different from the rubbing direction (first direction) of the first alignment film region 26F. The first liquid crystal region 27F exhibits splay alignment, and the second liquid crystal region 27S exhibits twist alignment.

When a voltage equal to or higher than the splay-bend critical voltage (Vcr) is applied to the liquid crystal layer 27 in the state described above, distortion is most concentrated on liquid crystal molecules 52 in the portion of the first liquid crystal region 27F near the second alignment film region 26S. To be relieved from this distortion, the liquid crystal molecules 52 rotate to match with the alignment direction of liquid crystal molecules 54 in the portion of the second liquid crystal region 27S near the second alignment film region 26S. With this torque of the liquid crystal molecules 52, liquid crystal molecules in the first liquid crystal region 27F are urged to rotate in the direction toward the alignment film 23 from the alignment film 26. The angle of this rotation depends on the angle ψ ($30° \leqq \psi \leqq 150°$) formed between the rubbing direction of the second alignment film region 26S and the rubbing direction of the first alignment film region 26F. At this time, since the applied voltage is equal to or higher than the critical voltage Vcr, it is more stable for the liquid crystal molecules in the first liquid crystal region 27F to make transition to bend alignment than to resume the splay alignment from the standpoint of energy. Accordingly, as shown in FIG. 5(*b*), a bend-aligned region 42 effectively develops and expands into a splay aligned region 44.

On the contrary, in comparative samples #201 and #204 in which no second liquid crystal region exists at all, the liquid crystal alignment of the entire liquid crystal layer is kept in splay alignment, with no bend transition nucleus formed. In comparative samples #202 and #203, in which the rubbing directions of the first alignment film region 26F and the second alignment film region 26S are close to each other, the pretilt directions in the first liquid crystal region 27F and the second liquid crystal region 27S are close to each other. This fails to rotate the liquid crystal molecules in the portion in which the distortion of the splay alignment is concentrated by a sufficient angle, and thus its action as the bend transition nucleus is weakened.

In this example, described were the liquid crystal display devices having the stripe-shaped second alignment film region 26S only for the alignment film 26 on the lower substrate 24. The position of the second alignment film region is not limited to this, but the second alignment film region may be provided for both the alignment film 23 on the upper substrate 21 and the alignment film 26 on the lower substrate 26.

Hereinafter, examples of positions of the second alignment film region for both the alignment films 23 and 26 will be described with reference to FIG. 7. The second alignment film region of the alignment film 23 is denoted by 23S.

FIGS. 7(A) to (F) show transparent plan views of various examples of the alignment films 23 and 26. Arrow 18 indicates the rubbing direction of the first alignment film region of the alignment film 23 on the upper substrate 21, and arrow 17 indicates the rubbing direction of the first alignment film region of the alignment film 26 on the lower substrate 24. These rubbing directions are parallel to each other. Arrow 48 indicates the rubbing direction of the second alignment film region 23S of the alignment film 23 on the upper substrate 21, and arrow 47 indicates the rubbing direction of the second alignment film region 26S of the alignment film 26 on the lower substrate 24.

In the alignment films shown in FIGS. 7(A), (B) and (C), the second alignment film regions 23S and 26S are in the shape of a stripe crossing the pixel. In the alignment films shown in FIGS. 7(D) and (E), the second alignment film regions 23S and 26S are in the shape of a plurality of stripes linked to each other. In these alignment films shown in FIG.

7(A) to (E), the rubbing directions of the second alignment films regions 23S and 26S are respectively parallel to the directions of extension of the stripes.

Figure 7:
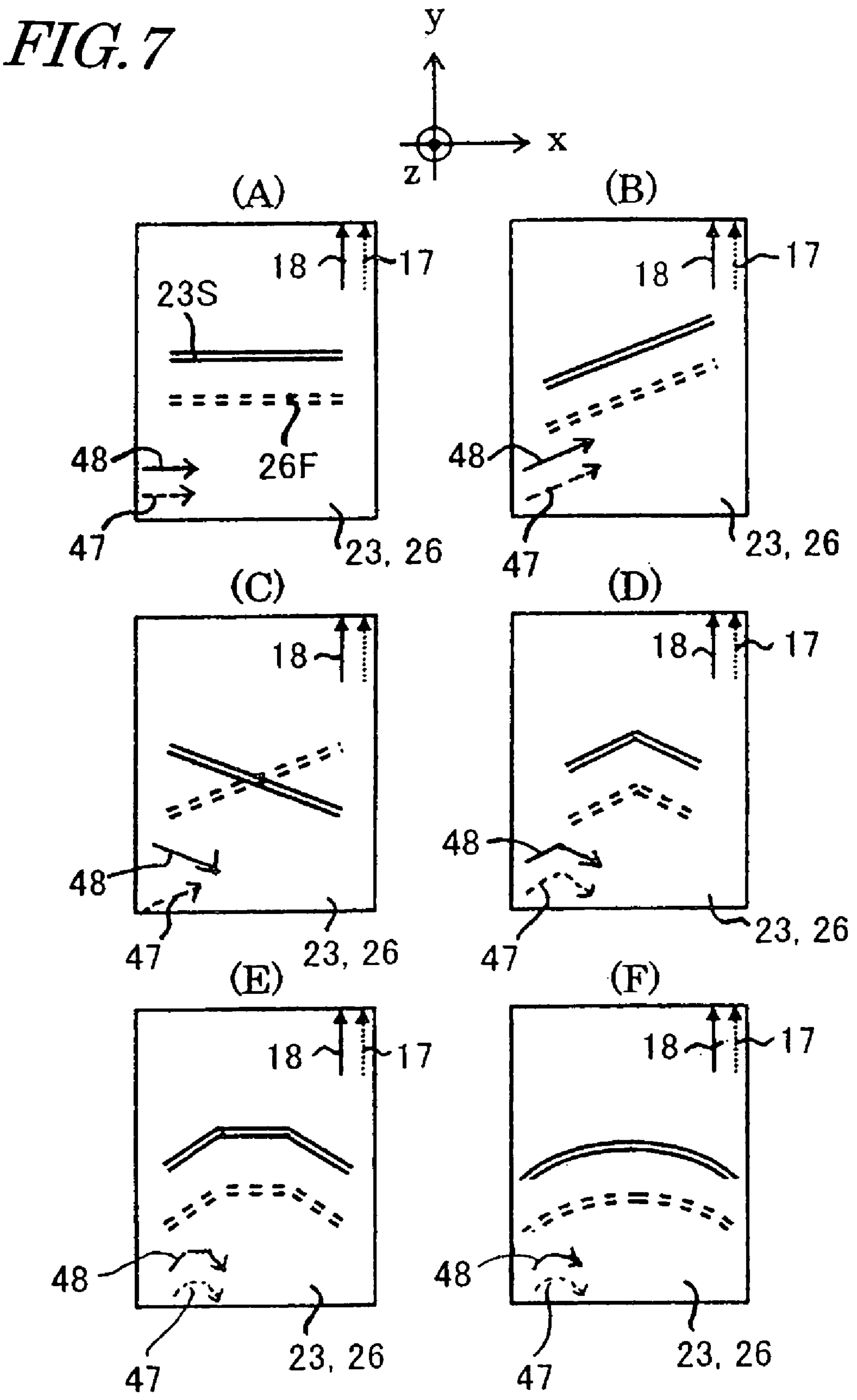
FIGS. 7(A) to 7(F) are views illustrating alignment films applicable to liquid crystal elements in Example 1.

In FIG. 7(F), the second alignment film regions 23S and 26S have a shape of a given curvature. In the case of FIG. 7(F), the angle ψ formed between the tilt of the tangent at a given point in the second alignment film region and the rubbing direction of the second alignment film region preferably satisfies 30°≦ψ≦150°. Although the shapes allowable for the second alignment film regions 23S and 26S were exemplified with reference to FIG. 7, an optimum shape may be individually determined appropriately so that the transition to bend alignment can be attained in the shortest time, depending on the size and shape of pixels of the display device.

As shown in FIGS. 7(A) to (F), the second alignment film regions 23S and 26S preferably do not overlap each other and are displaced from each other in the x-y plane (see the xyz coordinate system in FIG. 7) that is, in the direction normal to the substrates 21 and 24. The second liquid crystal region 27S can be formed to act as the bend transition nucleus more effectively when it exhibits twist alignment than splay alignment. Accordingly, the displacement between the second alignment film regions 23S and 26S from each other described above is preferred because with this displacement, the second liquid crystal region 27S can be twisted. The optimum value of the displacement should preferably be determined appropriately depending on the size of pixels of the liquid crystal panel, the aperture ratio and the like.

EXAMPLE 2

In Example 2, the amount of the chiral agent added to the liquid crystal layer was changed variously, to prepare liquid crystal display devices similar to the liquid crystal display device 40 of the embodiment described above in much the same manner as that in the above embodiment. Specifically, prepared were four liquid crystal display devices (samples #31 to #34) having values of the ratio of the thickness d of the liquid crystal layer of the liquid crystal element 30 to the natural chiral pitch p of the chiral agent-added liquid crystal layer shown in Table 3 below. The values of d/p of the samples of Example 2 are set to fall within the range between 0 and less than 0.50.

In the liquid crystal elements in Example 2, the second alignment film region 26S is provided only for the alignment film 26 on the lower substrate 24. Also, the angle ψ formed between the rubbing direction 19 of the second alignment film region 26S and the rubbing direction 17 of the first alignment film region 26F is set at 120°. The second alignment film region 26S is in the shape of a stripe extending in the rubbing direction 19 and has a width of 50 μm. The size of the substrates 21 and 24 and the alignment films 23 and 26 is 20 mm vertically×10 mm horizontally.

For comparison, two liquid crystal display devices (samples #401 and #402) having values of d/p falling outside the range described above were also prepared as in the preparation of the samples of Example 2.

TABLE 3

| Sample | #31 | #32 | #33 | #34 | #401 | #402 |
|---|---|---|---|---|---|---|
| d/p | 0 | 0.15 | 0.30 | 0.45 | 0.50 | 0.75 |

A voltage of square wave of 6 V and 1 kHz was applied to samples #31 to #34 and comparative samples #401 and #402, and the results were observed with a polarizing microscope. The observation was made under operation in the normally white mode with the polarizer arranged under crossed-Nicols. The observation results are shown in Table 4. The application of the voltage of square wave of 6 V and 1 kHz was halted (voltage 0) after the entire liquid crystal layer made bend transition. The observation results at this time are shown in Table 5. Under the voltage 0, the bend alignment instantaneously (in several tens of msecs) changes to 180°-twist alignment.

Figure 8:
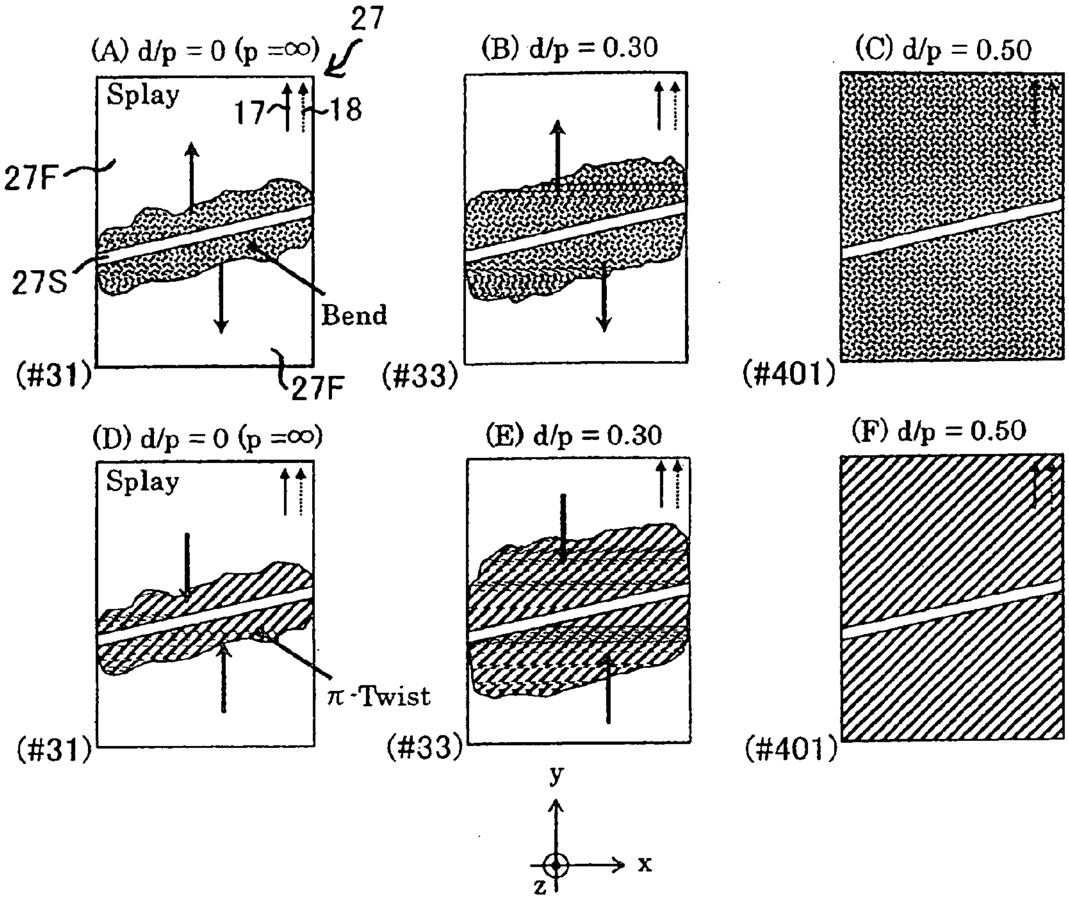
FIGS. 8(A), (B), (D) and (E) are views diagrammatically showing the observation results of liquid crystal layers of liquid crystal elements in Example 2, and FIGS. (C) and (F) are views diagrammatically showing the observation results of a liquid crystal layer of a liquid crystal element in a comparative example.
Figure 9:
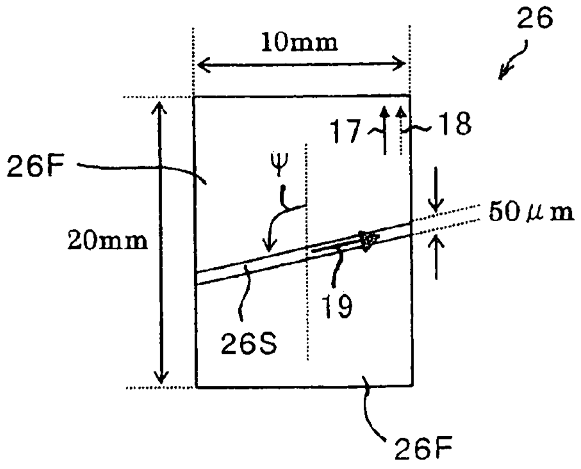
FIG. 9 is a plan view of an alignment film of a liquid crystal element in Example 2.

The observation results during the application of the voltage and after the halt of the voltage application are also diagrammatically shown in FIG. 8. In FIG. 8, samples #31 and #33 and sample #401 are shown representing Example 2 and the comparative example, respectively. FIG. 8(A), (B) and (C) show the states observed when the voltage of square wave of 6 V and 1 kHz was applied, and FIG. 8(D), (E) and (F) show the states observed when the applied voltage was shut off after the entire layer made bend transition. FIG. 8(A) and (D) show sample #31 of this example, FIG. 8(B) and (E) show sample #33 of this example, and FIG. 8(C) and (F) show comparative sample #401.

Table 6 shows the time required for the entire liquid crystal layer to make transition to bend alignment from the moment at which the voltage of square wave of 6V and 1 kHz was applied, for samples #31 to #34 and comparative samples #401 and #402. The voltage of square wave of 6V and 1 kHz was shut off after the entire liquid crystal layer made the bend transition. Table 7 shows the time required for the entire liquid crystal layer to resume the splay alignment from the moment at which the voltage was shut off.

TABLE 4

| Sample | Observation results of splay → bend transition |
|---|---|
| #31 | The expansion rate of the bend-aligned region is slow. |
| #32 | The expansion rate of the bend-aligned region is slow. |
| #33 | The expansion rate of the bend-aligned region is fast. |
| #34 | The expansion rate of the bend-aligned region is very fast. |
| #401 | The entire layer is already 180°-twisted in the non-applied state and continuously changes to bend alignment upon application. |
| #402 | The entire layer is already 180°-twisted in the non-applied state and continuously changes to bend alignment upon application. |

TABLE 5

| Sample | Observation results of bend (180° twist) → splay transition |
|---|---|
| #31 | The shrinkage rate of the 180°-twisted region is fast. |
| #32 | The shrinkage rate of the 180°-twisted region is fast. |
| #33 | The shrinkage rate of the 180°-twisted region is slow. |
| #34 | The shrinkage rate of the 180°-twisted region is very slow. |
| #401 | The entire 180°-twisted state is maintained. |
| #402 | The entire 180°-twisted state is maintained. |

TABLE 6

| Sample | Splay → bend transition time (sec) |
|---|---|
| #31 | 25 |
| #32 | 17 |
| #33 | 6 |
| #34 | 3 |
| #401 | 0 |
| #402 | 0 |

TABLE 7

| Sample | Bend (180° twist) → splay transition time (sec) |
|---|---|
| #31 | 55 |
| #32 | 98 |
| #33 | 210 |
| #34 | 450 |
| #401 | ∞ |
| #402 | ∞ |

From Tables 4 and 6, the following are found. In samples #31 to #34 of this example, with application of a voltage of about 6 V, the bend alignment transition effectively proceeds in the first liquid crystal region from the second liquid crystal region acting as the nucleus. The rate of expansion of the bend-aligned region is however different among the samples. Specifically, it is found that with increase of the added amount of the chiral agent, that is, with increase of the ratio d/p of the cell thickness d to the chiral pitch p of the liquid crystal layer, the rate of expansion of the bend-aligned region is faster.

However, when the chiral agent is added by an amount as large as those in comparative examples #401 and #402, the liquid crystal layer is 180°-twisted even in the initial state of non-voltage application, in which the major axes of liquid crystal molecules are twisted by 180° as a whole toward the alignment film 26 from the alignment film 23. When a voltage is applied across the liquid crystal layer that is already 180°-twisted in the initial state, the liquid crystal layer continuously changes to bend alignment from the 180°-twist alignment without the necessity of the bend transition. When the resultant liquid crystal display device is actually driven, a problem arises during white display that the liquid crystal layer shifts from bend alignment to twist alignment in a short time of several to several tens of msecs, and this significantly decreases the transmittance, although no problem arises during black display. It is therefore concluded that although the added amount of the chiral agent (value of d/p) is preferably large from the standpoint of facilitating the bend transition, it is preferably small from the standpoint of the transmittance (luminance of the panel) during white display in actual driving.

From Tables 5 and 7, it is found that while samples #31 to #34 of this example resume the splay alignment with time after the shutoff of the voltage, comparative samples #401 and #402 do not resume the splay alignment, maintaining the 180°-twist alignment, after the shutoff of the voltage. It is therefore found that the added amount of the chiral agent (value of d/p) is preferably large to lengthen the time required for the liquid crystal layer to resume the splay alignment from the bend alignment.

As described above, by comparing the results obtained during voltage application (Tables 4 and 6) with the results obtained during shutoff of the voltage (Tables 5 and 7), it is concluded that the preferred range of the added amount of the chiral agent is $0 \leqq d/p < 0.50$.

Embodiment 2

In a liquid crystal display device of Embodiment 2 of the present invention, TN alignment that is continuously connectable with bend alignment during application of a voltage equal to or higher than Vcr is trapped in the whole area of the second liquid crystal region. The TN alignment as used herein refers to a type of twist alignment in which the twist angle is in the range of 30° to 150° inclusive, more preferably 70° to 110° inclusive. In the following description, assume that the twist angle is 90°.

In the liquid crystal display device of Embodiment 2, the whole area of the second liquid crystal region acts as the transition nucleus for allowing the first liquid crystal region to make the splay-bend transition. Therefore, the splay-bend transition of the first liquid crystal region can be attained more reliably at higher speed than in the liquid crystal display device of Embodiment 1.

To form the second liquid crystal region, an alignment refresh process, for example, may be adopted in which after roughly the entire area of the first liquid crystal region is bend-aligned, it is splay-aligned from the bend alignment via π-twist alignment. This alignment refresh process is performed by applying a voltage at least twice as high as Vcr across the liquid crystal layer for a predetermined time, for example.

Alternatively, the second liquid crystal region described above may be formed by adding a predetermined amount of a chiral agent to the liquid crystal material.

Hereinafter, the liquid crystal display device of Embodiment 2 will be described specifically with reference to the relevant drawings.

Alignment Refresh Treatment

First, formation of the second liquid crystal region in the alignment refresh process will be described.

The structure of the liquid crystal display device 40 and that of the liquid crystal element 30 thereof are the same as those shown in FIG. 2(*a*), and thus the description thereof is omitted here. Note that hereinafter, description will be made for one pixel of the liquid crystal element 30 for simplification.

Figure 10:
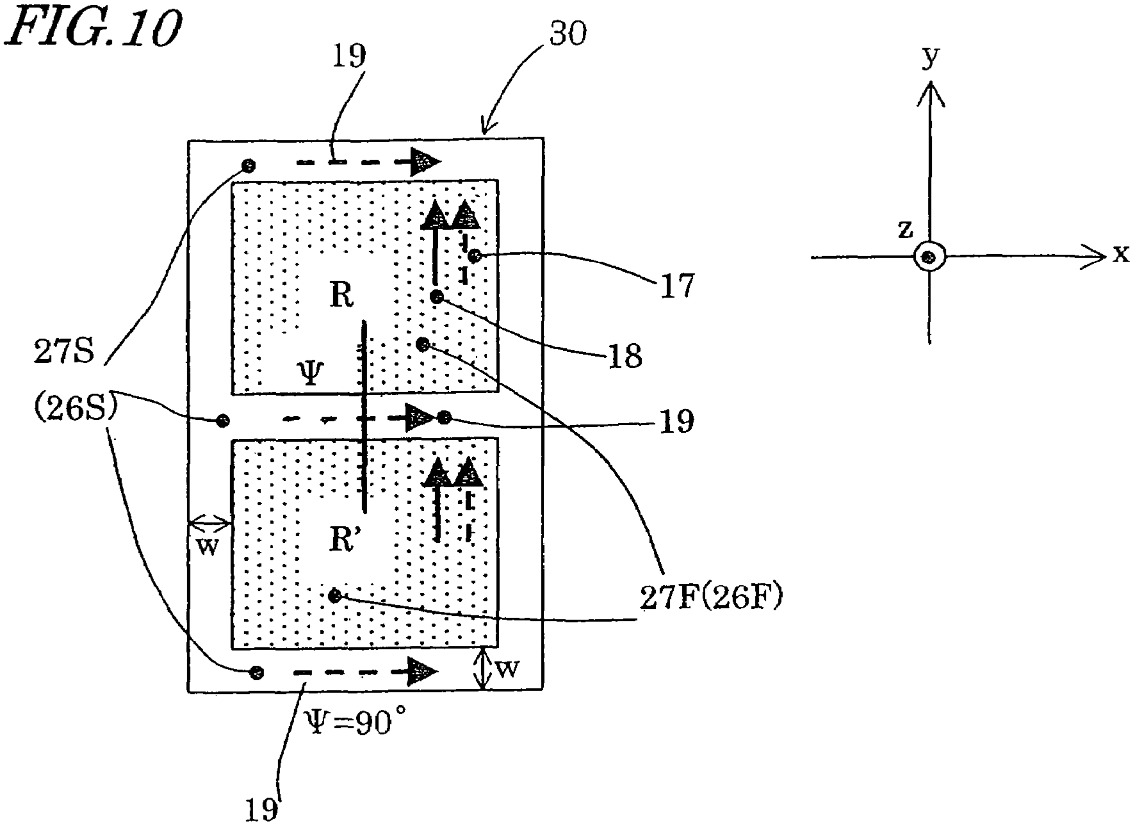
FIG. 10 is a diagrammatic view of one pixel of a liquid crystal element in an embodiment of the present invention, viewed in the direction normal to the substrate.

FIG. 10 is a plan view of one pixel of the liquid crystal element 30 of the liquid crystal display device 40 of Embodiment 2, as viewed in the direction normal to the substrate.

As shown in FIG. 10, the liquid crystal layer 27 of the liquid crystal element 30 has the first liquid crystal region 27F and the second liquid crystal region 27S. The second liquid crystal region 27S is composed of a portion along the periphery of the pixel and a stripe portion crossing about the center of the pixel. This defines two parts of the first liquid crystal region 27F surrounded by the second liquid crystal region 27S in one pixel. The second liquid crystal region 27S may be formed outside the pixel.

The alignment of the liquid crystal layer 27 is regulated with the regulating force of the surfaces of the alignment films 23 and 26 formed in contact with the liquid crystal layer 27. In the case of FIG. 10, for example, the alignment films 23 and 26 are rubbed to regulate the pretilt directions and pretilt angles of the liquid crystal molecules.

The rubbing direction (first direction) 17 of the first alignment film region 26F of the alignment film 26 on the lower substrate 24 is parallel to the pretilt direction of the portion of the first liquid crystal region 27F near the alignment film 26. The rubbing direction (second direction) 19 of the second alignment film region 26S of the alignment film 26 is parallel to the pretilt direction of the portion of the second liquid crystal region 27S near the alignment film 26. As shown in FIG. 10, in the liquid crystal element 30, the pretilt direction of the first liquid crystal region 27F is perpendicular to the pretilt direction of the second liquid crystal region 27S in the area near the alignment film 26.

The alignment film 23 on the upper substrate is roughly entirely rubbed in parallel with the rubbing direction (first direction) 17 of the first alignment film region 26F of the alignment film 26 on the lower substrate. This rubbing direction of the alignment film 23 on the upper substrate is denoted by 18 in FIG. 10.

During non-voltage application, the first liquid crystal region 27F exhibits splay alignment while the second liquid crystal region 27S exhibits TN alignment (90°-twist alignment). Once a voltage equal to or higher than the splay-bend critical voltage (Vcr), the first liquid crystal region 27F exhibits bend alignment. The liquid crystal display device 17 provides display using the bend-aligned first liquid crystal region 27F.

As described in Embodiment 1, the second liquid crystal region 27S acts as the nucleus for the splay-bend transition of the first liquid crystal region 27F when a voltage equal to or higher than the splay-bend critical voltage (Vcr) is applied.

Figure 11:
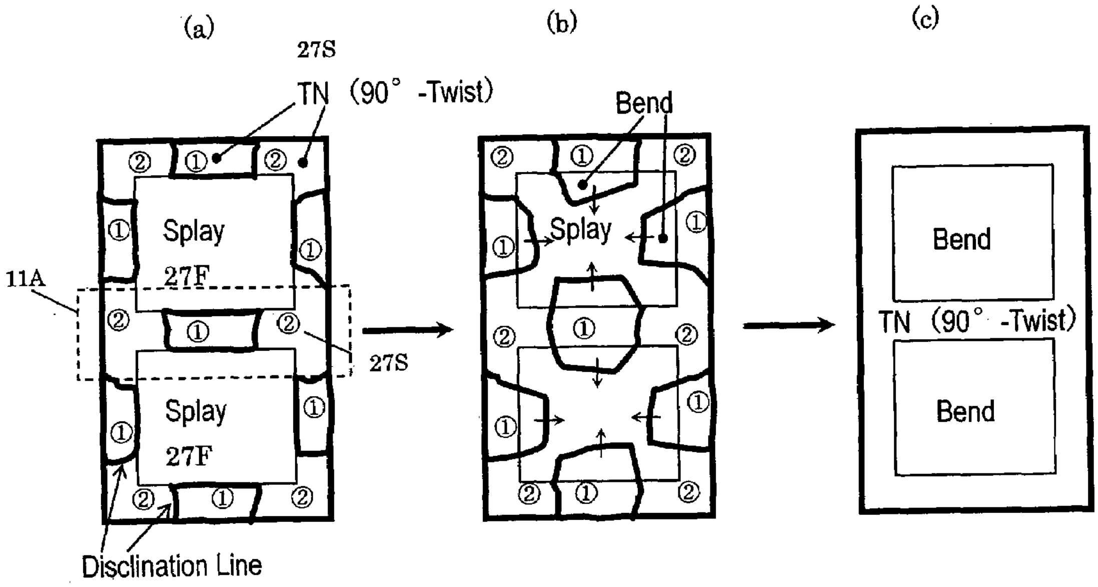
FIG. 11(*a*) is a view diagrammatically showing the liquid crystal alignment state of a liquid crystal element in an embodiment of the present invention, observed after injection of a liquid crystal material but before voltage application, (*b*) is a view diagrammatically showing the liquid crystal alignment state of the element observed immediately after application of a high voltage, (*c*) is a view diagrammatically showing the final liquid crystal alignment state of the element observed after the high voltage application, and (*d*) is a partial enlarged view of an area 11A surrounded by the broken line in FIG. 11(*a*).
Figure 11:
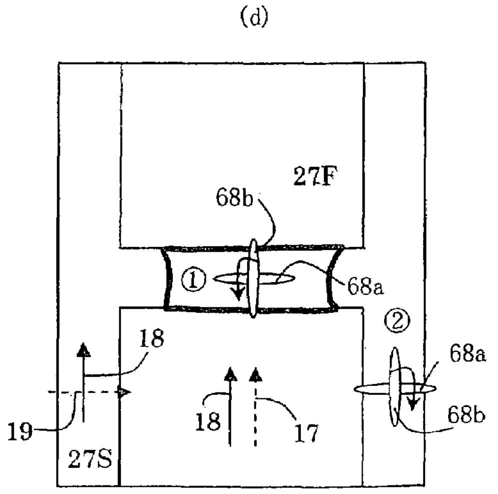
Figure 12:
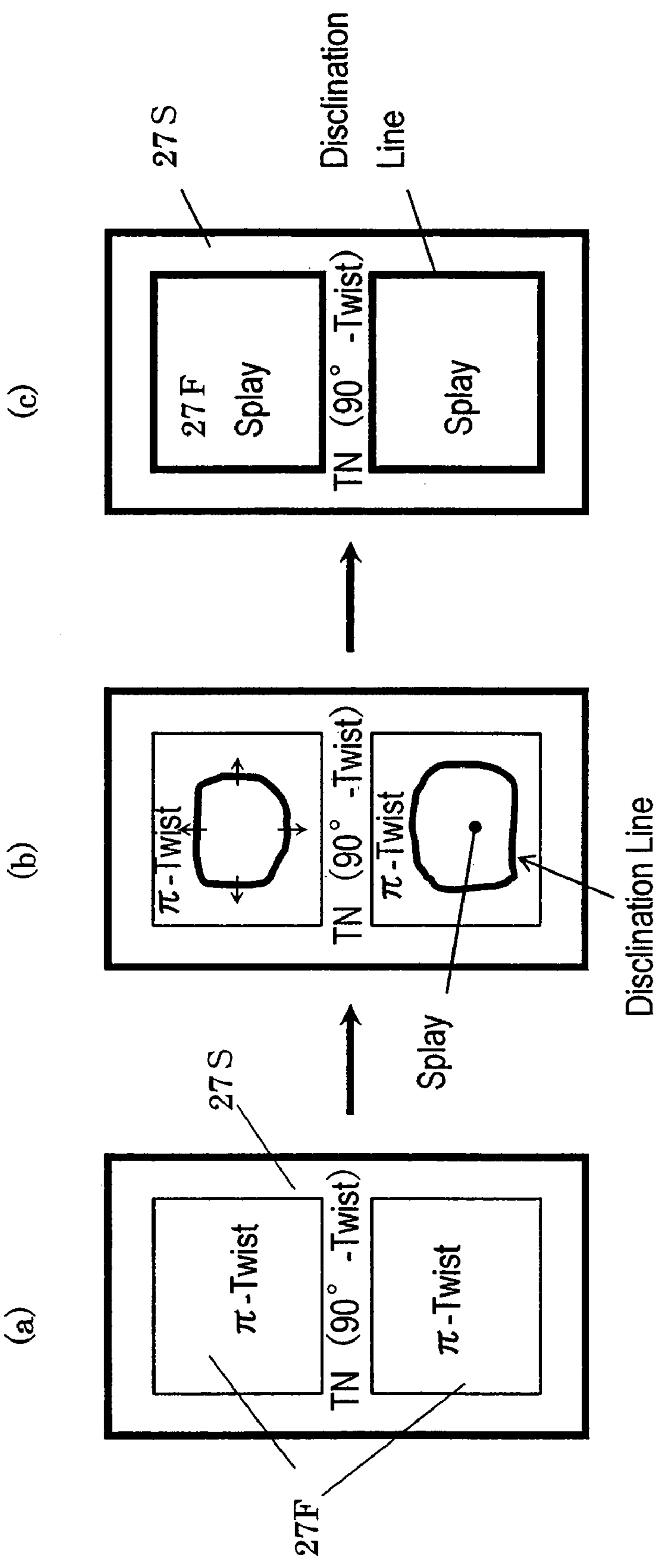
FIG. 12(*a*) is a view diagrammatically showing the liquid crystal alignment state of the liquid crystal element in the embodiment of the present invention, observed immediately after halt of the high voltage application, (*b*) is a view diagrammatically showing the liquid crystal alignment state of the element observed after a lapse of a certain time from the shutoff of the voltage, and (*c*) is a view diagrammatically showing the final liquid crystal alignment state of the element observed after the halt of the voltage application.
Figure 13:
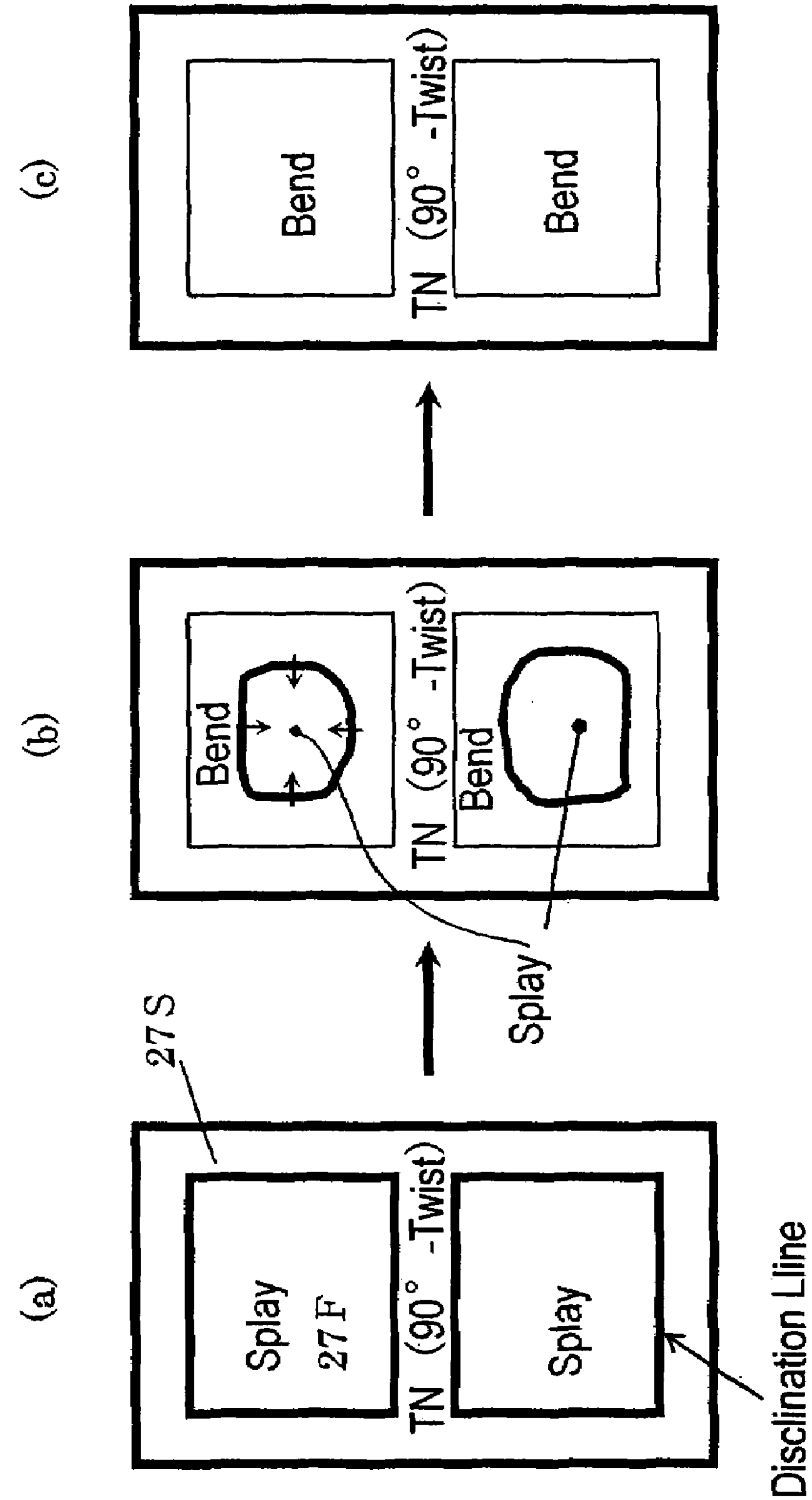
FIG. 13(*a*) is a view diagrammatically showing the liquid crystal alignment state of a liquid crystal element in an embodiment of the present invention, observed before voltage application after performing refresh treatment of temporarily applying a high voltage, (*b*) is a view diagrammatically showing the liquid crystal alignment state of the element observed immediately after application of a high voltage, and (*c*) is a view diagrammatically showing the final liquid crystal alignment state of the element observed after the application of a high voltage.

Hereinafter, referring to FIGS. 11, 12 and 13, the alignment refresh process will be described in detail. FIGS. 11, 12 and 13 are views showing the alignment states of the liquid crystal layer 27. FIGS. 11 and 12 show the alignment states of the liquid crystal layer during the alignment refresh process performed before actual driving of the liquid crystal display device, and FIG. 13 shows the alignment states during actual driving after the alignment refresh process. In FIGS. 11, 12 and 13, disclination lines are shown by the bold lines. Note that the outline of the pixel is also shown by the bold line. In the illustrated example, no chiral agent is added to the liquid crystal material. However, as will be described later, the TN alignment in any region surrounded by a disclination line can be stabilized by adjusting the kind (rotating direction) and added amount of the chiral agent.

The alignment refresh process shown in FIGS. 11 and 12 is performed at least once before actual driving of the liquid crystal display device.

When a liquid crystal material is injected in the space between the electrode substrates 5 and 6, the resultant liquid crystal layer 27 is splay-aligned in the first liquid crystal region 27F and 90°-twisted (TN-aligned) in the second liquid crystal region 27S as shown in FIG. 11(*a*). A plurality of disclination lines are formed in the TN-aligned second liquid crystal region 27S.

A high voltage is applied across the liquid crystal layer 27 in the state shown in FIG. 11(*a*). The applied voltage is preferably at least twice as high as Vcr. The actually measured value of Vcr for the liquid crystal material is 2.3 V. In this embodiment, therefore, 8 V was applied, for example. Once the voltage is applied, the TN-aligned regions surrounded by the disclination lines in the second liquid crystal region 27S act as transition nuclei, triggering the portions of the first liquid crystal region 27F near the transition nuclei to change to bend alignment, as shown in FIG. 11(*b*). With this change to bend alignment, the disclination lines extend into the first liquid crystal region 27F.

Hereinafter, referring to FIGS. 11(*d*), 36(*a*) and (*b*), the alignment states of the liquid crystal layer in FIG. 11(*a*) and (*b*) will be described in detail. FIG. 11(*d*) is a partial enlarged view of an area 11A surrounded by the broken line in FIG. 11(*a*).

As shown in FIG. 11(*a*), during non-voltage application, the second liquid crystal region 27S, which is entirely in TN alignment, has two different types of alignment states. One is the alignment state in the regions surrounded by the disclination lines as shown by ① in FIG. 11(*a*) and (*d*), and the other is the alignment state in the regions shown by ② located adjacent to the regions ① via the disclination lines.

In the TN-aligned second liquid crystal region 27S, the alignment directions of liquid crystal molecules existing near the two substrates are respectively regulated with the rubbing direction 18 (of the alignment film 23 on the upper substrate 21) and the rubbing direction 19 (of the alignment film 26 on the lower substrate 24) shown in FIG. 11(*d*). Therefore, the alignment state of the liquid crystal molecules in the second liquid crystal region 27S includes counterclockwise 90° twist and clockwise 90° twist. From polarizing microscopic observation, it was found that the regions ① are 90°-twisted counterclockwise while the regions ② are 90°-twisted clockwise. In FIG. 11(*d*), a liquid crystal molecule 68*a* existing near the alignment film 26 on the lower substrate and a liquid crystal molecule 68*b* existing near the alignment film 23 on the upper substrate are diagrammatically shown in each of the regions ① and ②. In the region ①, liquid crystal molecules are 90°-twisted counterclockwise toward the lower substrate from the upper substrate. In the region ②, liquid crystal molecules are 90°-twisted clockwise toward the lower substrate from the upper substrate.

Figure 36:
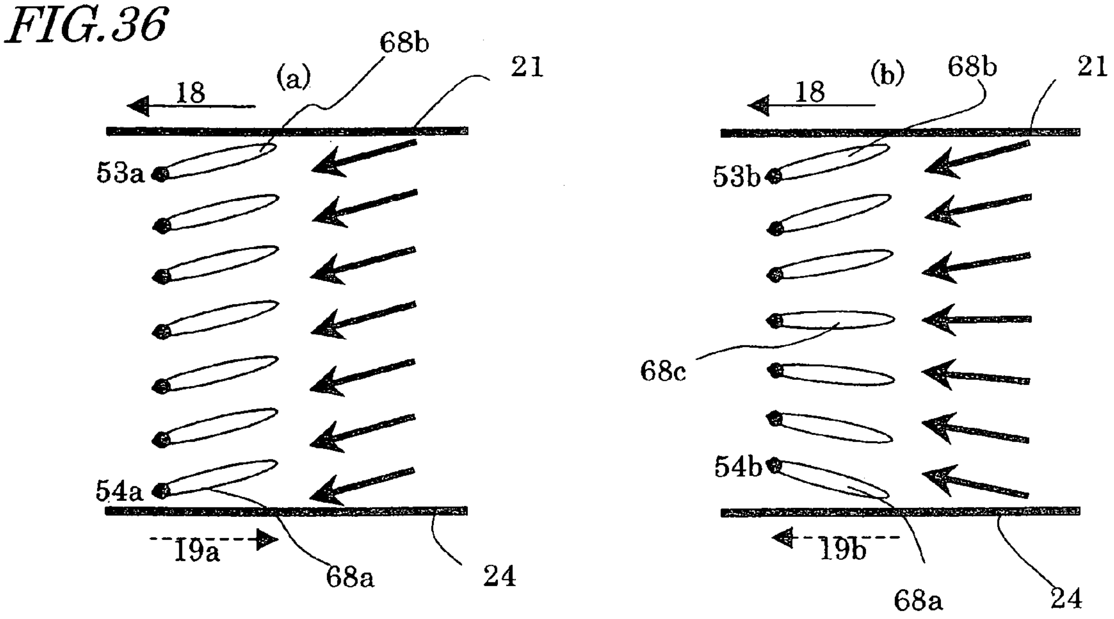
FIG. 36(*a*) is a view demonstrating a uniform tilt alignment state, and (*b*) is a view demonstrating a splay tilt alignment state.

In addition to the difference in the direction of the twist between the regions ① and ② described above, there is actually a difference in tilt angle between these regions. The tilt angle will be described with reference to FIGS. 36(*a*) and (*b*). FIGS. 36(*a*) and (*b*) are views diagrammatically showing the alignment states of liquid crystal molecules in the regions ① and ②, respectively. Note that in these figures, the liquid crystal molecules are shown in the two-dimensional plane in their untwisted state to focus attention only on the tilt state.

As shown in FIG. 36(*a*), the liquid crystal molecules in the region ① are in a tilt state (uniform tilt state) in which the tilt direction is uniform from the upper substrate 21 to the lower substrate 24. The uniform tilt state refers to the alignment state in which when the head 53*a* of the liquid crystal molecule 68*b* existing near one substrate (for example, the upper substrate 21) points to the center of the cell, the head 54*a* of the liquid crystal molecule 68*a* existing near the other substrate (for example, the lower substrate 24) comes into contact with the substrate surface, as shown in FIG. 36(*a*).

As shown in FIG. 36(*b*), the liquid crystal molecules in the region ② are in a tilt state (splay tilt state) in which splay distortion is concentrated in the center of the liquid crystal layer 27. The splay tilt state refers to the alignment state in which when the head 53*b* of the liquid crystal molecule 68*b* existing near one substrate (for example, the upper substrate 21) points to the center of the cell, the head 54*b* of the liquid crystal molecule 68*a* existing near the other substrate (for example, the lower substrate 24) also points to the center of the cell. That is, in this state, splay distortion is concentrated on a liquid crystal molecule 68*c* in the center portion of the liquid crystal layer.

Liquid crystal molecules in the uniform tilt state and liquid crystal molecules in the splay tilt state are not allowed to become identical to each other by continuously changing the alignment (bend, twist, splay). Therefore, the regions ① and ② are partitioned with distinctive disclination.

When liquid crystal molecules in the π-twist alignment and the bend alignment are observed in their untwisted state to focus attention only on the tilt state, they are in the uniform tilt state as in the region ① described above. These alignments are topologically homogeneous with each other. Accordingly, the region ① can continuously (smoothly) change to π-twist or bend alignment and thus acts as the bend transition nucleus. On the contrary, the region ② is in the splay tilt state. To change this state to π-twist or bend alignment, a process of forming an alignment discontinuous point such as disclination is necessary. Therefore, the region ② fails to act as the bend transition nucleus.

As described above, in FIG. 11(*a*), the regions ① existing in the second liquid crystal region 27S act as the bend transition nuclei. Once a high voltage is applied, therefore, the regions ① in the second liquid crystal region 27S act as the transition nuclei, triggering the first liquid crystal region 27F to change to bend alignment as shown in FIG. 11(*b*).

In a predetermined time after the start of application of the high voltage, the first liquid crystal region 27F completely becomes bend alignment as shown in FIG. 11(*c*). The application of the voltage is halted once the first liquid crystal region 27F has completely changed to bend alignment.

In several tens to a hundred and several tens of msecs after the halt of the high voltage application, roughly the entire first liquid crystal region 27F changes to π-twist alignment as shown in FIG. 12(*a*).

As the time further passes, splay-aligned regions develop from portions of the π-twisted first liquid crystal region 27F as shown in FIG. 12(*b*). The splay-aligned regions, together with their disclination lines, expand in the π-twisted first liquid crystal region 27F, while the π-twisted regions gradually shrink in the first liquid crystal region 27F.

In a sufficient time after the halt of the high voltage application, the shift of the disclination lines in the first liquid crystal region 27 toward the second liquid crystal region 27F stops at the boundary between the first liquid crystal region 27F and the second liquid crystal region 27S. The first liquid crystal region 27F is now roughly entirely in splay alignment, and the π-twisted regions have disappeared from the first liquid crystal region 27F. At this time, the π-twist alignment is trapped in the entire second liquid crystal region 27S as TN alignment (90°-twist alignment) continuously connectable with bend alignment during voltage application (in particular, during application of a voltage equal to or higher than Vcr). The entire second liquid crystal region 27S is 90°-twisted counterclockwise as the region ① in FIG. 11(*d*) and in the uniform tilt state (FIG. 36(*a*)). Therefore, the entire second liquid crystal region 27S acts as the bend transition nucleus.

The wording "trapped" in the above description refers to being "confined and held". To "trap the π-twist alignment in the entire second liquid crystal region 27S as TN alignment (90°-twist alignment) continuously connectable with bend alignment during voltage application (in particular, during application of a voltage equal to or higher than Vcr)" means to confine the twist alignment sequentially (smoothly) connectable with π-twist alignment in the entire TN-aligned region (second liquid crystal region 27S) as 90°-twist alignment and hold the confined alignment in the place. The wording "continuously connectable" in the above description indicates that the TN-aligned region can be in contact with the π-twisted region without any alignment discontinuous point such as a disclination line therebetween.

As shown in FIG. 12(*b*), in the voltage-OFF state, the splay alignment is more stable in energy than the π-twist alignment in the first liquid crystal region 27F (parallel rubbing region in which the rubbing direction of the alignment film 23 on the upper substrate 21 is parallel with the rubbing direction of the alignment film 26 on the lower substrate 24). The π-twisted regions therefore shrink with expansion of the splay-aligned regions. If no TN region exists in the liquid crystal layer, the π-twist regions (or twisted regions continuously connectable therewith) will shrink with expansion of the splay-aligned regions and finally disappear. By providing the TN-aligned region (second liquid crystal region 27S) in the liquid crystal layer as in this embodiment, the π-twist alignment (or twist alignment continuously connectable therewith) is absorbed into the TN-aligned region, as shown in FIG. 12(*c*). In this way, the π-twist alignment does not finally disappear but is confined in the TN-aligned region 27S as 90°-twist alignment continuously connectable with the π-twist alignment and held in the place.

When a voltage equal to or higher than Vcr is applied for display after the completion of the alignment refresh treatment described above, the second liquid crystal region 27S acts as the transition nucleus more effectively, triggering the splay-bend transition of the first liquid crystal region 27F more reliably at higher speed, compared with the case that the alignment refresh treatment is not performed before the application of a voltage equal to or higher than Vcr. Hereinafter, the change of the alignment state of the liquid crystal layer 27 observed after the application of a voltage equal to or higher than Vcr for display will be described.

When a voltage equal to or higher than Vcr is applied to the liquid crystal layer 27 subjected to the alignment refresh treatment described above (FIG. 13(*a*)), the first liquid crystal region 27F makes the splay-bend transition with the entire TN-aligned second liquid crystal region 27S acting as the transition nucleus as shown in FIG. 13(*b*). Since the entire second liquid crystal region 27S acts as the transition nucleus, the splay-bend transition occurs reliably at high speed compared with the case that the alignment refresh treatment is not performed before the application of a voltage for actual driving. With the splay-bend transition, the disclination lines existing along the boundaries between the first liquid crystal region 27F and the second liquid crystal region 27S shift toward the centers of the first liquid crystal region 27F. In a predetermined time after the voltage application, roughly the entire first liquid crystal region 27F completes the transition to bend alignment.

It was described that the second liquid crystal region 27S exhibited bend alignment in FIG. 11(*b*) and π-twist alignment in FIG. 12(*b*). The bend alignment and the π-twist alignment basically refer to the same alignment state, but are herein used differently depending on the magnitude of the applied voltage. That is, when the applied voltage is in the range between 0 V and less than Vcr, the alignment state is called the π-twist alignment, while when the applied voltage is equal to or higher than Vcr, the alignment state is called the bend alignment. Accordingly, the TN alignment trapped in the second liquid crystal region 27S is expressed as being "continuously connectable with π-twist alignment" when no voltage is applied (when the voltage is OFF), while it is expressed as being "continuously connectable with bend alignment" when a voltage equal to or higher than Vcr is applied.

Hereinafter, rubbing of the alignment films 23 and 26 will be described with reference to FIG. 10.

The alignment film 26 on the lower substrate 24 has the first alignment film region 26F rubbed in the first direction (direction of arrow 17 in FIG. 10) and the second alignment film region 26S rubbed in the second direction (direction of arrow 19) different from the first direction. The second direction is set at about 90° from the first direction.

The second alignment film region 26S is preferably formed to surround the entire first alignment film region 26F. For example, as shown in FIG. 10, the second alignment film region 26S is formed so as to define two separate parts of the first alignment film region 26F having roughly the same area in one pixel and surround these two parts of the first alignment film region 26F. The shape of the second alignment film region 26S shown in FIG. 10 can further shorten the time required for bend-aligning the first liquid crystal region 27F compared with the shape of the second alignment film region 26S shown in FIG. 1.

Figure 14:
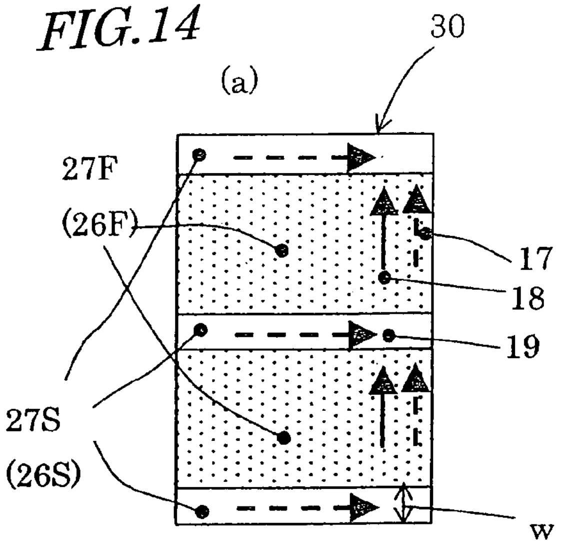
FIGS. 14(*a*) and (*b*) are diagrammatic views of one pixel of liquid crystal elements in an embodiment of the present invention, viewed in the direction normal to the substrate.

If it is difficult to form the second alignment film region 26S so as to surround the first alignment film region 26F for some reason in the process, the second alignment film region 26S may be formed along one side of the first alignment film region 26F. For example, as shown in FIG. 14(*a*), the second alignment film region 26S may be in the shape of three stripes extending near the two minor sides and the center of the pixel.

Alternatively, the second alignment film region 26S may be formed in the shape of points. For example, as shown in FIG. 14(*b*), the second alignment film region 26S may be in the shape of three squares located near the center of the pixel and near the center of the two minor sides of the pixel. The shapes of the alignment film regions shown in FIG. 14 can also shorten the time required for bend-aligning the first liquid crystal region 27F. The shape of the second alignment film region 26S and the like are not limited to those described above, but may be appropriately determined depending on the design of the panel.

As described in Embodiment 1, the width w of the second alignment film region 26S in one pixel (for example, 80 μm×240 μm) is preferably in the range of 5 μm to 60 μm. The area of the second alignment film region 26S is preferably about 1/48 to 1/4 with respect to the area of one pixel as 1. When the second alignment film region 26S has a size falling within the above ranges, 180°-twist alignment can be effectively trapped in the entire second liquid crystal region 27S as 90°-twist alignment by the alignment refresh treatment, and this makes the second alignment film region 26S act as an effective transition nucleus.

Methods for forming the alignment films 23 and 26 will be described. Formation methods will be described not only for the alignment film having the first alignment film region 26F and the second alignment film 26S arranged as shown in FIG. 10, but also for alignment films having alignment film regions in various shapes. Note that the alignment films in Embodiment 2 can also be formed by the methods described in Embodiment 1, and the alignment films in Embodiment 1 can also be formed by the methods described in Embodiment 2.

First, the alignment film 23 is formed on the transparent electrode 22 on the upper substrate 21, and the alignment film 26 is formed on the transparent electrode 25 on the upper substrate 24. A polyimide film, for example, is used as the alignment films 23 and 26. Roughly the entire surfaces of the alignment films 23 and 26 are rubbed in the first direction (direction of arrows 18 and 17).

The alignment film 26 is further rubbed using a mask. Hereinafter, the rubbing of the alignment film 26 will be described with reference to FIGS. 15(*a*) to (*c*). Note that in FIGS. 15(*a*) to (*c*), openings of each mask 65 are shown only partly. One opening may correspond to one pixel, or a plurality of openings may correspond to one pixel.

Figure 15:
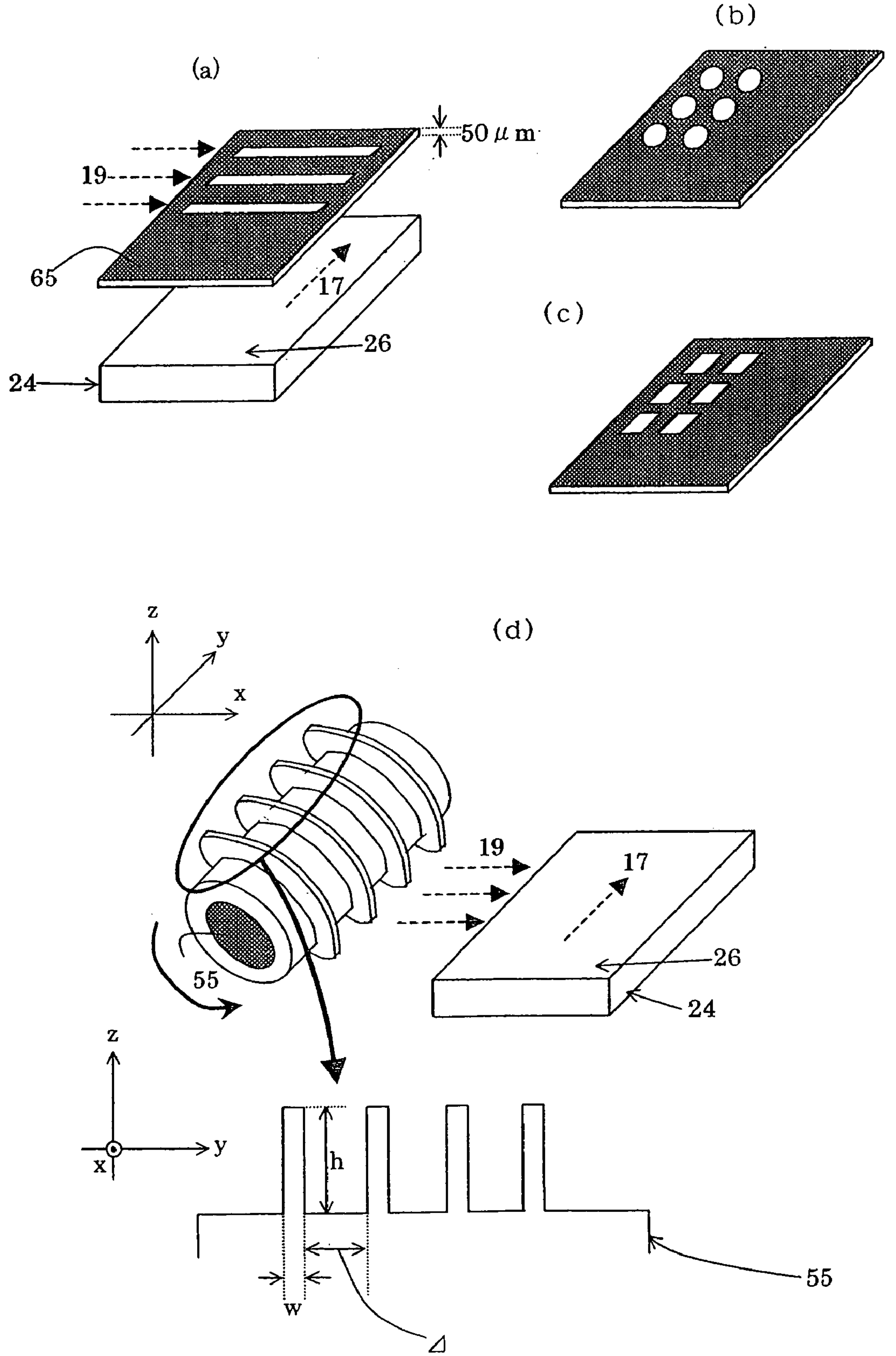
FIGS. 15(*a*), (*b*), (*c*) and (*d*) are views showing examples of the technique of forming second liquid crystal regions on an alignment film on a lower substrate of a liquid crystal element in an embodiment of the present invention.

The plastic mask 65 having physical slits (openings) is placed on the alignment film 26. The physical mask is not necessarily made of plastic, but may be made of metal or glass. The shape and the like of the slits may be appropriately determined depending on the desired shape and the like of the second alignment film region 26S. For example, the slits may be in the shape of a plurality of parallel stripes as shown in FIG. 15(*a*), in the shape of points arranged in a matrix as shown in FIG. 15(*b*), or in the shape of squares arranged in a matrix as shown in FIG. 15(*c*), depending on the desired shape and the like of the second alignment film region 26S. Masks having fine slits in various shapes other than the illustrated ones may also be used. The thickness of the mask is about 50 μm, for example.

With the plastic mask 24 placed on and fixed to the alignment film 26 and regions of the alignment film corresponding to the slits of the mask exposed, rubbing is performed in the second direction (direction of arrow 19) that is at 90° from the first direction. As a result, formed on the alignment film 26 are the first alignment film region 26F rubbed in the first direction and the second alignment film region 26S rubbed in the second direction that is at 90° from the first direction.

The alignment films 23 and 26 are formed in the manner described above.

The alignment film 26 may also be formed by the following method. Note that the alignment film 26 shown in FIG. 15(*d*) may correspond to one pixel or a plurality of pixels.

After the rubbing of roughly the entire surface of the alignment film 26 in the first direction (direction of arrow 17), predetermined regions of the alignment film 26 are selectively rubbed in the direction of arrow 19 (second direction) using a stainless roller 55 having pits and projections at fine periods.

The roller is not necessarily made of stainless steel, but may be made of plastic or other materials. The stainless roller 55 shown in FIG. 15(*d*) has a plurality of fine pits and projections formed by machining. For example, the width w of the projections is 10 μm, the interval ⊿between the projections is 100 μm, and the height h of the projections with respect to the other portions is 300 μm. The width w, the interval ⊿and the height h of the projections are not limited to the above values, but may be appropriately determined depending on the pixel design of the actually fabricated liquid crystal display device, the desired shape of the second alignment film region 26S, the rate of conforming products or the yield in the fabrication process and the like.

The rotational axis of the roller 55 is fixed at the position at which the projections of the stainless roller 55 are pressed into the alignment film 26 by about 50 μm from the surface on which the projections are just in contact with the alignment film 26. The roller 55 is then rotated at a rotational speed of 500 revolutions per minute (rpm), and the alignment film 26 is allowed to pass under the rotating roller 55 at a moving speed of 1.0 cm/s. By this operation, regions of the alignment film 26 into which the stainless roller 55 is pressed are selectively cut (rubbed), forming the second alignment film regions 26S.

Regions of the alignment film 26 through which the inter-projection spaces of the stainless roller 55 pass are not in contact with the roller because the pressed-in amount of the projections into the alignment film is 50 μm while the height h of the projections is 300 μm, and thus the previously formed rubbing in the direction of arrow 17 is kept unchanged. These portions therefore serve as the first alignment film regions 26F used for image display.

The alignment film 26 is formed in the manner described above.

Alternatively, the alignment film 26 in this embodiment may be formed by adopting a photolithographic process used in the semiconductor process. Hereinafter, an example of mask rubbing using the photolithographic process will be described with reference to FIG. 16. Note that in FIG. 16, openings of a photomask 60 are shown only partly. One opening may correspond to one pixel, or a plurality of openings may correspond to one pixel.

Figure 16:
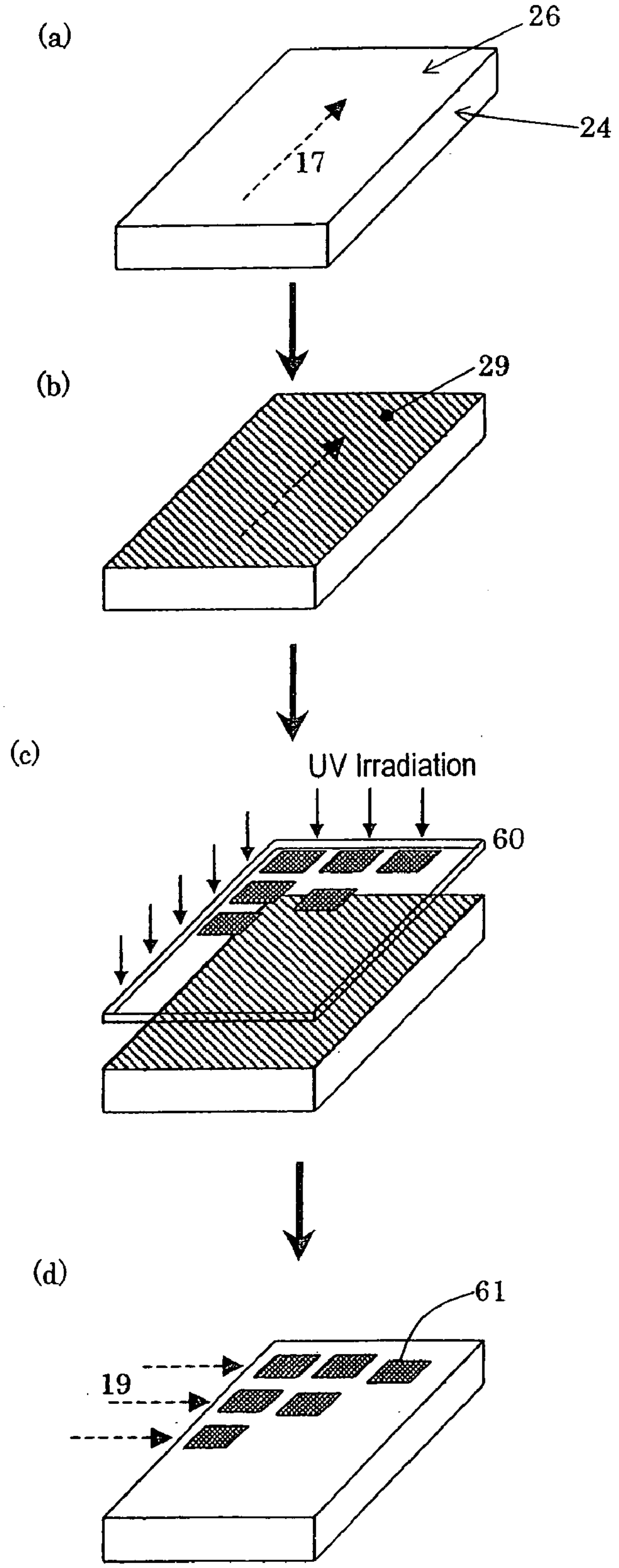
FIGS. 16(*a*), (*b*), (*c*) and (*d*) are views showing an example of the technique of forming second liquid crystal regions on an alignment film on a lower substrate of a liquid crystal element in an embodiment of the present invention.

After roughly the entire surface of the alignment film 26 is rubbed in the first direction (direction of arrow 17) as shown in FIG. 16(*a*), a positive photoresist 29 is applied to the alignment film 26 as shown in FIG. 16(*b*). As shown in FIG. 16(*c*), after prebaking, the alignment film 26 is irradiated with UV via the photomask 60 and then immersed in a developer. Postbaking is then performed to allow resists 61 to be fixed to the alignment film.

By the process described above, a predetermined region that is finally to be the second alignment film region 26S is selectively exposed as shown in FIG. 16(*d*). The alignment film is then rubbed in the second direction (direction of arrow 19) that is at an angle of 90° from the first direction. The resists 61 are then removed. As a result, formed on the alignment film 26 are the first alignment film region 26F rubbed in the first direction and the second alignment film region 26S rubbed in the second direction that is at an angle of 90° from the first direction. In this way, the alignment film 26 is formed.

The alignment films 23 and 26 may be optical alignment films. Hereinafter, an example of a method for forming an optical alignment film will be described with reference to FIGS. 17 to 20. Note that in FIG. 17, openings of a photomask 62 are shown only partly. One opening may correspond to one pixel, or a plurality of openings may correspond to one pixel.

The alignment films 23 and 26 made of polyvinyl cinnamate (PVCi) are formed on the transparent electrodes 22 and 25 on the upper substrate 21 and the lower substrate 24, respectively. The entire surface of the alignment film 23 is then irradiated with non-polarized UV, while the alignment film 26 is irradiated with non-polarized UV via the photomask 62 to allow regions that are finally to be the first alignment film regions to be irradiated as shown in FIG. 17.

Figure 17:
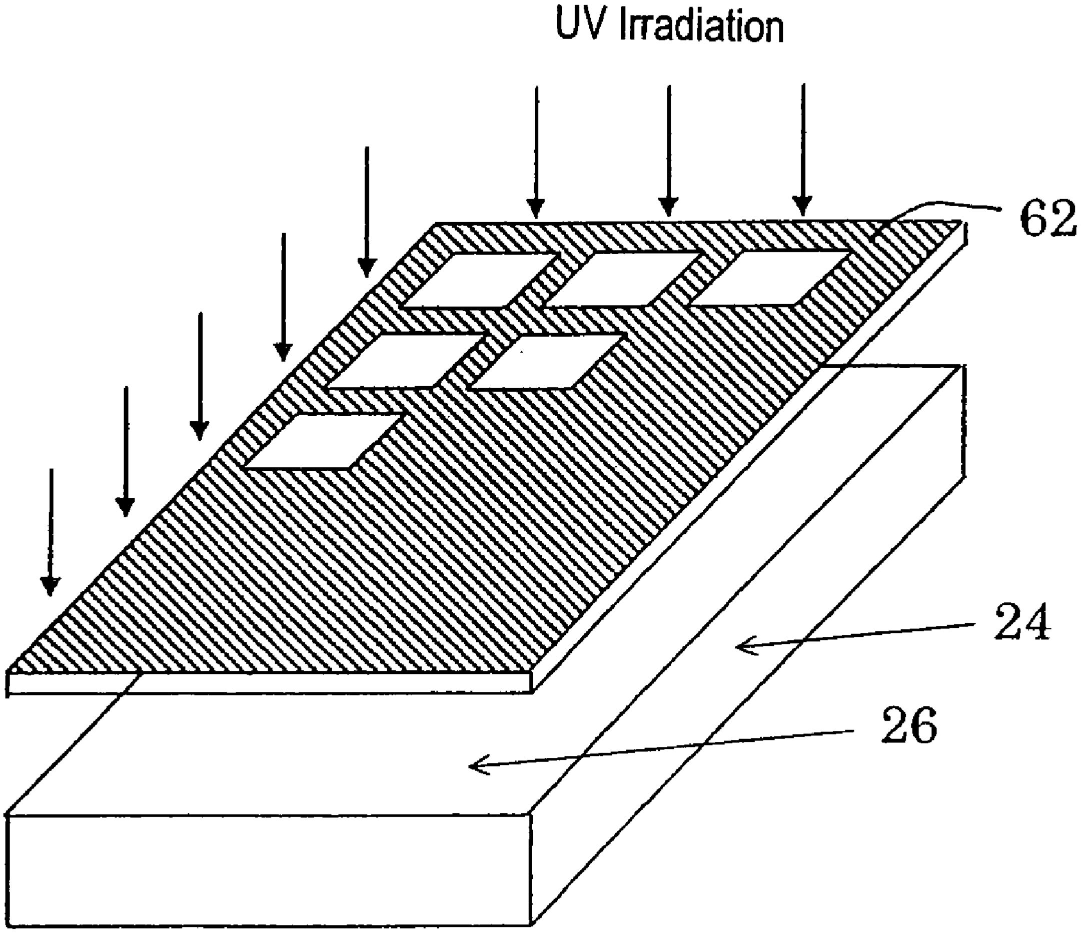
FIG. 17 is a view showing an example of the technique of forming second liquid crystal regions on an alignment film on a lower substrate of a liquid crystal element of an embodiment of the present invention.

As the photomask 62, one having a plurality of square openings arranged in a matrix as shown in FIG. 17 was used. However, the shape and the like of the openings may be appropriately determined depending on the desired shape and the like of the second alignment film region 26S. The UV irradiation amount was set at 60 J/cm$^2$ for the wavelength of 254 nm, for example.

After the light irradiation described above, the entire surfaces of the alignment films 23 and 26 are rubbed.

In a liquid crystal display device fabricated using the resultant alignment films 23 and 26, the first liquid crystal region 27F is uniaxially aligned along the rubbing direction, and the second liquid crystal region 27S is TN-aligned (90°-twisted). Also, the pretilt direction of the portion of the first liquid crystal region 27F near the alignment film 26 is roughly 90° from the pretilt direction of the portion of the second liquid crystal region 27S near the alignment film 26.

Hereinafter, the reason why the liquid crystal regions 27F and 27S are aligned as described above will be described with reference to FIGS. 18 to 20. FIG. 19(*a*) diagrammatically shows the molecular structure of the alignment films 23 and 26 formed on the substrates. The left halves of FIGS. 19(*b*) and (*c*) diagrammatically show the molecular structures of the alignment film 23 and the first alignment film region 26F of the alignment film 26, and the right halves of FIGS. 19(*b*) and (*c*) diagrammatically show the molecular structures of the second alignment film region 26S of the alignment film 26. FIG. 19(*d*) diagrammatically shows the alignment state of liquid crystal molecules in FIG. 19(*c*).

Figure 18:
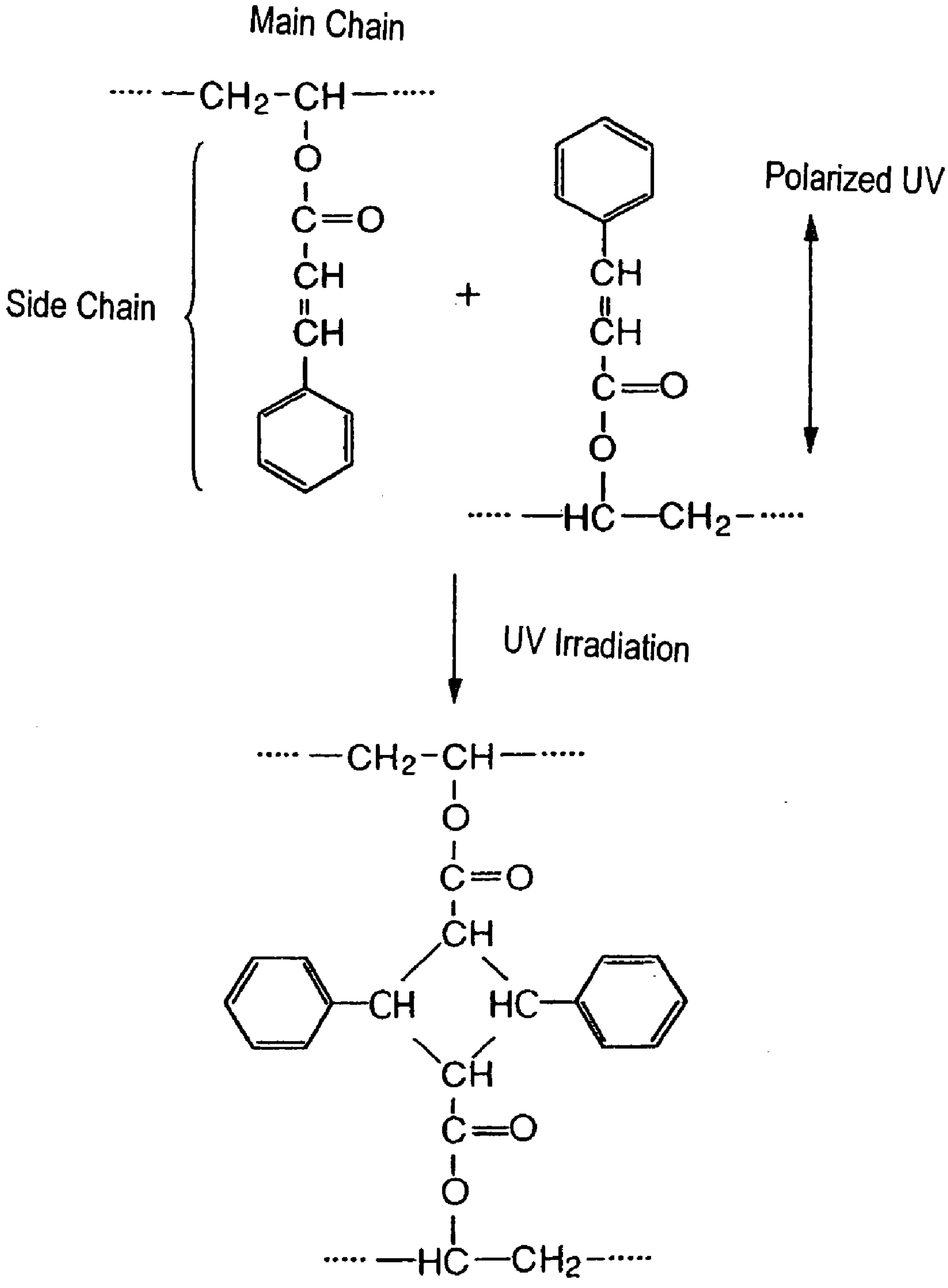
FIG. 18 is a view demonstrating the molecular structure of polyvinyl cinnamate (PVCi) as an optical alignment film and a photodimerization process.
Figure 19:
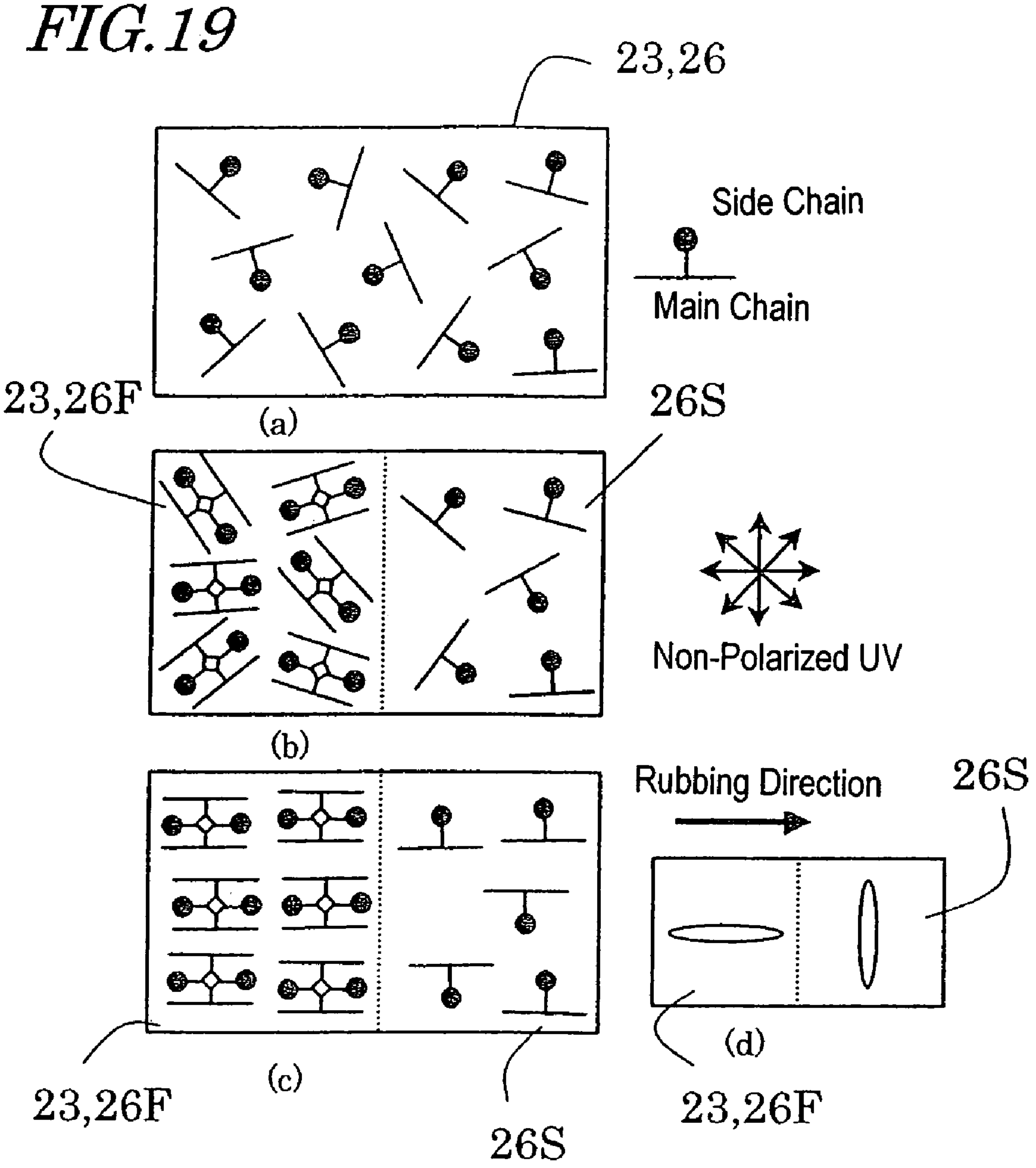
FIGS. 19(*a*), (*b*), (*c*) and (*d*) are views demonstrating the alignment of liquid crystal molecules with an optical alignment film.

As shown in FIGS. 18 (upper part) and 19(*a*), each molecule of the polyvinyl cinnamate (PVCi) film is composed of a main chain and a side chain perpendicular to the main chain. It is known that when the film is irradiated with polarized UV, photodimerization selectively occurs if the direction of the extension of the side chain matches with the polarizing direction, as shown in FIG. 18 (lower part). As a result of the photodimerization, the liquid crystal molecules are aligned in the direction perpendicular to the direction of the polarizing direction, that is, in the direction parallel to the main chains.

When the alignment film is irradiated with non-polarized UV, photodimerization occurs in all directions as shown in the left half of FIG. 19(*b*). When such a photodimerized alignment film is rubbed, the main chains of PVCi are aligned in the rubbing direction as shown in the left half of FIG. 19(*c*), and as a result, liquid crystal molecules are aligned in the rubbing direction as shown in the left half of FIG. 19(*d*).

On the contrary, when the alignment film is rubbed without the UV irradiation as shown in the right half of FIG. 19(*b*), the main chains of PVCi are aligned in the rubbing direction but the side chains do not follow the rubbing direction as shown in the right half of FIG. 19(*c*). As a result, liquid crystal molecules are aligned in the direction perpendicular to the rubbing direction as shown in the right half of FIG. 19(*d*).

Figure 20:
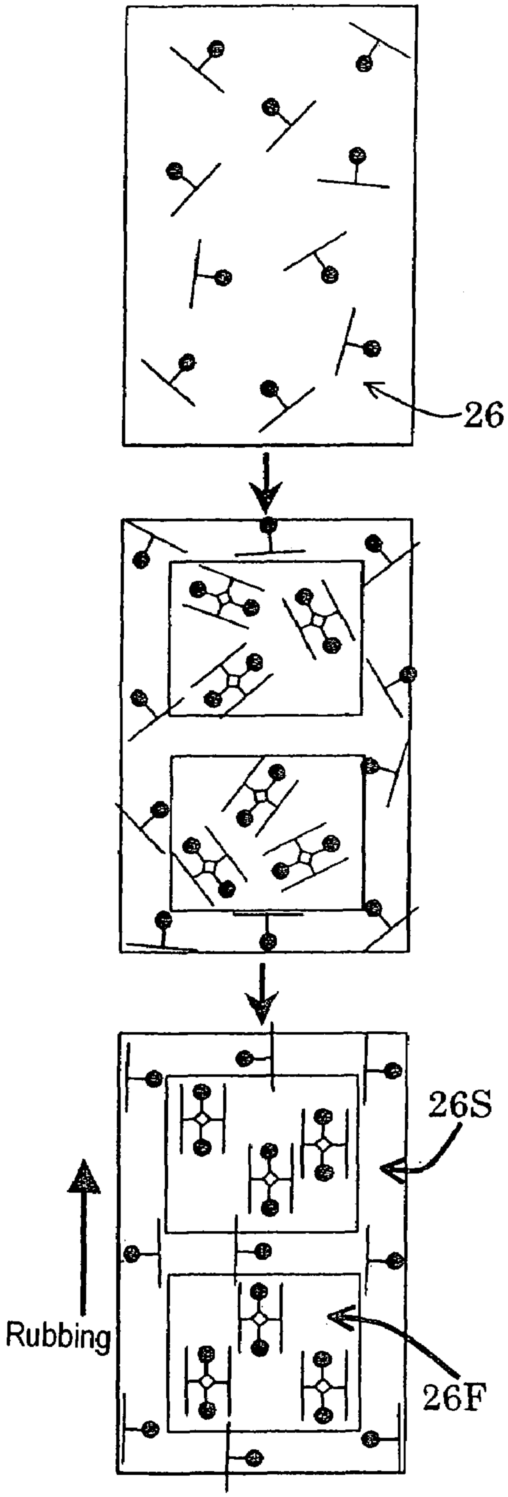
FIG. 20 is a view showing an example of the technique of forming a second liquid crystal region on an alignment film on a lower substrate of a liquid crystal element in an embodiment of the present invention.

In consideration of the above, the alignment film 26 is irradiated with light by the method described above with reference to FIG. 17, to obtain the alignment film 26 having the first alignment film region 26F and the second alignment film region 26S as shown in FIG. 20. In this way, the optical alignment films 23 and 26 are formed.

As described above, the alignment films 23 and 26 can be formed by various methods.

A chiral agent may be added to the liquid crystal layer 27 of the liquid crystal element in this embodiment, to enable the second liquid crystal region 27S to act as the bend transition nucleus more effectively.

The added amount of the chiral agent is preferably set so that the ratio d/p of the thickness d of the liquid crystal layer to the natural chiral pitch p of the chiral agent-added liquid crystal layer satisfies $0 \leqq d/p < 0.50$, for example, as described in Example 1 and will be described later in Example 3.

Since the added amount of the chiral agent is limited to a small amount to fall within the range described above, decrease in transmittance and asymmetry in viewing angle characteristic can be suppressed from occurring when the liquid crystal display device provides white display in actual driving.

The added amount of the chiral agent is more preferably set to satisfy $0 < d/p \leqq 0.15$. By this setting, decrease in transmittance is substantially prevented from occurring when the liquid crystal display device provides white display in actual driving, compared with a liquid crystal sample using no chiral agent. That is, in this embodiment, it is possible to satisfy two mutually contradictory conditions of ensuring the bend transition and maintaining the optical characteristics, which has been unattainable by the conventional techniques.

In the above description, the angle ψ formed between the pretilt direction 19 of the second liquid crystal region 27S and the pretilt direction 17 of the first liquid crystal region 27F was about 90°. The angle ψ is not limited to 90°, but as long as the angle ψ satisfies $70° \geqq \psi \leqq 110°$, it is possible to effectively trap π-twist alignment in the entire second liquid crystal region as TN alignment continuously connectable with bend alignment during application of a voltage equal to or higher than Vcr, by performing the alignment refresh treatment before actual driving.

Hereinafter, the reason why the bend transition is facilitated by performing the alignment refresh treatment as in this embodiment will be described using Gibbs free energy. First, the change of the alignment of liquid crystal molecules occurring during the alignment refresh treatment (corresponding to FIGS. 11 and 12) will be described.

Figure 21:
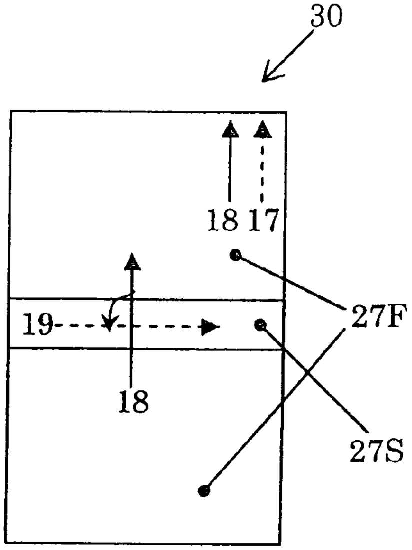
FIG. 21 is a diagrammatic view of a liquid crystal element in an embodiment of the present invention, viewed in the direction normal to the substrate.

Cell parameters used for calculation are as follows. The cell thickness d is 6 μm, and the chiral pitch p of the liquid crystal material is 40 μm. As shown in FIG. 21, assume that the first liquid crystal region 27F and the second liquid crystal region 27S are formed in one pixel and that the pretilt direction (first direction 17) of the first liquid crystal region 27F and the pretilt direction (second direction 19) of the second liquid crystal region 27S are orthogonal to each other in the area near the alignment film 26. Assume also that cholesteryl nonanoate (CN) as a counterclockwise chiral agent is added to the liquid crystal layer.

The liquid crystal alignment states that may occur in the first and second liquid crystal regions are the following three states: counterclockwise π-twist alignment, counterclockwise π/2-twist alignment and splay alignment. Theoretical calculation of the Gibbs free energy during non-voltage application was made for these three states, and the results are as shown in Table 8 below.

TABLE 8

| Alignment state | Gibbs free energy ($\mu J/m^2$) |
|---|---|
| Counterclockwise π-twist | 2.9210 |
| counterclockwise π/2-twist | 0.2496 |
| Splay | 0.5609 |

Figure 22:
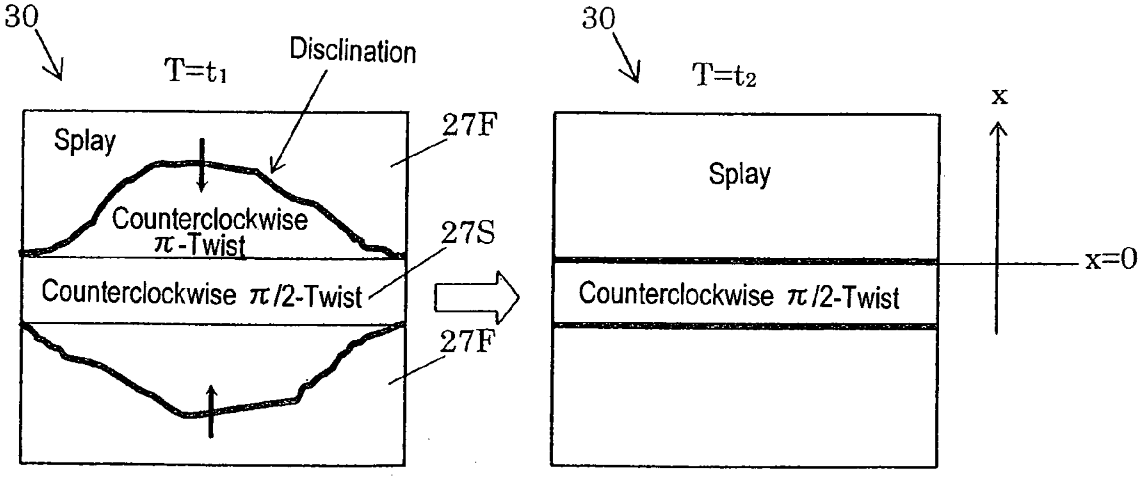
FIG. 22 shows views demonstrating the alignment state of a liquid crystal element in an embodiment of the present invention observed after the refresh treatment.

FIG. 22 diagrammatically shows the alignment states developing in the liquid crystal layer 27 by the refresh treatment. Time $T=t_1$ represents the time after a lapse of a certain time from the halt of application of a high voltage for the refresh treatment, and time $T=t_2$ represents the time after a lapse of another certain time from time $T=t_1$, at which the disclination lines separating the splay alignment from the π-twist alignment have reached the boundaries between the first liquid crystal region 27F and the second liquid crystal region 27S.

Figure 23:
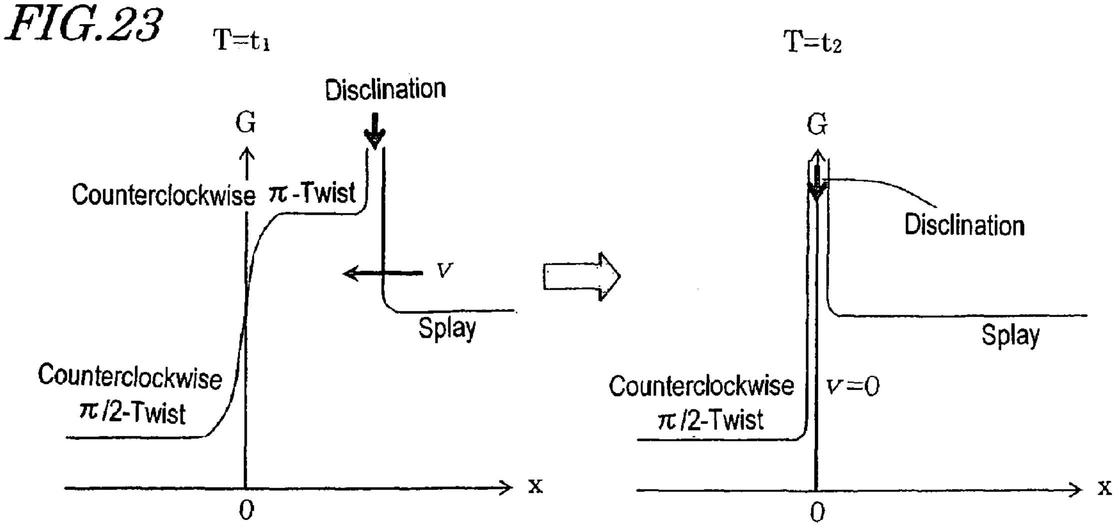
FIG. 23 shows views demonstrating the relationship in the magnitude of Gibbs free energy among various liquid crystal alignment states developing after the refresh treatment in a liquid crystal element in an embodiment of the present invention.

FIG. 23 diagrammatically shows the relationship in the magnitude of energy among the alignment states at times $T=t_1$ and $t_2$ obtained using the Gibbs free energy calculated values in Table 8. The axis of ordinates of FIG. 23 represents the Gibbs free energy calculated values, and the axis of abscissas represents the distance (unit: arbitrary) from the boundary between the first liquid crystal region and the second liquid crystal region when the x-axis extends in the liquid crystal layer 27 as shown in FIG. 22.

At time $T=t_1$, a lower-energy splay-aligned region that has developed from the periphery of the pixel exists in the first liquid crystal region 27F (x>0). As shown in FIG. 23, with the expansion of the splay-aligned region, a higher-energy counterclockwise π-twisted region shrinks. In other words, the splay-aligned region erodes the higher-energy counterclockwise π-twisted region. The expression that "a region in an alignment state (A) is eroded" is sometimes used when a region in an alignment state (B) is formed in the region in the alignment state (A), and the region in the alignment state (A) gradually shrinks with expansion of the region in the alignment state (B). Since continuous connection is not allowed between the splay alignment and the counterclockwise π-twisted alignment, an energy gap exists between the two regions as shown in FIG. 23, and the boundary between the two regions is distinguished as a disclination line.

The disclination line separating the splay alignment from the counterclockwise π-twist alignment shifts toward the boundary (x=0) between the first and second liquid crystal regions, and stops shifting at the boundary between the first and second liquid crystal regions at time $T=t_2$. This is because the counterclockwise π/2-twist alignment of the second liquid crystal region ($x \leqq 0$) is more stable with respect to energy (lower in energy) than the splay alignment as shown in FIG. 23 and this prevents the splay alignment from entering the second liquid crystal region having lower energy.

As described above, from the energy calculation, also, it was proved that the counterclockwise π/2-twist alignment continuously connectable with the counterclockwise π-twist alignment could be completely trapped in the second liquid crystal region ($x \leqq 0$) by the alignment refresh treatment.

After the complete change of the first liquid crystal region 27F to bend alignment by the alignment refresh treatment, bend alignment grows in the first liquid crystal region from the TN alignment trapped in the second liquid crystal region once a voltage equal to or higher than the splay-bend critical voltage (Vcr) is applied. This growth of bend alignment will be discussed. The actually measured Vcr of the liquid crystal material used for the experiment was 2.3 V. Therefore, the energy state observed during application of 3 V, for example, will be described.

The liquid crystal alignment states that may occur in the first and second liquid crystal regions are the following three states: bend alignment, counterclockwise π/2-twist alignment and splay alignment. The Gibbs free energy was estimated by theoretical calculation for these three states, and the results are as shown in Table 9 below. The applied voltage was 3 V.

TABLE 9

| Aligned state | Gibbs free energy ($\mu J/m^2$) |
|---|---|
| Bend | −40.585 |
| counterclockwise π/2-twist | −41.010 |
| Splay | −24.603 |

Figure 24:
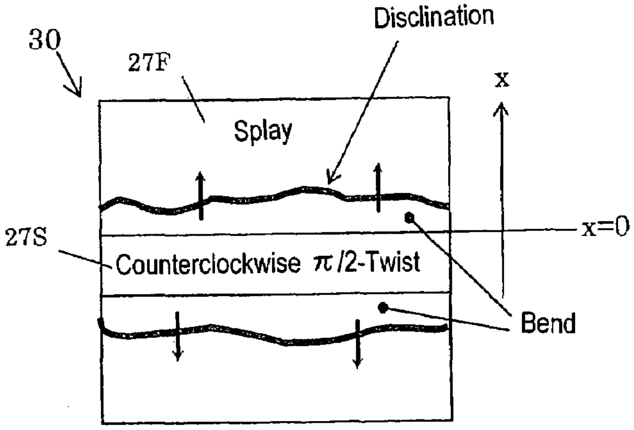
FIG. 24 is a view demonstrating the alignment state of a liquid crystal element in an embodiment of the present invention, observed immediately after application of a voltage of 3 V.
Figure 25:
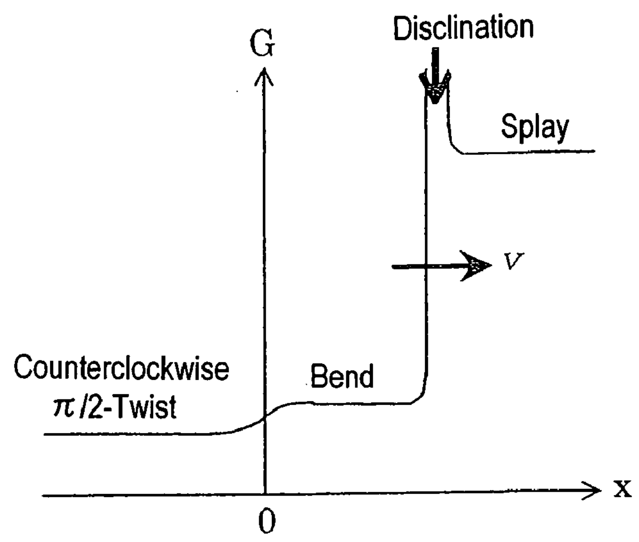
FIG. 25 is a view demonstrating the relationship in the magnitude of Gibbs free energy among various liquid crystal alignment states developing immediately after the application of 3 V in a liquid crystal element in an embodiment of the present invention.

FIG. 24 diagrammatically shows the alignment states of the liquid crystal layer 27 observed after a lapse of a predetermined time from the application of a voltage of 3 V. FIG. 25 shows the relationship in the magnitude of energy among the alignment states at this time. The axis of ordinates of FIG. 25 represents the Gibbs free energy calculated values, and the axis of abscissas represents the distance (unit: arbitrary) from the boundary between the first liquid crystal region 27F and the second liquid crystal region 27S when the x-axis extends in the liquid crystal layer 27 as shown in FIG. 24.

The counterclockwise π/2-twist alignment and the bend alignment can continuously connect with each other. In the first liquid crystal region (x>0), the bend alignment continuously connecting from the counterclockwise π/2-twist alignment erodes the splay alignment having higher energy in the first liquid crystal region during application of 3 V. Since the bend and the splay do not continuously connect with each other, they have an energy gap therebetween and are separated from each other by a disclination line.

As described above, from the energy calculation, also, it was found provable that when a voltage equal to or higher than the splay-bend critical voltage (Vcr) is applied, bend alignment can grow smoothly in the splay-aligned region in the first liquid crystal region from the TN alignment trapped in the second liquid crystal region.

Hereinafter, Examples 3 to 5 of the present invention will be described.

EXAMPLE 3

In the above description, mainly, the angle ψ formed between the pretilt direction 19 of the second liquid crystal region 26S and the pretilt direction 17 of the first liquid crystal region 27F was assumed as 90°. The angle is not necessarily this value. In Example 3, to examine the correlation between the angle ψ and the way of the splay-bend transition, the rubbing direction of the second alignment film region 26S of the alignment film 26 on the lower substrate 24 was changed variously to prepare a plurality of liquid crystal display devices.

Figure 26:
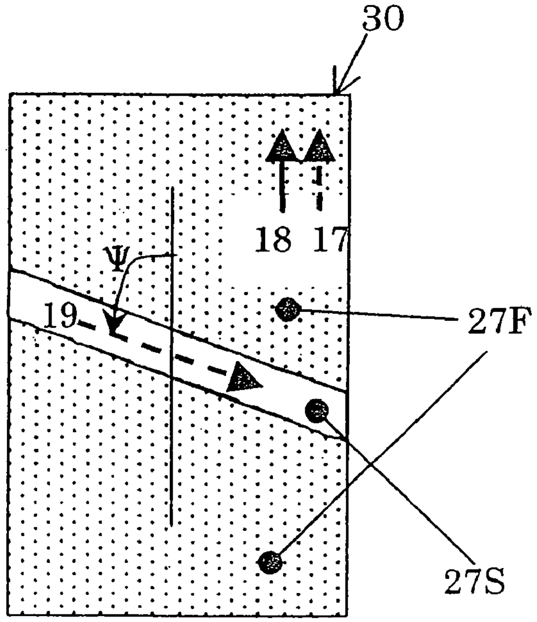
FIG. 26 is a diagrammatic view of a liquid crystal element in Example 5, viewed in the direction normal to the substrate.

Specifically, five liquid crystal display devices (samples #11 to #15) shown in Table 10 below were prepared by varying the angle ψ formed between the pretilt direction 19 of the second liquid crystal region 27S and the pretilt direction of the first liquid crystal region 27F in the range of 30° to 150° inclusive. As shown in FIG. 26, the second liquid crystal region 27S is in the shape of a stripe extending in the rubbing direction of the second liquid crystal region 27S. The rubbing direction (direction of arrow 17) of the first alignment film region 26F of the alignment film 26 on the lower substrate 24 and the rubbing direction (direction of arrow 18) of the alignment film 23 on the upper substrate 21 are parallel to each other.

For comparison, three liquid crystal display devices (samples #201 to #203) having the angle ψ falling outside the above-described range $30° \leqq \psi \leqq 150°$ and a liquid crystal display device (sample #204) that has not such a region as the second alignment film region 26S were also prepared as in the preparation of the samples of Example 3. Note that in sample #201, the rubbing direction (direction of arrow 19) of the first alignment film region 26F and the rubbing direction of the second alignment film region 26S are opposite to each other.

TABLE 10

| Sample | #11 | #12 | #13 | #14 | #15 | #201 | #202 | #203 | #204 |
|---|---|---|---|---|---|---|---|---|---|
| ψ (°) | 30 | 70 | 90 | 110 | 150 | 0 | 15 | 165 | No region |

A voltage of square wave of 6 V and 1 kHz was applied for samples #11 to #15 and comparative samples #201 to #204, and the observation results during the voltage application are shown in Table 11. The observation results of the liquid crystal layers of sample #14 of this example and sample #204 of the comparative example during the voltage application are diagrammatically shown in FIGS. 27 and 28, respectively.

TABLE 11

| Sample | Observation results of bend transition |
|---|---|
| #11 | Bend transition nuclei develop from part of the second liquid crystal region and a bend-aligned region expands. |
| #12 | Bend transition nuclei develop from roughly the entire second liquid crystal region and a bend-aligned region expands. |
| #13 | Bend transition nuclei develop from roughly the entire second liquid crystal region and a bend-aligned region expands. |
| #14 | Bend transition nuclei develop from roughly the entire second liquid crystal region and a bend-aligned region expands. |
| #15 | Bend transition nuclei develop from part of the second liquid crystal region and a bend-aligned region expands. |
| #201 | No change is observed with no development of bend transition nuclei at all. |
| #202 | Bend transition nuclei develop from a very limited part of the second liquid crystal region, but no bend-aligned region expands. |
| #203 | Bend transition nuclei develop from a very limited part of the second liquid crystal region, but no bend-aligned region expands. |
| #204 | No bend transition nuclei develop at all, and thus no change is observed. |

Figure 27:
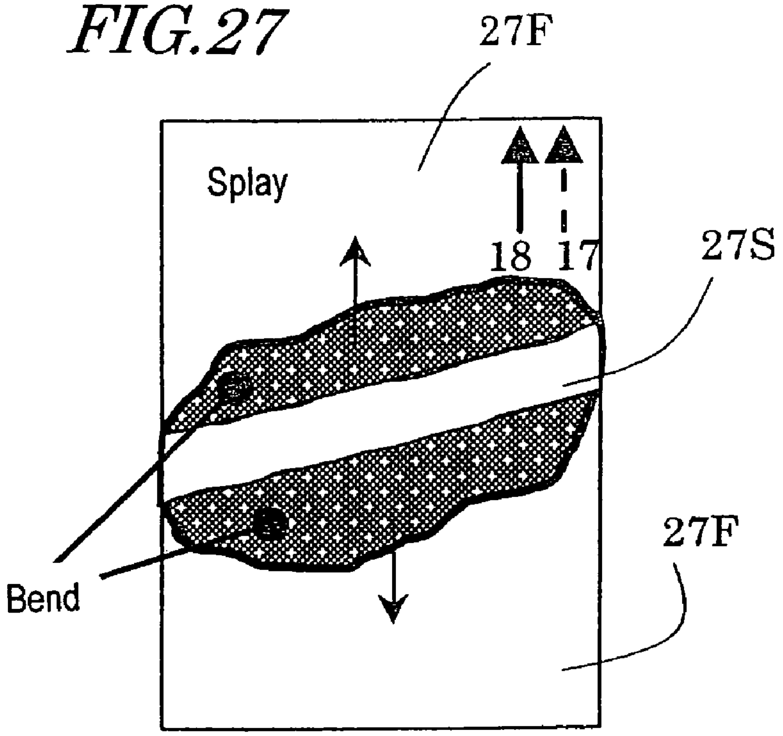
FIG. 27 is a view diagrammatically showing the observation results of a liquid crystal layer of the liquid crystal element in Example 5, viewed in the direction normal to the substrate.

From Table 11 and FIG. 27, it is found that for samples #11 to #15 of this example, the second liquid crystal region 27S acts as the nucleus for effectively triggering the first liquid crystal region 27F to make the splay-bend transition during application of a voltage of about 6 V, and further the bend-aligned region that has developed in the first liquid crystal region expands.

Figure 28:
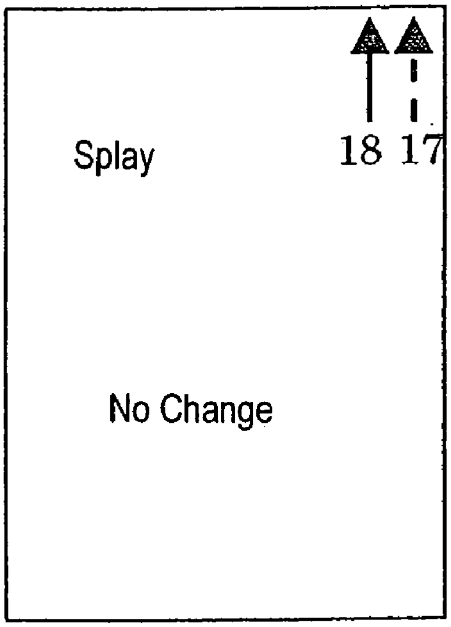
FIG. 28 is a view diagrammatically showing the observation results of a liquid crystal layer of a liquid crystal element in a comparative example, viewed in the direction normal to the substrate.

On the contrary, for samples #201 and #204 of the comparative example, the liquid crystal alignment of the entire liquid crystal layer remains unchanged maintaining the splay alignment with no development of a bend transition nucleus as shown in FIG. 28. In samples #202 and #203 of the comparative example, in which the rubbing directions of the first and second alignment film regions 26F and 26S are close to each other, the pretilt directions of the first and second liquid crystal regions 27F and 27S are close to each other, and this fails to rotate liquid crystal molecules existing in the portion in which the distortion of the splay alignment is concentrated by a sufficient angle, and thus its action as the bend transition nucleus is weakened.

Next, the results obtained by performing the alignment refresh treatment for samples #11 to #15 and comparative samples #201 to #204 will be described. As described above in Embodiment 2, the alignment refresh treatment includes applying a high voltage for a predetermined time after injection of a liquid crystal material into the space between the substrates of each sample and before actual driving.

Figure 29:
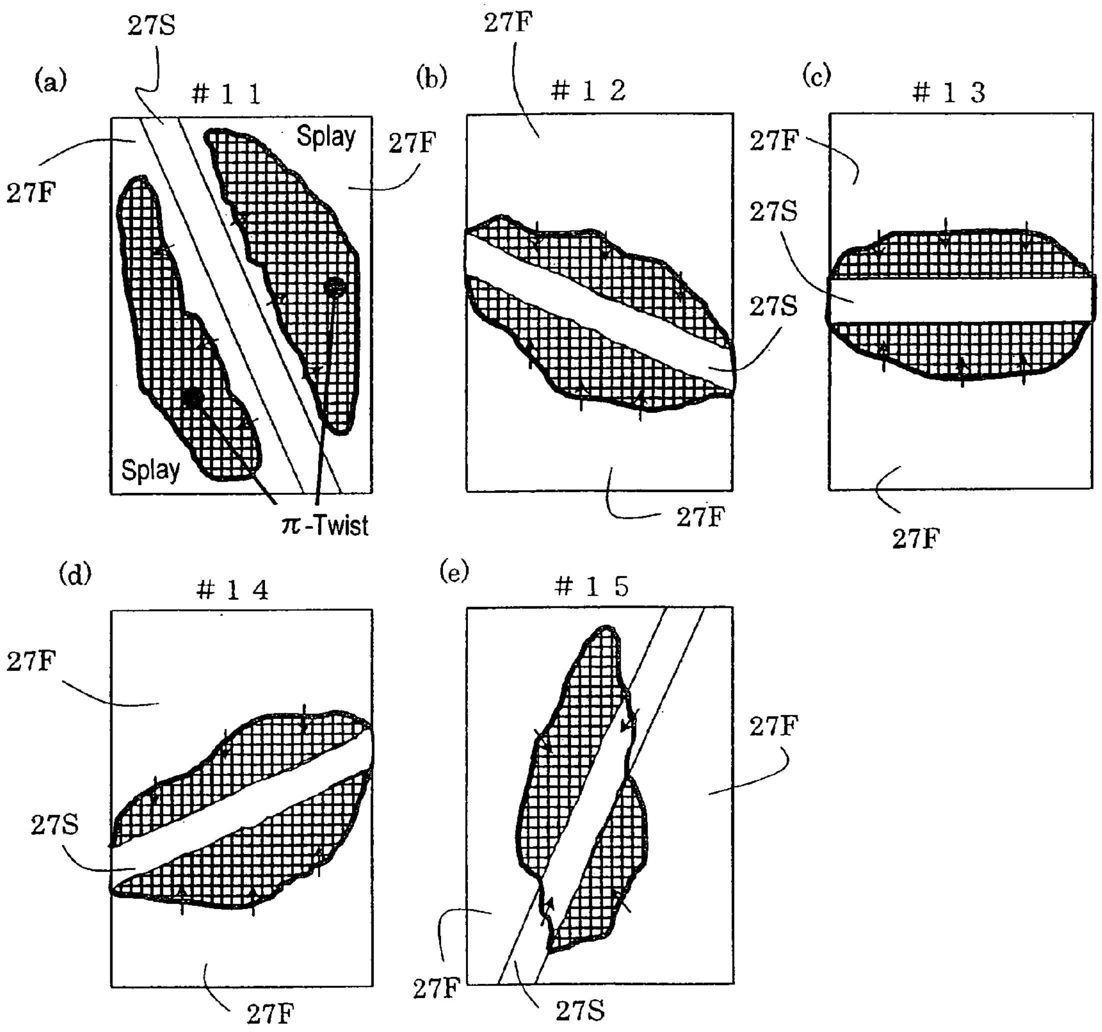
FIGS. 29(*a*), (*b*), (*c*), (*d*) and (*e*) are views diagrammatically showing the observation results of liquid crystal layers of liquid crystal elements in Example 5, viewed in the direction normal to the substrate.

The results of visual observation after halt of the high voltage application are summarized in Table 12. FIG. 29 diagrammatically shows the observation results obtained after a lapse of a predetermined time from the halt of the high voltage application.

TABLE 12

| Sample | Observation results of bend transition |
|---|---|
| #11 | Splay alignment develops from the boundary portion of the second region. Therefore, TN alignment continuously connectable with bend alignment during voltage application is not trapped in the second region. |

TABLE 12-continued

| Sample | Observation results of bend transition |
|---|---|
| #12 | The π-twist alignment developing in the first region is absorbed into the second region while being eroded by the splay alignment from the periphery. Finally, TN alignment continuously connectable with bend alignment during voltage application is trapped in the entire second region. |
| #13 | The π-twist alignment developing in the first region is absorbed into the second region while being eroded by the splay alignment from the periphery. Finally, TN alignment continuously connectable with bend alignment during voltage application is trapped in the entire second region. |
| #14 | The π-twist alignment developing in the first region is absorbed into the second region while being eroded by the splay alignment from the periphery. Finally, TN alignment continuously connectable with bend alignment during voltage application is trapped in the entire second region. |
| #15 | The π-twist alignment developing in the first region is absorbed into the second region while being eroded by the splay alignment from the periphery. However, TN alignment continuously connectable with bend alignment during voltage application, once absorbed into the second liquid crystal region, is inevitably eroded by another type of TN alignment and finally disappears. |
| #201 | No TN alignment continuously connectable with bend alignment during voltage application is trapped in the second region at all. |
| #202 | No TN alignment continuously connectable with bend alignment during voltage application is trapped in the second region at all. |
| #203 | No TN alignment continuously connectable with bend alignment during voltage application is trapped in the second region at all. |
| #204 | With no second region provided, no TN alignment continuously connectable with bend alignment during voltage application is trapped. |

From Table 12 and FIG. 29, it is found that for the samples (#12 to #14) of this example in which the angle ψ formed between the pretilt directions of the first and second alignment film regions 26F and 26S falls within the range $70° \leqq \psi \leqq 110°$, the developing π-twist alignment can be trapped in the entire second region as TN alignment and held therein by performing the alignment refresh treatment. Accordingly, it is found that the range of the angle ψ is more optimally $70° \leqq \psi \leqq 110°$, and that by setting the angle within this range, bend alignment smoothly grows from the TN alignment trapped in advance in the second liquid crystal region only with application of a voltage equal to or higher than the splay-bend critical voltage (Vcr), and in this way, higher-speed and more reliable bend transition can be attained.

EXAMPLE 4

In Example 4, the amount of the chiral agent added to the liquid crystal layer was changed variously, to prepare liquid crystal display devices similar to the liquid crystal display device 40 of Embodiment 2 described above in much the same manner as that in Embodiment 2. Specifically, prepared were eight liquid crystal display devices (samples #21 to #28) having values of the ratio d/p of the thickness d of the liquid crystal layer of the liquid crystal element 30 to the natural chiral pitch p of the chiral agent-added liquid crystal layer shown in Table 13 below. The values of d/p of the samples of Example 4 are set to fall within the range between 0 and less than 0.50.

TABLE 13

| Sample | #21 | #22 | #23 | #24 | #25 | #26 | #27 | #28 | #301 | #302 |
|---|---|---|---|---|---|---|---|---|---|---|
| P (μm) | ∞ | 209 | 137 | 88 | 64 | 40 | 20 | 13 | 12 | 8 |
| d/p | 0 | 0.03 | 0.04 | 0.07 | 0.09 | 0.15 | 0.30 | 0.45 | 0.50 | 0.75 |

In the liquid crystal elements of Example 4, the first and second alignment film regions 26F and 26S are provided for the alignment film 26 on the lower substrate 24 as shown in FIG. 10. Also, the angle ψ formed between the rubbing directions of the first and second alignment film regions 26F and 26S of the alignment film 26 is set at 120°. The second alignment film region 26S is in the shape of a stripe extending in the rubbing direction 19 thereof and has a width of 50 μm. The size of the substrates 21 and 24 and the alignment films 23 and 26 is 20 mm vertically×10 mm horizontally.

For comparison, two liquid crystal display devices (samples #301 and #302) having values of d/p falling outside the range described above were also prepared as in the manner adopted for the preparation of the samples of Example 4. The cell thickness d of the liquid crystal elements of both the samples of Example 4 and the comparative samples was set at 6 μm.

A voltage of square wave of 6 V and 1 kHz was applied for samples #21 to #28 and comparative samples #301 and #302, and the results were observed with a polarizing microscope. The observation with the polarizing microscope was made for operation in the normally white mode with the polarizer arranged under crossed-Nicols. The observation results are shown in Table 14 below.

TABLE 14

| Sample | Observation results of splay → bend transition |
|---|---|
| #21 | The expansion rate of the bend-aligned region is slow. |
| #22 | The expansion rate of the bend-aligned region is slow. |
| #23 | The expansion rate of the bend-aligned region is slow. |
| #24 | The expansion rate of the bend-aligned region is slow. |
| #25 | The expansion rate of the bend-aligned region is fast. |

TABLE 14-continued

| Sample | Observation results of splay → bend transition |
|---|---|
| #26 | The expansion rate of the bend-aligned region is fast. |
| #27 | The expansion rate of the bend-aligned region is very fast. |
| #28 | The expansion rate of the bend-aligned region is very fast. |
| #301 | The entire region is already π-twisted before voltage application and continuously changes to bend alignment. |
| #302 | The entire region is already π-twisted before voltage application and continuously changes to bend alignment. |

Table 15 shows the time required for the transition to bend alignment of the entire liquid crystal layer from the moment at which the voltage of square wave of 6V and 1 kHz is applied, for samples #21 to #28 and comparative samples #301 and #302.

TABLE 15

| Sample | Splay → bend transition time (sec) |
|---|---|
| #21 | 25 |
| #22 | 20 |
| #23 | 17 |
| #24 | 14 |
| #25 | 9 |
| #26 | 6 |
| #27 | 3 |
| #28 | 3 |
| #301 | 0 |
| #302 | 0 |

From Tables 14 and 15, the following are found. In samples #21 to #28 of this example, with application of a voltage of about 6 V, the bend alignment transition effectively proceeds in the first liquid crystal region 27F from the second liquid crystal region 27S acting as the nucleus. The rate of expansion of the bend-aligned region is however different among the samples. Specifically, it is found that with increase of the added amount of the chiral agent, that is, with increase of the ratio d/p of the cell thickness d to the chiral pitch p of the liquid crystal layer, the expansion rate of the bend-aligned region is faster.

On the contrary, when the chiral agent is added by an amount as large as those in comparative examples #301 and #302, the liquid crystal layer is already π-twisted in the initial state of non-voltage application, in which the major axes of liquid crystal molecules are twisted by 180° as a whole toward the alignment film 26 from the alignment film 23. When a voltage is applied across the liquid crystal layer that is already π-twisted in the initial state, the liquid crystal layer continuously changes to bend alignment from the 180°-twist alignment without the necessity of the bend transition. When the resultant liquid crystal display device is actually driven, a problem arises during white display that the alignment of the liquid crystal layer shifts from bend alignment to twist alignment in a short time of several to several tens of msecs, and this significantly decreases the transmittance, although no problem arises during black display. It is therefore concluded that although the added amount of the chiral agent (value of d/p) is preferably large from the standpoint of facilitating the bend transition, it is preferably small from the standpoint of the transmittance (luminance of the panel) during white display in actual driving.

Figure 30:
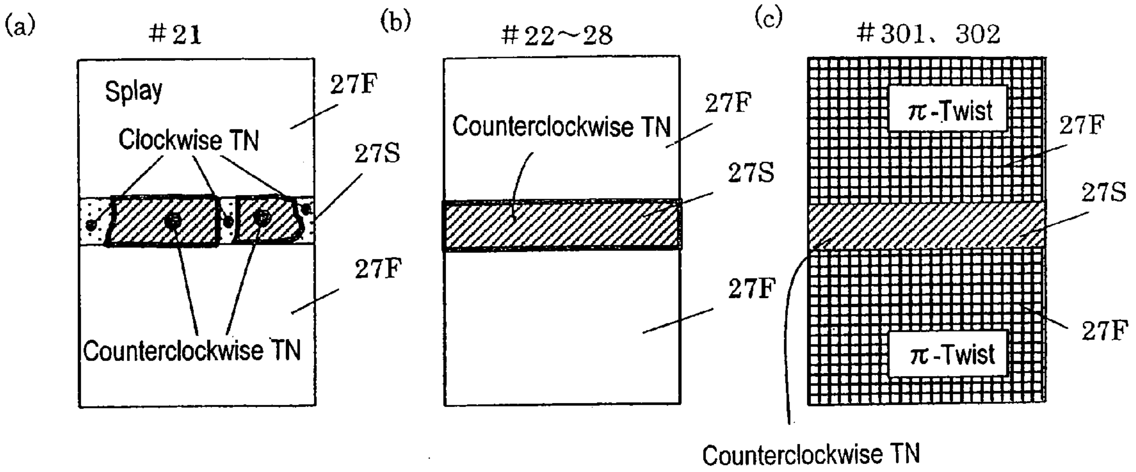
FIGS. 30(*a*) and (*b*) are views diagrammatically showing the observation results of liquid crystal layers of liquid crystal elements in Example 4, and (*c*) is a view diagrammatically showing the observation results of a liquid crystal layer of a liquid crystal element in a comparative example.

Next, the results obtained by performing the alignment refresh treatment for the above samples will be described. As described above in Embodiment 2, the alignment refresh treatment includes applying a high voltage for a predetermined time after injection of a liquid crystal material into the space between the substrates of each sample and before actual driving. The liquid crystal alignment states of the first and second liquid crystal regions after a lapse of a sufficient time (about one month) from the high voltage application were observed with a polarizing microscope. The results of visual observation of the liquid crystal alignment states are shown in Table 16. FIG. 30 shows representative views showing the observation results.

The observation with the polarizing microscope was performed in the extinction position in which the polarizer was arranged under crossed-Nicols and the parallel rubbing direction of the liquid crystal region 27F agreed with the axis of the polarizer. Whether the twist direction of liquid crystal molecules in the TN region as the second liquid crystal region 27S is clockwise or counterclockwise was determined by rotating only the polarizer clockwise or counterclockwise while fixing the analyzer of the polarizing microscope and examining the color change at this time.

TABLE 16

| | | Liquid crystal alignment state | |
|---|---|---|---|
| Sample | d/p | First liquid crystal region | Second liquid crystal region |
| #21 | ∞ | Splay | Counterclockwise TN mostly |
| #22 | 0.03 | Splay | Counterclockwise TN entirely |
| #23 | 0.04 | Splay | Counterclockwise TN entirely |
| #24 | 0.07 | Splay | Counterclockwise TN entirely |
| #25 | 0.09 | Splay | Counterclockwise TN entirely |
| #26 | 0.15 | Splay | Counterclockwise TN entirely |
| #27 | 0.30 | Splay | Counterclockwise TN entirely |
| #28 | 0.45 | Splay | Counterclockwise TN entirely |
| #301 | 0.50 | π-twist entirely | Counterclockwise TN entirely |
| #302 | 0.75 | π-twist entirely | Counterclockwise TN entirely |

Figure 31:
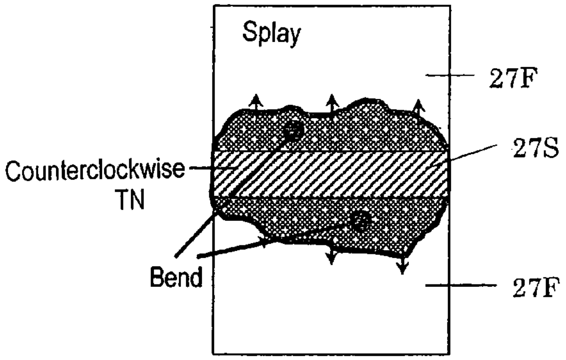
FIG. 31 is a view diagrammatically showing the observation results of a liquid crystal layer of a liquid crystal element in Example 4.

As is found from Table 16 and FIG. 30, by performing the alignment refresh treatment, counterclockwise TN alignment continuously connectable with bend alignment during voltage application can be trapped in the second liquid crystal region 27S, over roughly the entire region for sample #21 of Example 4 or over the entire region for samples #22 to #28 of Example 4. Once a voltage equal to or higher than the splay-bend critical voltage (Vcr) is applied, the counterclockwise TN alignment trapped in the second liquid crystal region 27S erodes the splay-aligned regions in the first liquid crystal region 27F smoothly with shift of the disclination lines, as shown in FIG. 31, to attain high-speed, reliable bend transition.

On the contrary, it is found that when the chiral agent is added by an amount as large as those in comparative samples #301 and #302, the first liquid crystal region 27F keeps the π-twist alignment and does not resume the splay alignment after the alignment refresh treatment. When the liquid crystal layer exhibits the π-twist alignment, the liquid crystal layer continuously changes to bend alignment from the π-twist alignment once a voltage is applied, and therefore the bend transition is unnecessary. When the resultant liquid crystal display device is actually driven, a problem arises during white display that the alignment of the liquid crystal layer shifts from bend alignment to twist alignment in a short time of several to several tens of msecs, and this significantly decreases the transmittance, although no problem arises during black display. Accordingly, although the added amount of the chiral agent (value of d/p) is preferably large from the standpoint of facilitating the bend transition, it is preferably small from the standpoint of the transmittance (luminance of the panel) during white display in actual driving.

It is therefore concluded that the ratio d/p of the cell thickness d to the natural chiral pitch p should preferably satisfy $0 \leqq d/p < 0.50$ in consideration of the effectiveness of the second liquid crystal region as the alignment transition nucleus for the splay-bend transition, the ability of the second liquid crystal region of trapping TN alignment continuously connectable with bend alignment after the refresh treatment, and the requirement that the first liquid crystal region must be splay-aligned in its initial state to prevent degradation in transmittance.

Figure 32:
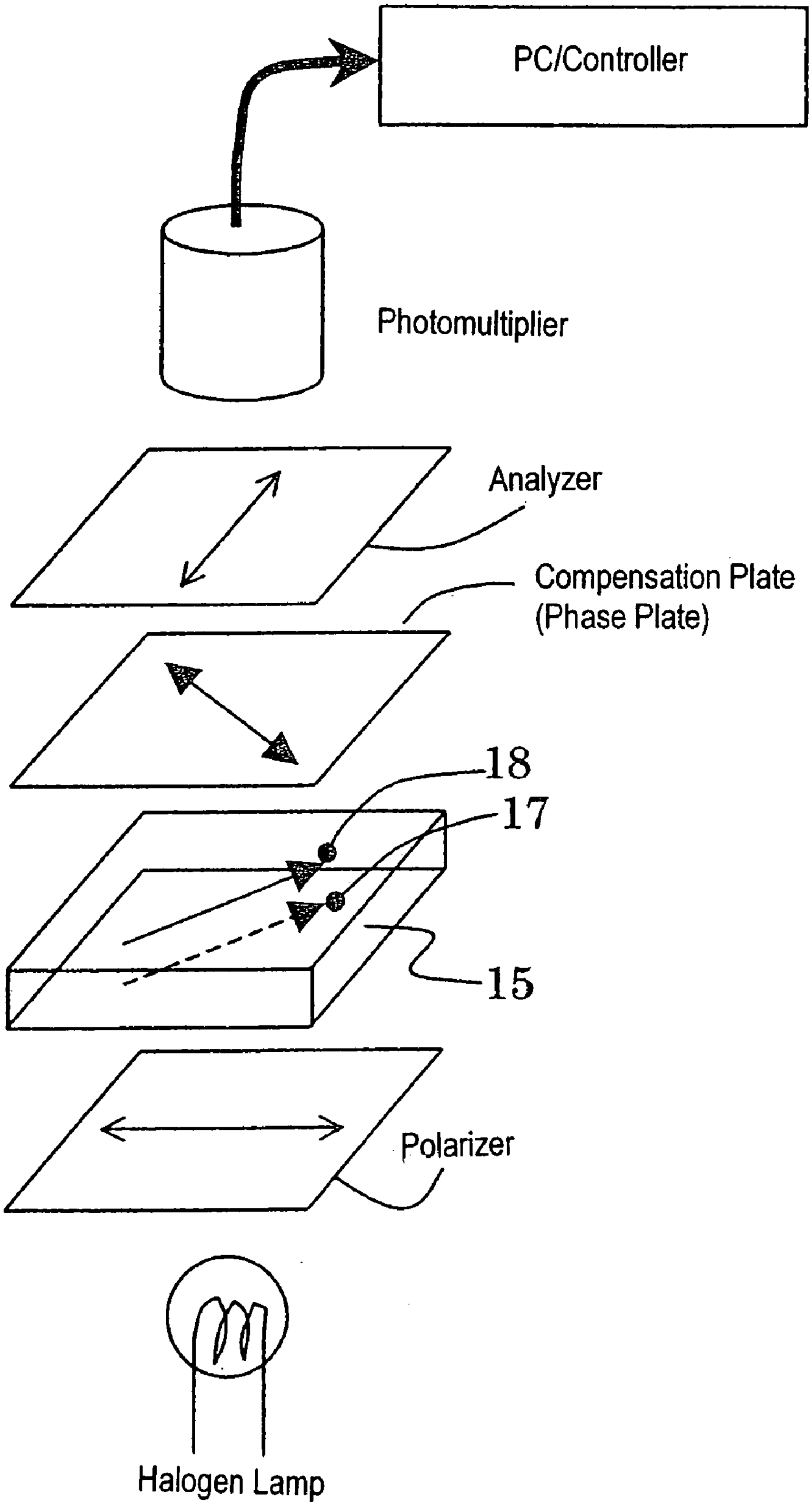
FIG. 32 is a view showing a measurement system for measuring the voltage-transmittance characteristic in Example 4 and the comparative example.

As described above, as long as only the easiness of the bend transition is pursued, the added amount of the chiral agent is desirably as large as possible. However, addition of the chiral agent in an excessive amount worsens the optical characteristics, that is, decreases the transmittance when the voltage is low during white display, degrades the viewing angle characteristic and causes asymmetry of the viewing angle characteristic. To examine this, the voltage-transmittance characteristic was measured for samples #21 to #28 of Example 4 and comparative samples #301 and #302 with a measurement system as shown in FIG. 32.

A polarizing microscope was set under crossed-Nicols, and a liquid crystal display device was placed in the polarizing microscope so that the rubbing direction of the first liquid crystal region (rubbing direction 17 of the alignment film 26 and the rubbing direction 18 of the alignment film 22) is 45° with respect to the transmission axes of the polarizer and the analyzer. The second liquid crystal region was shaded with a black matrix. First, a voltage equal to or higher than Vcr was applied to make the first liquid crystal region used for image display completely bend-aligned. In this measurement, the transmittance of the first liquid crystal region during application of a voltage of 6 V, for example, was determined as black display. To compensate residual retardation in the first liquid crystal region of the liquid crystal element during the application of 6 V, a phase plate was placed so that the slow axis thereof was perpendicular to the slow axis of the liquid crystal layer, to thereby make the total retardation zero, or obtain black display.

Figure 33:
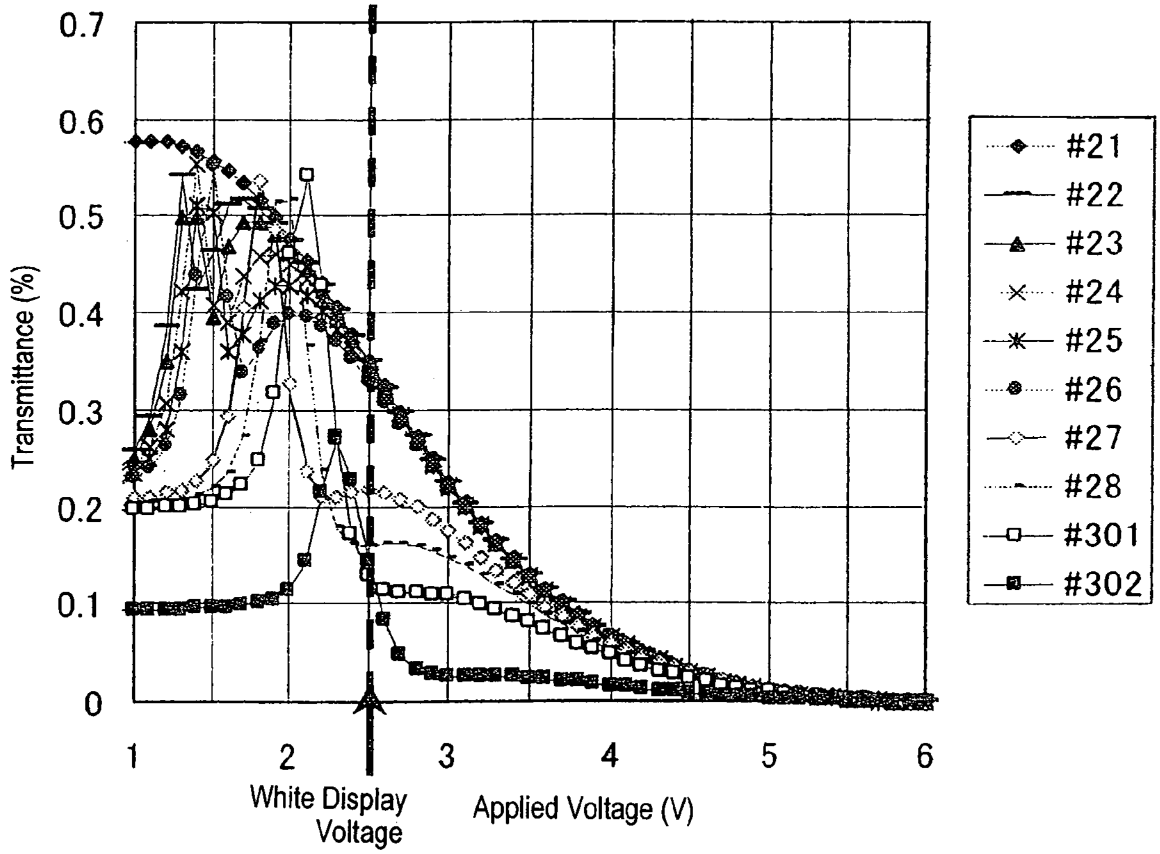
FIG. 33 is a graph showing the measurement results of the voltage-transmittance characteristic in Example 4 and the comparative example.

FIG. 33 shows a graph of the voltage-transmittance characteristic obtained when the voltage is lowered from the black display voltage of 6 V, detected with a photomultiplier. From FIG. 33, it is found that in samples #22 to #26, in particular, among samples #21 to #28 of Example 4 having different d/p values obtained by changing the added amount of the chiral agent, decrease in transmittance is hardly observed and the optical characteristics are maintained, compared with sample #21 having no chiral agent added. Since the splay-bend critical voltage Vcr of the liquid crystal material in this example was 2.3 V, the voltage range in actual driving was set to be from 2.5 V to 6.0 V with 6.0 V for black display and 2.5 V for white display.

Figure 34:
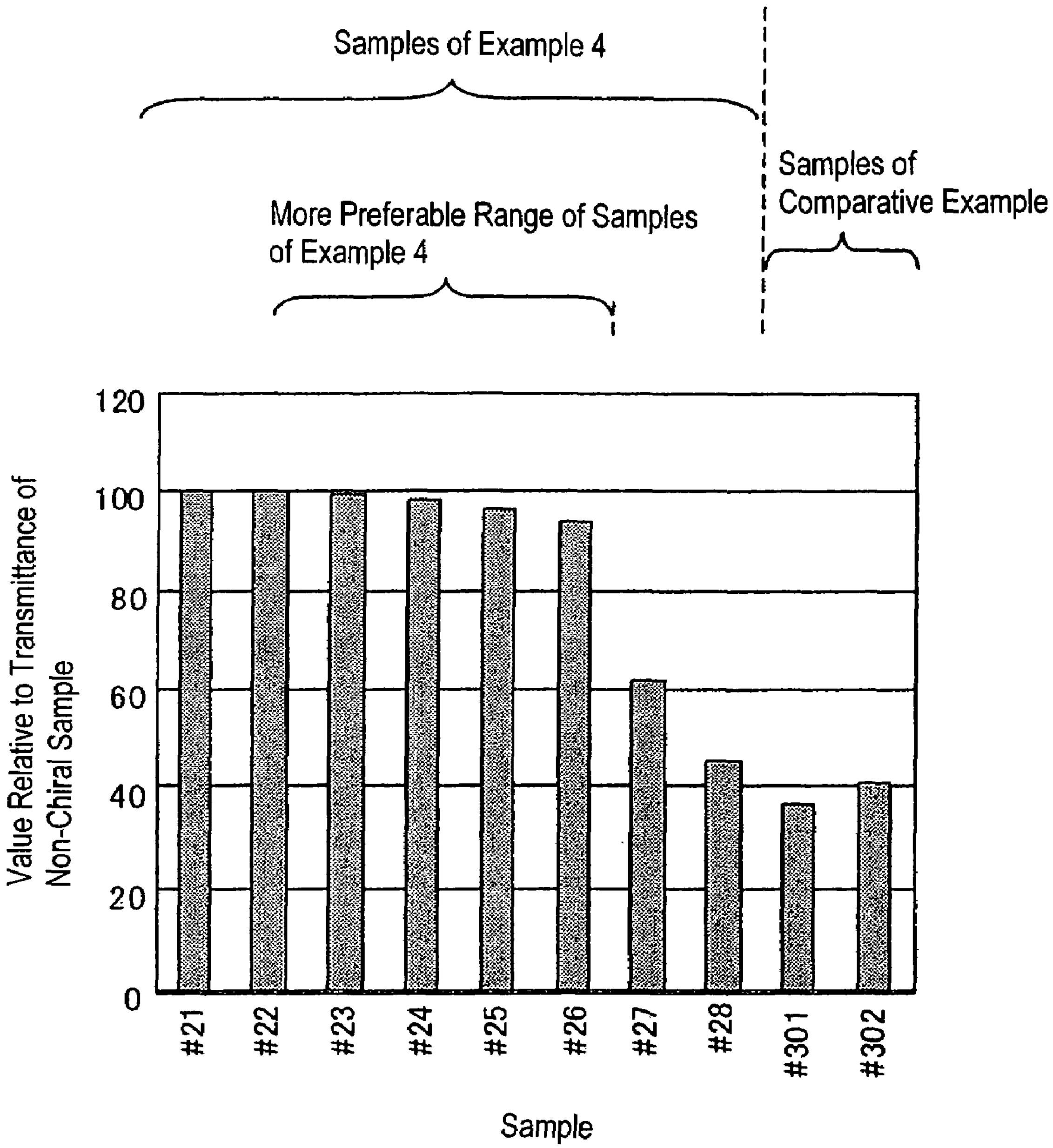
FIG. 34 is a view showing the values of transmittance of the liquid crystal elements in Example 4 and the comparative example with respect to the transmittance of a non-chiral sample during application of a white display voltage.

FIG. 34 is a graph for comparing the transmittance among the samples of Example 4 and the comparative example. The comparison of the transmittance was performed by setting the transmittance of sample #21 having no chiral agent added at the white display voltage of 2.5 V as 100 and standardizing the transmittance values of the other samples with respect to the transmittance of sample #21. As is found from FIG. 34, in samples #22 to #26, in particular, among samples #21 to #28 of Example 4, the decrease in transmittance is suppressed to within several percentages with respect to the non-chiral sample #21, and thus the optical characteristics are maintained.

From the above, it is concluded that the range of d/p is more optimally $0 < d/p \leqq 0.15$ and that as long as the added amount of the chiral agent to the liquid crystal material is set to satisfy the above range, degradation in the optical characteristics of the liquid crystal element due to the addition of the chiral agent is too small to cause a problem in practice.

In the above description, 90°-twist alignment continuously connectable with bend alignment during application of a voltage equal to or higher than Vcr was trapped in the entire second liquid crystal region by the alignment refresh treatment. Such a second liquid crystal region can also be obtained without performing the alignment refresh treatment by adjusting the kind (rotation direction) and added amount of the chiral agent. Hereinafter, a method for forming the second liquid crystal region by addition of the chiral agent will be described.

Addition of Chiral Agent

In the liquid crystal element 30 shown in FIG. 10, liquid crystal molecules in the entire second liquid crystal region 27S can be put in the uniform tilt state (twist alignment free from splay distortion) as shown in FIG. 36(*a*) by adding a predetermined amount of a counterclockwise chiral agent without performing the alignment refresh treatment. To attain this uniform tilt state by addition of a chiral agent to the liquid crystal material without the alignment refresh treatment, the added amount of the chiral agent is preferably set so that d/p is 0.07 or more. As described in Example 4, the optical characteristics degrade with increase of the added amount of the chiral agent. Therefore, if importance is placed on the optical characteristics, the added amount of the chiral agent is preferably set so that d/p is less than 0.5, more preferably equal to or less than 0.15.

As described above, by adding a chiral agent having a predetermined rotation direction to the liquid crystal material, it is possible to form the liquid crystal layer in which 90°-twist alignment continuously connectable with bend alignment during application of a voltage equal to or higher than Vcr is trapped in the entire second liquid crystal region 27S as shown in FIG. 12(*c*), without the necessity of the alignment refresh treatment. Having the entire second liquid crystal region 27S acting as the transition nucleus, the first liquid crystal region can make the splay-bend transition more reliably at higher speed. The above liquid crystal layer may further be subjected to the alignment refresh treatment.

EXAMPLE 5

In Example 5, prepared was a liquid crystal display device having a liquid crystal layer in which 90°-twist alignment continuously connectable with bend alignment during application of a voltage equal to or higher than Vcr was trapped in the entire second liquid crystal region 27S by adding a chiral agent having a predetermined rotation direction to the liquid crystal layer.

Figure 35:
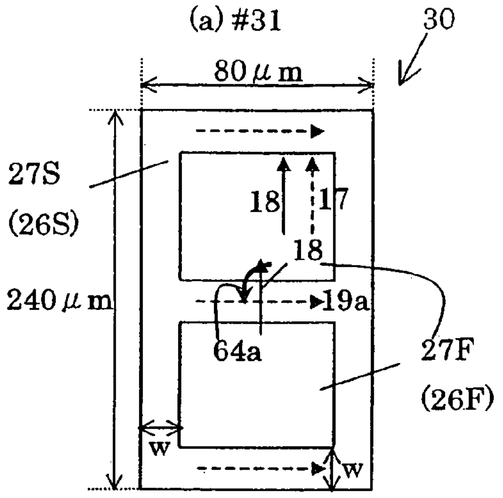
FIGS. 35(*a*) and (*b*) are diagrammatic views of a liquid crystal element in Example 5 and a liquid crystal element in the comparative example, respectively, viewed in the direction normal to the substrate.

A liquid crystal display device (sample #31) of Example 5 was prepared, in which, as shown in FIG. 35(*a*), the liquid crystal layer 27 has two separate parts of the first liquid crystal region 27F and the second liquid crystal region 27S surrounding the two parts of the first liquid crystal region 27F. The first alignment film region 26F of the alignment film 26 on the lower substrate is rubbed in the first direction 17, and the second alignment film region 26S thereof is rubbed in a second direction 19*a* roughly perpendicular to the first direction 17. The alignment film 23 on the upper substrate is roughly entirely rubbed in the direction 18 parallel to the first direction 17. The alignment states of the first and second liquid crystal regions 27F and 27S are defined by the rubbing directions of the alignment films 23 and 26. The size of one pixel is 80 μm×240 μm, and the width w of the second liquid crystal region 27S is 10 μm. Cholesteryl nonanoate (CN) as a counterclockwise chiral agent is added to the liquid crystal layer 27. The added amount of the chiral agent is adjusted to have a pitch p of liquid crystal molecules of 40 μm.

In sample #31, the pretilt direction of the second liquid crystal region 27S is from left to right (direction of arrow 19*a* in FIG. 35(*a*)) in the portion near the alignment film 26, and the added chiral agent is counterclockwise (direction of arrow 64*a*). Therefore, the TN alignment of the second liquid crystal region 27S is counterclockwise twisted and in the uniform tilt state as shown in FIG. 36(*a*).

A liquid crystal display device for comparison was also prepared. The liquid crystal display device as the comparative example (sample #401) is different from sample #31 in that a rubbing direction 19*b* of the second alignment film region 26S of the alignment film 26 is the opposite to the rubbing direction 19*a* of the second liquid crystal region 26S of sample #31. In comparative sample #401, the pretilt direction of the second liquid crystal region 27S is from right to left (direction of arrow 19*b* in FIG. 35(*b*)) in the portion near the alignment film 26, and the added chiral agent is counterclockwise (direction of arrow 64*a*). Therefore, the TN alignment of the second liquid crystal region 27S is counterclockwise twisted and is in the splay tilt state as shown in FIG. 36(*b*).

Table 17 shows the particulars of the respective alignment states of the liquid crystal layer. The particulars in Table 17 include the region of the liquid crystal layer in which each alignment state develops (the first liquid crystal region or the second liquid crystal region), the twist angle (by which degree the liquid crystal molecules are twisted), the twist direction (twisted clockwise or counterclockwise toward the lower substrate from the upper substrate) and the tilt state (the uniform tilt or the splay tilt).

TABLE 17

| Alignment state | Place of Development | Twist angle | Twist direction | Tilt |
|---|---|---|---|---|
| Counterclockwise Uniform TN | Second region | 90° | Counter-clockwise | Uniform tilt |
| Counterclockwise Splay TN | Second region | 90° | Counter-clockwise | Splay tilt |
| Clockwise Uniform TN | Second region | 90° | Clockwise | Uniform tilt |
| Bend | First region | 0° | No twist | Uniform tilt |

TABLE 17-continued

| Alignment state | Place of Development | Twist angle | Twist direction | Tilt |
|---|---|---|---|---|
| Counterclockwise π-twist | First region | 180° | Counter-clockwise | Uniform tilt |
| Splay | First region | 0° | No twist | Splay tilt |

Figure 37:
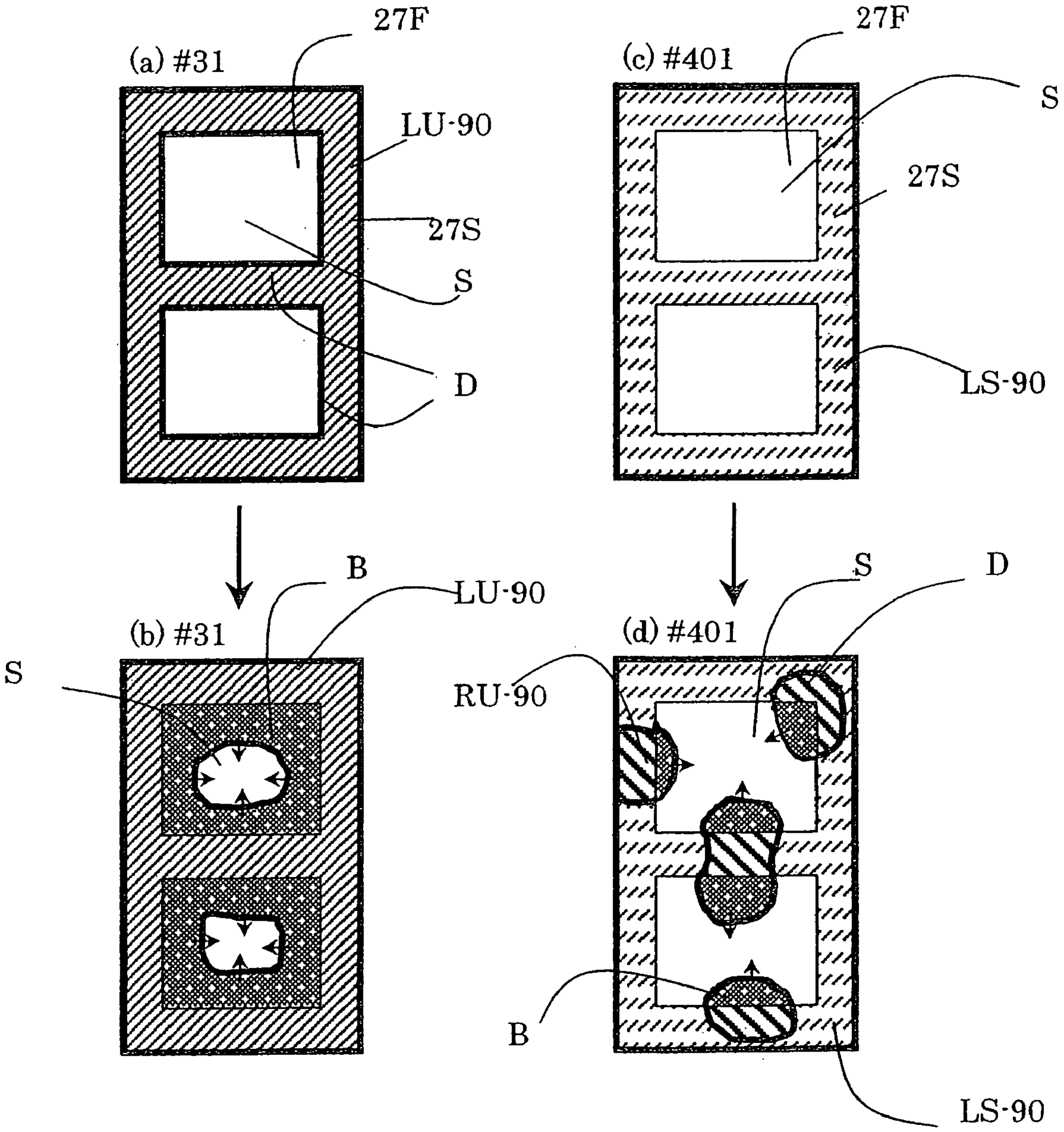
FIG. 37(*a*) is a diagrammatic view of the liquid crystal alignment state of the liquid crystal element in example 5 observed after injection of a liquid crystal material but before voltage application, (*b*) is a diagrammatic view of the liquid crystal alignment state of the liquid crystal element in example 5 observed immediately after the voltage application, (*c*) is a diagrammatic view of the liquid crystal alignment state of the liquid crystal element in the comparative example observed after injection of a liquid crystal material but before voltage application, and (*d*) is a diagrammatic view of the liquid crystal alignment state of the liquid crystal element in the comparative example observed immediately after the voltage application.

In samples #31 and #401, the liquid crystal material was injected in an isotropic phase. The alignment state of the liquid crystal layer after room temperature was resumed was observed with a polarizing microscope under crossed-Nicols. The observation results after the injection of the liquid crystal material and before voltage application are shown in FIG. 37. FIGS. 37(*a*) and (*b*) show the observation results of sample #31 of Example 5, and FIGS. 37(*c*) and (*d*) show the observation results of comparative sample #401. In FIG. 37, disclination lines are shown by the bold lines. Note that the outline of the pixel is also shown by the bold line.

In sample #31 of Example 5, once the liquid crystal material is injected, counterclockwise TN alignment in the uniform tilt state continuously connectable with bend alignment during voltage application is trapped in the entire second liquid crystal region 27S. This liquid crystal region in the counterclockwise uniform-tilt TN alignment is denoted by LU-90. The first liquid crystal region 27F entirely becomes splay-aligned regions S.

When a voltage equal to or higher than the splay-vend critical voltage Vcr is applied across the liquid crystal layer, the disclination lines D formed along the boundaries between the first liquid crystal region 27F and the second liquid crystal region 27S shift smoothly toward the centers of the first liquid crystal region 27F as shown in FIG. 37(*b*). With this shift, bend-aligned regions B expand in the first liquid crystal region 27F, while the splay-aligned regions S of the first liquid crystal region 27F shrink. In this way, splay-bend transition is smoothly attained in the first liquid crystal region 27F.

On the contrary, in comparative sample #401, once the liquid crystal material is injected, the second liquid crystal region 27S exhibits counterclockwise TN alignment in the splay tilt state. This liquid crystal region in the counterclockwise splay-tilt TN alignment is denoted by LS-90. The reason why the second liquid crystal region 27S exhibits the counterclockwise splay-tilted TN alignment is that the rubbing direction of the region of the alignment film on the lower substrate corresponding to the second liquid crystal region 27S is the direction of arrow 19*b* shown in FIG. 35(*b*), and the pretilt direction of liquid crystal molecules existing near the lower substrate is forced to follow this rubbing direction. This counterclockwise splay-tilted TN alignment is topologically homogeneous with the splay alignment. Therefore, no definite disclination lines are formed along the boundaries between the liquid crystal region LS-90 in the counterclockwise TN alignment in the second liquid crystal region 27S and the splay-aligned regions S in the first liquid crystal region 27F. The counterclockwise splay-tilt TN alignment is not continuously connectable with bend alignment during voltage application.

When a voltage equal to or higher than the splay-bend critical voltage Vcr is applied across the liquid crystal layer in the above alignment states, clockwise uniform-tilted TN-aligned regions RU-90 each surrounded by a disclination line D develop in the second liquid crystal region 27S. With these clockwise uniform-tilted TN-aligned regions RU-90 acting as transition nuclei, bend-aligned regions B expand in the first liquid crystal region 27F accompanied by shift of the disclination lines D. With this expansion, the splay-aligned regions S in the first liquid crystal regions 27F are eroded.

Therefore, two processes are required for comparative sample #401, in which after the voltage application, the uniform-tilted TN-aligned regions RU-90 first develop in the second liquid crystal region 27S, and with the regions RU-90 as transition nuclei, the bend-aligned regions B expand in the first liquid crystal regions 27F. The process of development of transition nuclei in the second liquid crystal region 27S is neither reliable nor reproducible, like the conventional processes of developing transition nuclei from spacers, protrusions, flaws on the surfaces of the alignment films or the like. In other words, comparative sample #401 is less easy in attaining high-speed, reliable splay-bend transition.

As described above, in the liquid crystal display device of Example 5, the kind (rotation direction) of the chiral agent added to the liquid crystal material and the rubbing direction are set so that the liquid crystal molecules in the second liquid crystal region 27S are twisted in the uniform tilt state (twisted free from splay distortion) during non-voltage application. Therefore, TN alignment continuously connectable with bend alignment during application of a voltage equal to or higher than Vcr is trapped in the entire second liquid crystal region 27S. As a result, during application of a voltage equal to or higher than Vcr, more reliable, higher-speed splay-bend transition is attained in the first liquid crystal region 27F.

Figure 38:
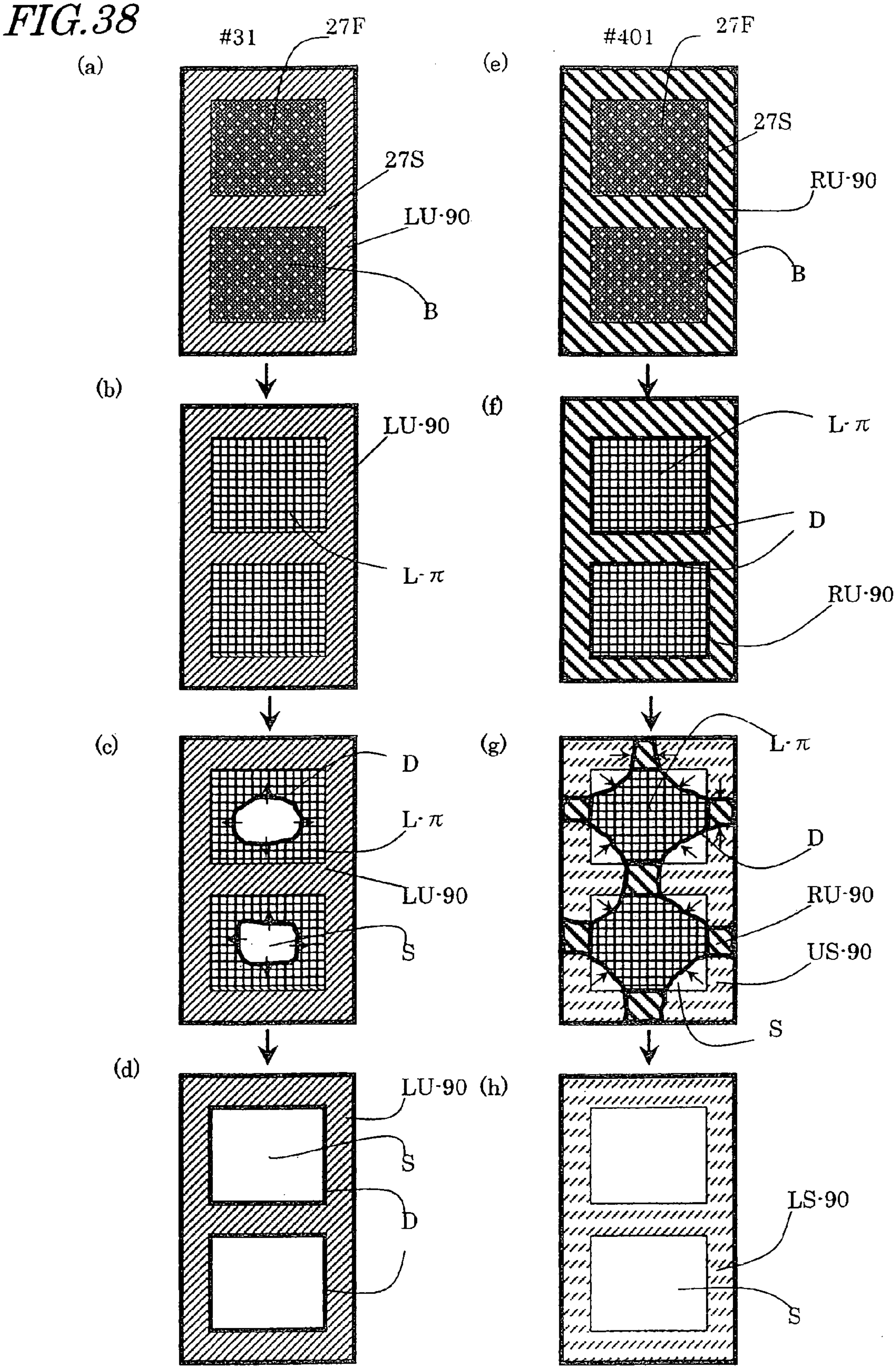
FIGS. 38(*a*), (*b*), (*c*) and (*d*) are diagrammatic views showing changes with time of the liquid crystal alignment state of the liquid crystal element in Example 5 observed when the voltage is turned OFF after the liquid crystal element is subjected to the refresh treatment, and FIGS. 38(*e*) to (*h*) are diagrammatic views showing changes with time of the liquid crystal alignment state of the liquid crystal element in the comparative example observed when the voltage is turned OFF after the liquid crystal element is subjected to the refresh treatment.

By performing the alignment refresh treatment for the liquid crystal display device of Example 5, further reliable, high-speed splay-bend transition is attained in the first liquid crystal regions 27F. Hereinafter, referring to FIG. 38, the change in the alignment state of the liquid crystal layer observed when the alignment refresh treatment is performed for the liquid crystal display device of Example 5 will be described, in comparison with the change in the alignment state of the liquid crystal layer observed when the alignment refresh treatment is performed for the liquid crystal display device of the comparative example. The liquid crystal alignment states during the alignment refresh process were observed with a polarizing microscope under crossed-Nicols. FIG. 38 shows the observation results, in which FIGS. 38(*a*) to (*d*) show the change with time in the liquid crystal alignment state of sample #31 of Example 5, and FIGS. 38(*e*) to (*h*) show the change with time in the liquid crystal alignment state of comparative sample #401. In FIG. 38, disclination lines are shown by the bold lines. Note that the outline of the pixel is also shown by the bold line.

First, a voltage equal to or higher than 2 Vcr is applied to both samples. With the voltage application, in sample #31, the first liquid crystal region 27F becomes the bend-aligned regions B, while the second liquid crystal region 27S becomes the counterclockwise uniform-tilted TN-aligned region LU-90, as shown in FIG. 38(*a*). In comparative sample #401, the first liquid crystal region 27F becomes the bend-aligned regions B, while the second liquid crystal region 27S becomes the clockwise uniform-tilted TN-aligned region RU-90, as shown in FIG. 38(*e*).

Once the voltage application is halted in both samples #31 and #401, the bend alignment in the first liquid crystal region 27F changes to counterclockwise π-twist alignment immediately after the halt of the voltage application (in several tens of msecs), and as a result, the entire first liquid crystal region 27F becomes counterclockwise π-twisted regions L-π. The reason why the bend alignment changes to the counterclockwise π-twist alignment is that both samples use the liquid crystal materials containing the counterclockwise chiral agent, cholesteryl nonanoate (CN).

Thereafter, the counterclockwise π-twisted regions L-π as the first liquid crystal region 27F make transition to more stable splay alignment. In this transition process, the way of expansion of the splay-aligned regions S (way of erosion of the counterclockwise π-twisted regions L-π) in the first liquid crystal region 27F is largely different between samples #31 and #401.

In sample #31 of Example 5, as shown in FIG. 38(*c*), the splay-aligned regions S develop from the surroundings of spacers and the like in the centers of the first liquid crystal region 27F, for example. The splay-aligned regions S gradually erode the counterclockwise π-twisted regions L-π in the first liquid crystal region 27F. With this, the counterclockwise π-twisted regions L-π shrink and retract toward the second liquid crystal region 27S.

After a lapse of a predetermined time from the halt of the voltage application, as shown in FIG. 38(*d*), the disclination lines D reach the boundaries between the first liquid crystal region 27F and the second liquid crystal region 27S and stop shifting. The entire first liquid crystal region 27F is now the splay-aligned regions S. At this time, the entire second liquid crystal region 27S traps therein the counterclockwise TN alignment continuously connectable with bend alignment during voltage application.

The above state in which the disclination lines D stop at the boundaries between the first liquid crystal region 27F and the second liquid crystal region 27S and the TN alignment continuously connectable with bend alignment during voltage application is trapped in the entire second liquid crystal region 27S is maintained. As a result, with the entire second liquid crystal region 27S acting as the bend transition nucleus, once a voltage equal to or higher than Vcr is applied, bend-aligned regions expand in the splay-aligned regions of the first liquid crystal region 27F. With this expansion, the splay-aligned regions shrink in the first liquid crystal region 27F. Finally, the entire first liquid crystal region 27F becomes the bend-aligned regions B.

As described above, in sample #31 of Example 5, bend alignment easily expands from the TN alignment trapped in the second liquid crystal region 27S only with application of a voltage equal to or higher than Vcr. As a result, high-speed, reliable bend transition is attained in the first liquid crystal region 27F.

On the contrary, in sample #401, as shown in FIG. 38(*g*), more stable splay-aligned regions S develop from near the four corners of each part of the first liquid crystal region 27F. The splay-aligned regions S gradually erode the counterclockwise π-twisted regions L-π toward the centers of the first liquid crystal region 27F. At this time, the counterclockwise π-twisted regions L-π are simply eroded without trapping of TN alignment in the second liquid crystal region 27S.

The second liquid crystal region 27S exhibits the clockwise TN alignment as shown in FIG. 38(*g*) when a high voltage is applied although the chiral agent added to the liquid crystal material is counterclockwise. The reason is that splay distortion increases and the alignment becomes unstable with application of a high voltage, and thus the second liquid crystal region 27S takes the clockwise TN alignment free from splay distortion. Therefore, the second liquid crystal region 27S, which exhibits the clockwise uniform-tilted TN alignment immediately after shutoff of the high voltage, is gradually influenced by the effect of the counterclockwise chiral agent with time, and changes to the more stable counterclockwise splay-tilted TN alignment. Accordingly, there will be no trapping of TN alignment continuously connectable with bend alignment during voltage application in the second liquid crystal region.

According to the present invention, the spontaneous twist direction (counterclockwise or clockwise) of the chiral agent in the liquid crystal layer and the pretilt direction of liquid crystal molecules in the second liquid crystal region at its interface are set to agree with each other, to allow the second liquid crystal region to accept the TN alignment in the uniform tilt state free from splay distortion in which liquid crystal molecules are rotated in the spontaneous twist direction of the chiral agent. By setting in this way, TN alignment continuously connectable with bend alignment during voltage application can be trapped in the entire second liquid crystal region once the liquid crystal material is injected. Moreover, by performing the alignment refresh treatment, TN alignment continuously connectable with bend alignment during voltage application can be trapped in the entire second liquid crystal region more reliably.

By trapping TN alignment in the second liquid crystal region as described above, the bend-aligned regions expand smoothly in the first liquid crystal regions only with application of a voltage equal to or higher than the splay-vend critical voltage Vcr, and high-speed, reliable bend transition is attained.

As described above, in the liquid crystal display device of the present invention, the liquid crystal layer has: the first liquid crystal region in which the pretilt direction of liquid crystal molecules, of which the alignment is regulated with the alignment regulating force of the surface of an alignment film, is the first direction; and the second liquid crystal region in which the pretilt direction is the second direction different from the first direction. Display is performed using the bend alignment of the first region of the liquid crystal layer. Once a voltage equal to or higher than the splay-bend critical voltage (Vcr) is applied across the liquid crystal layer, the second region of the liquid crystal layer acts as the splay-bend transition nucleus for the first region, to permit high-speed, reliable bend transition in the first regions.

By trapping $\pi$-twist alignment developing in the first liquid crystal region in the second liquid crystal region as TN alignment, further high-speed, reliable bend transition is attained.

In the liquid crystal display device of the present invention, the added amount of the chiral agent can be minimized. Therefore, it is possible to suppress degradation in optical characteristics, such as decrease in transmittance that may occur due to development of optical rotation caused by the chiral agent.

The invention claimed is:

1. A liquid crystal display device including a pair of substrates, a liquid crystal layer placed between the pair of substrates and an alignment film placed on the side of at least one of the pair of substrates facing the liquid crystal layer, wherein the liquid crystal layer has a first region in which the pretilt direction of liquid crystal molecules of which the alignment is regulated with alignment regulating force of a surface of the alignment film is a first direction and a second region in which the pretilt direction is a second direction different from the first direction, and display is performed using bend alignment of the first region of the liquid crystal layer; wherein the liquid crystal layer contains a chiral agent with a predetermined spontaneous twist direction and the second region of the liquid crystal layer exhibits twist alignment in which the liquid crystal molecules are twisted in the predetermined spontaneous twist direction of the chiral agent; and TN alignment continuously connectable with bend alignment during application of a voltage equal to or higher than Vcr is trapped in the entire second region of the liquid crystal layer.

2. The liquid crystal display device of claim 1, wherein the first region of the liquid crystal layer exhibits splay alignment during non-voltage application and bend alignment during voltage application.

3. The liquid crystal display device of claim 1, wherein the liquid crystal display device has a plurality of pixels, and the liquid crystal layer in each of the plurality of pixels has the first region and the second region.

4. The liquid crystal display device of claim 1, wherein an angle $\psi$ formed between the first direction and the second direction satisfies $30° \leqq \psi \leqq 150°$.

5. The liquid crystal display device of claim 1, wherein an angle $\psi$ formed between the first direction and the second direction satisfies $70° \leqq \psi \leqq 110°$.

6. The liquid crystal display device of claim 1, wherein the second region is in the shape of a stripe extending in parallel with the second direction.

7. The liquid crystal display device of claim 1, wherein $0 < d/p \leqq 0.50$ is satisfied where d is the thickness of the liquid crystal layer and p is the natural chiral pitch of the liquid crystal layer.

8. The liquid crystal display device of claim 1, wherein $0 < d/p \leqq 0.15$ is satisfied where d is the thickness of the liquid crystal layer and p is the natural chiral pitch of the liquid crystal layer.

9. The liquid crystal display device of claim 1, wherein the chiral agent is selected so that the second region of the liquid crystal layer exhibits twist alignment free from splay distortion.

10. The liquid crystal display device of claim 1, wherein the second region at least extends across a region defined by a pixel of the liquid crystal display device.

11. A method for fabricating a liquid crystal display device, comprising the steps of:

providing a pair of substrates each having an electrode on its principal plane;

forming an alignment film on the electrode of at least one of the pair of substrates, the alignment film having a first alignment film region having alignment regulating force forcing the pretilt direction of liquid crystal molecules to be a first direction and a second alignment film region having alignment regulating force forcing the pretilt direction of liquid crystal molecules to be a second direction different from the first direction; and placing a liquid crystal layer between the pair of substrates, the liquid crystal layer having a first region in which the pretilt direction of liquid crystal molecules of which the alignment is regulated with the alignment regulating force of the alignment film is the first direction and a second region in which the pretilt direction of liquid crystal molecules of which the alignment is regulated with the alignment regulating force of the alignment film is the second direction, TN alignment continuously connectable with bend alignment being trapped in the entire second region; wherein the step of placing a liquid crystal layer includes a step of providing a liquid crystal material containing a chiral agent with a predetermined spontaneous twist direction, and the second region of the liquid crystal layer exhibits twist alignment in which the liquid crystal molecules are twisted in the predetermined spontaneous twist direction of the chiral agent.

12. The method for fabricating a liquid crystal display of claim 11, wherein the second region of the liquid crystal layer exhibits twist alignment free from splay distortion during non-voltage application.

13. The method for fabricating a liquid crystal display of claim 11, wherein the step of placing a liquid crystal layer includes a step of performing alignment refresh treatment in which roughly the entire first region of the liquid crystal layer is bend-aligned, and then the bend alignment is changed to splay alignment via π-twist alignment.

14. The method for fabricating a liquid crystal display of claim 13, wherein the step of performing alignment refresh treatment is executed by applying a voltage twice or more as high as a splay-bend critical voltage across the liquid crystal layer for a predetermined time.

15. The method for fabricating a liquid crystal display of claim 13, wherein an angle ψ formed between the first direction and the second direction satisfies $70° \leqq \psi \leqq 110°$.

16. The method for fabricating a liquid crystal display of claim 11, wherein the second region is formed to at least extend across a region defined by a pixel of the liquid crystal display device.

* * * * *